US008027982B2

(12) United States Patent
Ture et al.

(10) Patent No.: US 8,027,982 B2
(45) Date of Patent: Sep. 27, 2011

(54) SELF-SERVICE SOURCES FOR SECURE SEARCH

(75) Inventors: Mark Ture, Santa Clara, CA (US); Muralidhar Krishnaprasad, Fremont, CA (US); Thomas Chang, Redwood Shores, CA (US); Chi-Ming Yang, Sunnyvale, CA (US); Vishu Krishnamurthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 11/680,570

(22) Filed: Feb. 28, 2007

(65) Prior Publication Data
US 2007/0208745 A1   Sep. 6, 2007

Related U.S. Application Data

(60) Provisional application No. 60/800,737, filed on May 16, 2006, provisional application No. 60/778,151, filed on Mar. 1, 2006, provisional application No. 60/777,988, filed on Mar. 1, 2006.

(51) Int. Cl.
*G06F 17/30*   (2006.01)

(52) U.S. Cl. ............. 707/741; 709/203; 709/219; 726/2

(58) Field of Classification Search ............. 707/2, 3, 707/100, 9, 741, E17.002, 999.002, 709, 707/711, 999.01, 999.107, 999.009, 999.003; 726/2; 709/203, 219
See application file for complete search history.

(56) References Cited

U.S. PATENT DOCUMENTS

| | | | |
|---|---|---|---|
| 5,493,677 A | 2/1996 | Balogh et al. | |
| 5,751,949 A | 5/1998 | Thomson et al. | |
| 5,845,278 A | 12/1998 | Kirsch et al. | |
| 5,884,312 A | 3/1999 | Dustan et al. | |
| 5,926,808 A | 7/1999 | Evans et al. | |
| 5,987,482 A | 11/1999 | Bates et al. | |
| 6,006,217 A * | 12/1999 | Lumsden | 707/2 |
| RE36,727 E | 6/2000 | Kageneck et al. | |
| 6,182,142 B1 | 1/2001 | Win et al. | |
| 6,185,567 B1 | 2/2001 | Ratnaraj et al. | |
| 6,301,584 B1 | 10/2001 | Ranger | |
| 6,326,982 B1 | 12/2001 | Wu et al. | |
| 6,356,897 B1 | 3/2002 | Gusack | |
| 6,424,973 B1 | 7/2002 | Baclawski | |
| 6,631,369 B1 | 10/2003 | Meyerzon et al. | |

(Continued)

OTHER PUBLICATIONS

IEEE, "The Authoritative Dictionary of IEEE Standards Terms", Dec. 2000, Standards Inforamtion Network IEEE Press, 7th Edition, pp. 1-4.*

(Continued)

*Primary Examiner* — Leslie Wong
*Assistant Examiner* — Amanda Willis
(74) *Attorney, Agent, or Firm* — Kilpatrick Townsend & Stockton LLP

(57) ABSTRACT

A flexible and extensible architecture allows for secure searching across an enterprise. Such an architecture can provide a simple Internet-like search experience to users searching secure content inside (and outside) the enterprise. The architecture allows for the crawling and searching of a variety of sources across an enterprise, regardless of whether any of these sources conform to a conventional user role model. The architecture further allows for security attributes to be submitted at query time, for example, in order to provide real-time secure access to enterprise resources. The user query also can be transformed to provide for dynamic querying that provides for a more current result list than can be obtained for static queries.

25 Claims, 25 Drawing Sheets

U.S. PATENT DOCUMENTS

| | | |
|---|---|---|
| 6,671,681 B1 | 12/2003 | Emens et al. |
| 6,678,683 B1 | 1/2004 | Shiiyama |
| 6,678,731 B1 | 1/2004 | Howard et al. |
| 6,711,568 B1 | 3/2004 | Bharat et al. |
| 6,734,886 B1 | 5/2004 | Hagan et al. |
| 6,735,585 B1 | 5/2004 | Black et al. |
| 6,754,873 B1 | 6/2004 | Law et al. |
| 6,826,597 B1 | 11/2004 | Lonnroth et al. |
| 6,847,977 B2 | 1/2005 | Abajian |
| 6,848,077 B1 | 1/2005 | McBrearty et al. |
| 6,865,608 B2 | 3/2005 | Hunter |
| 6,978,275 B2 | 12/2005 | Castellanos et al. |
| 7,031,954 B1 | 4/2006 | Kirsch |
| 7,110,983 B2 | 9/2006 | Shear et al. |
| 7,113,939 B2 | 9/2006 | Chou et al. |
| 7,136,876 B1 | 11/2006 | Adar et al. |
| 7,236,923 B1 | 6/2007 | Gupta |
| 7,257,577 B2 | 8/2007 | Fagin et al. |
| 7,287,214 B1 | 10/2007 | Jenkins et al. |
| 7,305,475 B2 | 12/2007 | Tock |
| 7,370,381 B2 | 5/2008 | Tuttle et al. |
| 7,437,351 B2 | 10/2008 | Page |
| 7,472,113 B1 | 12/2008 | Watson et al. |
| 7,493,301 B2 | 2/2009 | Palmon et al. |
| 7,584,120 B1 | 9/2009 | Yun et al. |
| 7,627,564 B2 | 12/2009 | Yao et al. |
| 7,636,714 B1 | 12/2009 | Lamping et al. |
| 7,640,196 B2 | 12/2009 | Weiss |
| 7,725,465 B2 | 5/2010 | Liao et al. |
| 7,752,221 B2 | 7/2010 | Krishnaprasad et al. |
| 2001/0039563 A1 | 11/2001 | Tian |
| 2002/0099731 A1 | 7/2002 | Abajian |
| 2002/0103786 A1 | 8/2002 | Goel |
| 2002/0174122 A1 | 11/2002 | Chou et al. |
| 2002/0178394 A1 | 11/2002 | Bamberger |
| 2002/0184170 A1 | 12/2002 | Gilbert et al. |
| 2003/0014483 A1 | 1/2003 | Stevenson et al. |
| 2003/0055816 A1 | 3/2003 | Paine et al. |
| 2003/0065670 A1* | 4/2003 | Bisson et al. ................. 707/100 |
| 2003/0069880 A1 | 4/2003 | Harrison et al. |
| 2003/0074328 A1 | 4/2003 | Schiff et al. |
| 2003/0074354 A1 | 4/2003 | Lee et al. |
| 2003/0105966 A1 | 6/2003 | Pu et al. |
| 2003/0126140 A1* | 7/2003 | Engelhardt-Cronk et al. ................. 707/100 |
| 2003/0130993 A1 | 7/2003 | Mendelevitch et al. |
| 2003/0139921 A1 | 7/2003 | Byrd et al. |
| 2003/0177388 A1 | 9/2003 | Botz et al. |
| 2003/0204501 A1 | 10/2003 | Moon |
| 2003/0208547 A1 | 11/2003 | Branimir |
| 2003/0208684 A1 | 11/2003 | Camacho et al. |
| 2003/0220917 A1 | 11/2003 | Copperman et al. |
| 2004/0006585 A1 | 1/2004 | Paulus et al. |
| 2004/0041019 A1 | 3/2004 | Schneider et al. |
| 2004/0062426 A1 | 4/2004 | Lo |
| 2004/0064340 A1 | 4/2004 | Johnston |
| 2004/0064687 A1 | 4/2004 | Pfitzmann et al. |
| 2004/0078371 A1* | 4/2004 | Worrall et al. .................... 707/9 |
| 2004/0093331 A1 | 5/2004 | Garner et al. |
| 2004/0122811 A1 | 6/2004 | Page |
| 2004/0158527 A1* | 8/2004 | Lambert .......................... 705/51 |
| 2004/0168066 A1 | 8/2004 | Alden |
| 2004/0199491 A1 | 10/2004 | Bhatt |
| 2004/0225643 A1 | 11/2004 | Alpha et al. |
| 2004/0230572 A1 | 11/2004 | Omoigui |
| 2004/0260685 A1 | 12/2004 | Pfleiger et al. |
| 2005/0015381 A1 | 1/2005 | Clifford et al. |
| 2005/0015466 A1 | 1/2005 | Tripp et al. |
| 2005/0050037 A1 | 3/2005 | Frieder et al. |
| 2005/0102251 A1 | 5/2005 | Gillespie |
| 2005/0108207 A1 | 5/2005 | Thuerk |
| 2005/0114226 A1 | 5/2005 | Tripp et al. |
| 2005/0114324 A1 | 5/2005 | Mayer |
| 2005/0119999 A1* | 6/2005 | Zait et al. .......................... 707/3 |
| 2005/0210017 A1 | 9/2005 | Cucerzan |
| 2005/0216465 A1 | 9/2005 | Dutta et al. |
| 2005/0234859 A1 | 10/2005 | Ebata |
| 2006/0023945 A1 | 2/2006 | King et al. |
| 2006/0064411 A1 | 3/2006 | Gross et al. |
| 2006/0075120 A1 | 4/2006 | Smit |
| 2006/0080316 A1 | 4/2006 | Gilmore et al. |
| 2006/0123472 A1 | 6/2006 | Schmidt et al. |
| 2006/0136194 A1 | 6/2006 | Armstrong et al. |
| 2006/0136405 A1 | 6/2006 | Ducatel et al. |
| 2006/0167857 A1 | 7/2006 | Kraft et al. |
| 2006/0167860 A1 | 7/2006 | Eliashberg et al. |
| 2006/0195914 A1 | 8/2006 | Schwartz et al. |
| 2006/0224627 A1 | 10/2006 | Manikutty et al. |
| 2006/0229911 A1 | 10/2006 | Gropper et al. |
| 2006/0230022 A1 | 10/2006 | Bailey et al. |
| 2006/0271568 A1 | 11/2006 | Balkir et al. |
| 2007/0016625 A1 | 1/2007 | Berstis |
| 2007/0061393 A1 | 3/2007 | Moore |
| 2007/0094710 A1 | 4/2007 | Walker et al. |
| 2007/0100915 A1 | 5/2007 | Rose et al. |
| 2007/0150515 A1 | 6/2007 | Brave et al. |
| 2007/0156669 A1 | 7/2007 | Marchisio et al. |
| 2007/0208712 A1 | 9/2007 | Krishnaprasad et al. |
| 2007/0208713 A1 | 9/2007 | Krishnaprasad et al. |
| 2007/0208714 A1 | 9/2007 | Ture et al. |
| 2007/0208726 A1 | 9/2007 | Krishnaprasad et al. |
| 2007/0208734 A1 | 9/2007 | Koide et al. |
| 2007/0208744 A1 | 9/2007 | Krishnaprasad et al. |
| 2007/0208746 A1 | 9/2007 | Koide et al. |
| 2007/0208755 A1 | 9/2007 | Bhatkar et al. |
| 2007/0209080 A1 | 9/2007 | Ture et al. |
| 2007/0214129 A1 | 9/2007 | Ture et al. |
| 2007/0220037 A1 | 9/2007 | Srivastava et al. |
| 2007/0220268 A1 | 9/2007 | Krishnaprasad et al. |
| 2007/0226695 A1 | 9/2007 | Krishnaprasad et al. |
| 2007/0250486 A1 | 10/2007 | Liao et al. |
| 2007/0276801 A1 | 11/2007 | Lawrence et al. |
| 2007/0283425 A1 | 12/2007 | Ture et al. |
| 2008/0086297 A1 | 4/2008 | Li et al. |
| 2008/0114721 A1 | 5/2008 | Jones et al. |
| 2008/0168037 A1 | 7/2008 | Kapadia et al. |
| 2008/0222138 A1 | 9/2008 | Liu et al. |
| 2009/0006356 A1 | 1/2009 | Liao et al. |
| 2009/0006359 A1 | 1/2009 | Liao |
| 2010/0185611 A1 | 7/2010 | Liao et al. |

OTHER PUBLICATIONS

Sun, "The Java Tutorials, Inheritance", 1995, A Sun Developer Network Site, pp. 1-5, http://java.sun.com/docs/books/tutorial/java/landl/subclasses.html.*

Article entitled "Dates," by Bootstrep, dated 2006, 1 page.

Booth et al. "Web Services Architecture," Feb. 2004, W3C, Table of Contents and Section 3.4.2.2, 6 pages, http://www.w3.org/TR/ws-arch/.

ComputerUser, Definition of "crawler," p. 1, www.computeruser.com.

Donghong et al. "Chinese Language IR based on Term Extraction," Proceedings of the Third NTCIR Workshop, National Institute of Informatics, pp. 1-3.

Larkey et al. "Acrophile: An Automated Acronym Extractor and Server," Department of Computer Science, University of Massachusetts, 2000, pp. 205-214.

Okazaki, "Building an Abbreviation Dictionary Using a Term Recognition Approach," Bioinformatics, Oct. 18, 2006, pp. 1-7.

Okazaki, "Clustering acronyms in biomedical text for disambiguation," 2006, pp. 959-962.

Terada et al. "Automatic Expansion of Abbreviation by using Context and Character Information," Department of Computer Science, 2002, pp. 1-17.

Xu et al. "Using SVM to extract acronyms from text," Soft Comput, 2007, vol. 11, pp. 369-373.

Hawking et al., "Efficient and Flexible Search Using Test and Metadata," CSIRO Mathematical and Information Sciences Technical Report 2000/83, 13 pages.

"Oracle Secure Enterprise Search," Administrator's Guide, 10g Release 1 (10.1.6) B 192002-02, Mar. 2006.

Oracle Corporation, Oracle Database 10g, Oracle High Availability, Sep. 2006, pp. 1-12, Oracle Corp., Redwood Shores, CA, US.

Oracle Corporation, Oracle Secure Enterprise Search 10g, An Oracle Technical White Paper, Mar. 2006, pp. 1-20, Oracle Corp., Redwood Shores, CA, US.

Oracle Corporation, Oracle Secure Enterprise Search 10g, One Search Across Your Enterprise Repositories, Mar. 2006, pp. 1-10, Oracle Corp., Redwood Shores, CA, US.

Song et al., "An Application of Extended Stimulated Annealing Algorithm to Generate the Learning Data Set for Speech Recognition System," Copyright 2001, 5 pages.

U.S. Appl. No. 11/648,981, Non-Final Office Action dated Dec. 11, 2008, 13 pages.

U.S. Appl. No. 11/648,981, Final Office Action dated May 7, 2009, 16 pages.

U.S. Appl. No. 11/649,010, Non-Final Office Action dated Nov. 7, 2008, 12 pages.

U.S. Appl. No. 11/649,010, Final Office Action dated Apr. 17, 2009, 10 pages.

U.S. Appl. No. 11/649,010, Non-Final Office Action dated Oct. 2, 2009, 6 pages.

U.S. Appl. No. 11/649,010, Notice of Allowance dated Apr. 5, 2010, 7 pages.

U.S. Appl. No. 11/649,098, Non-Final Office Action dated Jul. 24, 2009, 12 pages.

U.S. Appl. No. 11/649,098, Final Office Action dated Feb. 19, 2010, 13 pages.

U.S. Appl. No. 11/680,530, Non-Final Office Action dated Mar. 10, 2010 25 pages.

U.S. Appl. No. 11/680,530, Final Office Action dated Jul. 12, 2010 24 pages.

U.S. Appl. No. 11/680,530, Advisory Action dated Sep. 8, 2010 3 pages.

U.S. Appl. No. 11/737,091, Non-Final Office Action dated Apr. 9, 2009, 9 pages.

U.S. Appl. No. 11/737,091, Final Office Action dated Oct. 16, 2009, 9 pages.

U.S. Appl. No. 11/737,091, Advisory Action dated Dec. 23, 2009, 3 pages.

U.S. Appl. No. 11/737,091, Notice of Allowance dated Feb. 25, 2010, 4 pages.

U.S. Appl. No. 12/751,268, Non-Final Office Action dated Nov. 15, 2010, 7 pages.

U.S. Appl. No. 11/680,558, Non-Final Office Action dated Apr. 14, 2009, 15 pages.

U.S. Appl. No. 11/680,558, Final Office Action dated Oct. 9, 2009, 15 pages.

U.S. Appl. No. 11/680,558, Advisory Action dated Dec. 17, 2009, 3 pages.

U.S. Appl. No. 11/680,558, Non-Final Office Action dated Feb. 17, 2010, 15 pages.

U.S. Appl. No. 11/680,558, Final Office Action dated Jul. 8, 2010, 12 pages.

U.S. Appl. No. 11/680,558, Advisory Action dated Aug. 18, 2010, 3 pages.

U.S. Appl. No. 11/680,545, Non-Final Office Action dated Mar. 17, 2010, 27 pages.

U.S. Appl. No. 11/680,545, Final Office Action dated Jul. 19, 2010, 33 pages.

U.S. Appl. No. 11/680,550, Non-Final Office Action dated Feb. 20, 2009, 11 pages.

U.S. Appl. No. 11/680,550, Non-Final Office Action dated Jul. 8, 2009, 12 pages.

U.S. Appl. No. 11/680,550, Final Office Action dated Jan. 8, 2010, 13 pages.

U.S. Appl. No. 11/680,550, Advisory Action dated Apr. 2, 2010, 3 pages.

U.S. Appl. No. 11/680,550, Non-Final Office Action dated Jun. 22, 2010, 13 pages.

U.S. Appl. No. 11/680,550, Notice of Allowance dated Jan. 4, 2011, 8 pages.

U.S. Appl. No. 11/680,559, Non-Final Office Action dated Dec. 8, 2008, 34 pages.

U.S. Appl. No. 11/680,559, Final Office Action dated Jul. 8, 2009, 21 pages.

U.S. Appl. No. 11/680,559, Advisory Action dated Sep. 11, 2009, 3 pages.

U.S. Appl. No. 11/680,559, Non-Final Office Action dated Oct. 29, 2009, 18 pages.

U.S. Appl. No. 11/680,559, Final Office Action dated Mar. 18, 2010, 19 pages.

U.S. Appl. No. 11/680,559, Advisory Action dated May 19, 2010, 3 pages.

U.S. Appl. No. 11/680,559, Non-Final Office Action dated Jun. 23, 2010, 19 pages.

U.S. Appl. No. 11/680,559, Final Office Action dated Nov. 22, 2010, 23 pages.

U.S. Appl. No. 11/680,571, Non-Final Office Action dated Aug. 11, 2010, 11 pages.

U.S. Appl. No. 11/680,571, Final Office Action dated Nov. 24, 2010, 10 pages.

U.S. Appl. No. 11/680,548, Non-Final Office Action dated Apr. 6, 2009, 13 pages.

U.S. Appl. No. 11/680,548, Final Office Action date Oct. 13, 2009, 10 pages.

U.S. Appl. No. 11/680,548, Advisory Action dated Jan. 4, 2010, 3 pages.

U.S. Appl. No. 11/680,548, Non-Final Office Action dated Mar. 15, 2010, 11 pages.

U.S. Appl. No. 11/680,548, Final Office Action dated Aug. 25, 2010 12 pages.

U.S. Appl. No. 11/680,544, Non-Final Office Action dated Mar. 16, 2010, 29 pages.

U.S. Appl. No. 11/680,544, Final Office Action dated Jul. 19, 2010, 39 pages.

U.S. Appl. No. 11/680,556, Non-Final Office Action dated Feb. 25, 2009, 7 pages.

U.S. Appl. No. 11/680,556, Final Office Action dated Jul. 9, 2009, 11 pages.

U.S. Appl. No. 11/680,556, Advisory Action dated Sep. 23, 2009, 3 pages.

U.S. Appl. No. 11/680,556, Non-Final Office Action dated Jan. 19, 2010, 11 pages.

U.S. Appl. No. 11/680,556, Non-Final Office Action dated Jul. 9, 2010, 12 pages.

U.S. Appl. No. 11/680,556, Final Office Action dated Dec. 22, 2010, 16 pages.

U.S. Appl. No. 11/680,510, Non-Final Office Action dated Apr. 2, 2009, 15 pages.

U.S. Appl. No. 11/680,510, Final Office Action dated Sep. 18, 2009, 10 pages.

U.S. Appl. No. 11/680,510, Advisory Action dated Dec. 1, 2009, 3 pages.

U.S. Appl. No. 11/680,510, Non-Final Office Action dated Jan. 12, 2010, 10 pages.

U.S. Appl. No. 11/680,510, Final Office Action dated Jun. 21, 2010, 13 pages.

U.S. Appl. No. 11/680,510, Advisory Action dated Aug. 18, 2010, 3 pages.

U.S. Appl. No. 11/769,245, Non-Final Office Action dated Mar. 5, 2010, 9 pages.

U.S. Appl. No. 11/769,245, Final Office Action dated Jul. 12, 2010, 10 pages.

U.S. Appl. No. 11/769,245, Advisory Action dated Sep. 13, 2010, 3 pages.

U.S. Appl. No. 11/769,245, Non-Final Office Action dated Nov. 23, 2010, 10 pages.

U.S. Appl. No. 11/770,011, Non-Final Office Action dated Sep. 28, 2009 31 pages.

U.S. Appl. No. 11/770,011, Final Office Action dated Apr. 1, 2010, 28 pages.

U.S. Appl. No. 11/770,011, Advisory Action dated Jun. 14, 2010 3 pages.

U.S. Appl. No. 11/770,011, Non-Final Office Action dated Jul. 21, 2010, 25 pages.

U.S. Appl. No. 11/770,011, Non-Final Office Action dated Jan. 3, 2011 25 pages.
U.S. Appl. No. 12/751,268, Notice of Allowance dated Feb. 22, 2011, 9 pages.
U.S. Appl. No. 11/680,559, Advisory Action dated Jan. 28, 2011, 3 pages.
U.S. Appl. No. 11/680,559, Non-Final Office Action dated Mar. 24, 2011, 25 pages.
U.S. Appl. No. 11/680,571, Advisory Action dated Jan. 27, 2011, 2 pages.

* cited by examiner

SELF-SERVICE SOURCES FOR SECURE SEARCH

CROSS-REFERENCES TO RELATED APPLICATIONS

This application claims priority to U.S. Provisional Patent Application Ser. No. 60/778,151 and U.S. Provisional Patent Application Ser. No. 60/777,988, both filed Mar. 1, 2006, as well as U.S. Provisional Patent Application Ser. No. 60/800,737, filed May 16, 2006, each of which is hereby incorporated herein by reference.

This application also is related to the following U.S. Patent Applications, each of which is hereby incorporated herein by reference:

U.S. patent application Ser. No. 11/680,530, filed Feb. 28, 2007, entitled "FLEXIBLE AUTHENTICATION FRAMEWORK;"

U.S. patent application Ser. No. 11/680,558, filed Feb. 28, 2007, entitled "FLEXIBLE AUTHORIZATION MODEL FOR SECURE SEARCH INTEGRATION;"

U.S. patent application Ser. No. 11/680,545, filed Feb. 28, 2007, entitled "SEARCH HIT URL MODIFICATION FOR SECURE APPLICATION INTEGRATION;"

U.S. patent application Ser. No. 11/680,550, filed Feb. 28, 2007, entitled "SUGGESTED CONTENT WITH ATTRIBUTE PARAMETERIZATION;"

U.S. patent application Ser. No. 11/680,559, filed Feb. 28, 2007, entitled "PROPAGATING USER IDENTITIES IN A SECURE FEDERATED SEARCH SYSTEM;"

U.S. patent application Ser. No. 11/680,571, filed Feb. 28, 2007, entitled "SECURE SEARCH PERFORMANCE IMPROVEMENT;"

U.S. patent application Ser. No. 11/680,548, filed Feb. 28, 2007, entitled "LINK ANALYSIS FOR ENTERPRISE ENVIRONMENT;"

U.S. patent application Ser. No. 11/680,544, filed Feb. 28, 2007, entitled "MINIMUM LIFESPAN CREDENTIALS FOR CRAWLING DATA REPOSITORIES;" and U.S. patent application Ser. No. 11/680,556, filed Feb. 28, 2007, entitled "METHOD FOR SUGGESTING WEB LINKS AND ALTERNATE TERMS FOR MATCHING SEARCH QUERIES." and U.S. patent application Ser. No. 11/680,510, filed Feb. 28, 2007, entitled "AUTO GENERATION OF SUGGESTED LINKS IN A SEARCH SYSTEM."

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to systems and methods for locating and accessing electronic content, and more particularly to systems and methods for enabling secure querying across enterprise and other such systems.

A common approach to searching and indexing content, particularly across the World Wide Web, is referred to as "crawling." In order to perform such crawling, a program, script, or module known as a crawler or spider is used to scan publicly available information across the Web. Several search engines use crawling to provide links to data available across the Web, as well as to provide a synopsis of the content available at those links so a user can make a determination of the relevance of each of the links displayed to a user in response to a user typing in a query, typically in the form of keywords entered into a search box in a search page or toolbar. Web crawlers typically create a copy of each page touched by the crawling, such that a search engine later can index the page copies in order to improve the performance of subsequent searches. Indexing typically creates keyword metadata, such as may be contained within a meta-tag field of the copy of the page, which can be accessed by search engines to more quickly make a determination of the content of a page or site. A search engine then can search the entire content of a page or simply search a keywords field.

A crawler typically accepts as input an initial list of Uniform Resource Locators (URLs) or hyperlinks, often referred to as "seeds" in the crawling process, and examines the content at each linked page to determine any URLs present in that page. These URLs then are added to the "list" to be crawled. By following each additional URL in the list, the number of pages being indexed can grow exponentially. Once a page is identified by a crawler, it will be indexed by a search engine or other appropriate tool and then available for querying or searching.

A limitation on crawling is that different data resources have varying degrees and types of security and access mechanisms. While crawlers can easily provide links to public information, there presently is no way to access a number of disparate systems, such as applications across an enterprise, while ensuring only authorized access to data by authenticated users. For example, a user might wish to search for all information across an enterprise related to a current project, whether that information is in data, email, or file form. This would require accepting and tracking security information for each system or application serving as a data source of these types, such as an email system, a file management system, a database management system, etc. The crawler then would have to be programmed to be aware of all the security requirements of each application or source, be able to authorize and authenticate users, and perform a variety of other tasks that drastically complicate and slow down the crawling process.

The problem is exacerbated when attempting to crawl enterprise applications, such as eBusiness or PEOPLESOFT® applications, as these applications do not have simple user role mapping but instead each have a unique security model. Instead of having a single role (e.g., manager, employee, or administrator) that defines the content accessible to a user, such as may be controlled by username and password, the enterprise application business components can have a variety of different attributes that can specify whether a particular user can see a particular action or document, for example. Further, these attributes may change dynamically such that the user can have access to different content each time the user attempts to execute a query or search. For example, a given document D1 might be accessible to an employee E1, but might also be accessible to each level above E1, such as E1's project managers PM1, PM2, etc. While the security must not only account for this security hierarchy, it must account for the fact that people can move groups or levels in the hierarchy at any time. These hierarchies are also not fixed based solely on position with a company, for example, but can be project-based where the members of a project can change continually. This results in what can be referred to as a dynamic security hierarchy, wherein each user in the dynamic hierarchy can have a unique set of security attributes that can result in different content access at any time. Such dynamic access is far too complicated to fit into any standard user role model.

BRIEF SUMMARY OF THE INVENTION

Systems and methods in accordance with various embodiments of the present invention can overcome these and other deficiencies in existing search systems by providing a flexible and extensible architecture that allows for authentication, authorization, secure enterprise search, and other such functionality for an enterprise and other such systems. Such an architecture can provide a simple Internet-like search experience to users searching secure content inside (and outside) the enterprise. Such an architecture can allow for the crawling and searching of a variety or sources across an enterprise, regardless of whether any of these sources conform to a conventional user role model. Such an architecture can further allow for security attributes to be submitted at query time, for example, in order to provide real-time secure access to enterprise resources. Such an architecture can also be used to provide suggested content and links that are relevant to a user query, and can provide for limited lifetimes for security attribute information. A user query also can be transformed to provide for dynamic querying that provides for a more current result list than can be obtained for static queries.

In one embodiment, users requesting access to a secure data source can be authenticated using a flexible and extensible framework operable to accept user identification information in an arbitrary format. When user identification information is received from a user requesting access to a secure data source, the information typically being received at user login, the user can be validated against an identity management system for the secure data source to which the user is requesting access. There can be several secure data sources across the enterprise which can each be associated with a unique identity management system and can each utilize different security attribute information in arbitrary formats. If the user is validated, a callback can be made to the identity management system for the appropriate secure data source to obtain access information for the user, such as current group, role, and/or project information for the user. If the user cannot be validated, the user can be denied access to the requested secure source. The framework can include a plurality of application program interfaces (APIs) that each allow the user to be authenticated against a different application or secure data source.

In one embodiment, a user of a secure system is authorized by obtaining security attribute values for an authenticated user in response to a query from the user. The security values can be appended to the query and passed to an appropriate secure data source in the enterprise. The security values can be for attributes such as grant or deny attributes, and can include information such as role, group, or project information associated with the user. When the results for the query are received from the appropriate data source, based on terms in the query and the security attribute values, the results can be transmitted back to the user as query results. Prior to the query, a plurality of documents and other objects from a plurality of secure data sources across (and outside) an enterprise can be crawled, with each of these objects being indexed and having at least a portion stored locally for searching. The security attributes can be obtained by an identity management system for the appropriate secure data source, and these attributes can be used with the query to return results based on the crawled data to which the authenticated user is determined to have access.

In one embodiment, secure content can be accessed dynamically by first crawling a group of documents across (and potentially outside) an enterprise, then indexing each crawled document and storing a copy of a portion of each crawled document along with document metadata. The document metadata for an indexed document can contain a generic link for that document. A query can be received from an authenticated user of the enterprise relating to the indexed document, and user security attribute values for that user can be stored in the system and accessible for authorization, etc. Upon receiving the query, a callback can be made into the secure data source from which the indexed document was crawled. The callback can include information about the document, such as the generic URL, and the user security attribute values. An updated link then can be received that is built by the secure application or data source using the generic link and the user security attribute values. This updated link when presented to the user can direct the user to results that are appropriate for the user at substantially the time of the query. The secure data source can also return updated metadata for the document, such as an updated title, summary, or language.

In one embodiment, suggested content can be provided for secure search using attribute parameterization. A set of triggering words can be provided for matching, and a plurality of content providers can be registered for providing suggested content resulting from the matching. When a query is received from an authenticated and authorized user, a determination can be made as to whether the query contains any of the triggering words. If so, a link template can be accessed and values can be substituted for parameters in the link template to generate a valid link that contains information such as user information, session information, security information, and information from the query string. Instead of simply returning the link as a suggested link, content can be obtained from a secure source using the dynamically generated valid link. This content then can be formatted and presented to the user as suggested content. If the content is XML content, for example, the XML can be retrieved and a stylesheet applied to generate an HTML fragment that can be displayed to the user in a browser.

In one embodiment, a user-subscribed or "self-service" source can be provided by first providing a template source and an associated target data repository. For example, the template source can be set up without having any specified security credentials. A user then can subscribe to the template source by supplying security credentials for the source. The user can also specify other parameters to be used when crawling the source. A user-subscribed source then can be generated by applying the user-specified security credentials to an instance of the template source. By using a templated source, any changes to the template source can be dynamically inherited by the user-subscribed source. An administrator then can also specify a crawl time for the user-subscribed sources, preventing the users from starting a crawl during peak times, etc.

In one embodiment, the storage time for security credentials for a secure crawl can be minimized by allowing for the selection of a temporary password option for a secure source. An administrator can select the temporary password option, such that when an administrator initiates a crawl of the secure source, the administrator will be prompted for security credentials in order to crawl the secure source. The process can first examine the metadata or other secure source attribute(s) to determine whether the option is selected. After the administrator enters the credentials and is validated, the security credentials are written to temporary storage. The credentials then are deleted from temporary storage as soon as they are no longer needed for the crawl. The credentials can be deleted as part of a callback at the end of the crawl, or when stored in resident memory can simply be deleted at the end of the crawl process. The credentials also can be deleted for any interruption of the crawl process and/or at system restart. If multiple crawls are initiated, the security credentials can be retained until no longer needed for any of those crawls.

In another embodiment, a user can select the temporary password option for that user only, such that when a crawl of the secure source is initiated for any reason, the user will be prompted for security credentials in order to crawl the secure source. After the user enters the credentials and is validated, the security credentials are written to temporary storage. The credentials then are deleted from temporary storage as soon as they are no longer needed for the crawl.

In one embodiment, suggested links and alternate terms for a search query can be determined by first defining a rule index for a secure source operable to be queried by a user. Upon receiving a query from a user, the query string can be tokenized in order to generate a set of tokens. The rules index can be applied to variations of the set of query tokens in order to match the query string with related links and/or alternate terms. Certain of the related links and alternate terms can be selected to display to a user along with results for the query string, using a selection process such as scoring.

In one embodiment, the performance of a secure search can be improved by defining a universal security tag operable to contain user-defined security attributes. When a user-defined security attribute and an associated attribute value are received for a user, the first user-defined security attribute can be associated with an attribute identifier. A universal value can be generated for the universal security tag by combining the attribute identifier with the attribute value. The universal value then can be embedded in a text index operable to be used to determine whether to allow a user access to a secure source. When a query is subsequently received from a user, access to the secure source can be determined using the universal value in the text index before returning results for the query. Irrelevant documents then can be filtered during the search process instead of in a post process.

In one embodiment, link scores for a secure search system, such as an enterprise system, can be improved by first running a query received from a user against a plurality of secure data sources and obtaining search results for the query. A table then can be populated with the search results, excluding any search results that are mapped to same host links. A link score then can be calculated for each search result, and the scored search results can be sorted in the populated table by link score. By excluding same host links from the table, the link scores will not be artificially inflated due to the presence of multiple same host links. The sorted search results can be returned to the user in response to the query.

In one embodiment, user identities are propagated in a secure federated search environment by authenticating a user to the secure federated search environment and obtaining security credentials for the authenticated use. The security credentials can be normalized, such as by using a federated broker, and the user identities from a plurality of secure data sources can be translated. When a query is received for an authenticated user, the query can be translated for each of the plurality of data sources and the translated queries can be propagated to the secure data sources using the translated user identities and normalized security credentials for access. The query results received from the plurality of secure data sources and can be consolidated and displayed to the user in response to the query.

In another embodiment, user identities are propagated in a secure federated search environment by authenticating a user to a single sign-on process of a secure federated search environment and obtaining security credentials for the authenticated use. The user identities from a plurality of secure data sources can be translated, such as by using a federated broker. When a query is received for an authenticated user, the query can be translated for each of the plurality of data sources and the translated queries and security credentials can be propagated to the secure data sources. The query results received from the plurality of secure data sources and can be consolidated and displayed to the user in response to the query.

In one embodiment, suggested links are automatically generated in a secure search system by initiating a crawl across an enterprise including a plurality of secure data sources. Any external link to a data source outside the enterprise that is discovered during the crawl can be stored as a suggested link. If any external link is subsequently discovered to be inside the enterprise during the crawl, the external link can be removed as a suggested link. Relevancy scoring can be determined for each suggested link, such that a subset of the suggested links can be displayed to a user in response to a query based on the relevancy scoring for the suggested links. Keywords can be automatically generated for the suggested links by capturing anchor text associated with the suggested link, capturing text around the suggested link, or traversing the suggested link and capturing text, such as a title, from the traversed link.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 30($b$) illustrates an interstitial page that prompts the administrator to enter temporary passwords for a crawl that can be used in accordance with one embodiment of the present invention;

FIG. 31($b$) illustrates a timeline of multiple sources being crawled, with temporary passwords enabled on the last source that can be used in accordance with one embodiment of the present invention;

DETAILED DESCRIPTION OF THE INVENTION

Systems and methods in accordance with various embodiments can overcome the aforementioned and other deficiencies in existing search and querying systems by providing a flexible, extensible, and secure architecture that can operate across enterprise systems. Such an architecture can provide a simple Internet-like search experience to users searching secure content inside (and outside) an enterprise.

An extensible enterprise search mechanism in accordance with one embodiment provides for the crawling and searching of a variety or sources across an enterprise, regardless of whether any of these sources conform to a conventional user role model. The mechanism allows for security attributes to be submitted at query time, for example, in order to provide real-time secure access to enterprise resources. The user query also can be transformed to provide for dynamic querying that provides for a more current result list than can be obtained for static queries.

Such functionality can be provided by a secure enterprise search system in accordance with a variety of embodiments described and suggested herein. A secure enterprise search (SES) system, such as may include the Oracle® Secure Enterprise Search product from Oracle Corporation of Redwood Shores, Calif., can be a standalone product or integrated component that provides a simple yet powerful way to search data across an enterprise. An SES system can crawl and index any content and return relevant results in a way that is familiar to users, such as is returned for typical Internet-based search results. SES also can provide a query service API, for example, that can easily be plugged into various components in order to obtain a search service for those components.

Figure 1:
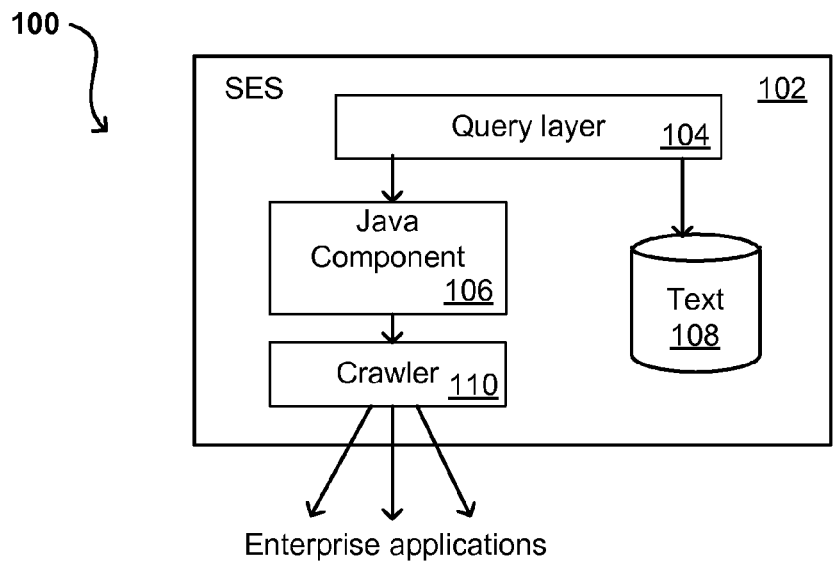
FIG. 1 illustrates an exemplary secure enterprise system (SES) configuration that can be used in accordance with one embodiment of the present invention.

A SES system 102 can utilize the text index of a database 108, as is illustrated in the exemplary configuration 100 of FIG. 1. In one embodiment, a database application accepts documents and generates the lists and other elements useful for text searching. An API allows a user to submit queries, such as text queries, to search documents based on, for example, keywords. The SES system can utilize components such as crawlers 110 to locate and return the appropriate data, such as by locating a Web site and returning contents of a page matching a query, as well as determining the URLs on the page, fetching the next set of URLs, and so on. These crawlers may not only be pointed to Web sites, but can be pointed to databases, applications, or any place else where data is available. Specialized crawlers can be used for each such data source. For instance, a Web crawler can be used for Web sites while a separate file crawler is used to search files. A database crawler can be configured to examine the appropriate tables and records and send the appropriate data back to SES 102. SES thus is concerned with documents and the associated contents, as well as metadata such as who created each document, when the document was created, etc. The metadata can include other flexible attributes, such as a purchase order number for a purchase order document, as well as some security attributes. Crawlers therefore can provide to SES at least three types of attributes, including document data, metadata, and security information.

A query layer 104 can be configured to receive queries from users, applications, entities, etc. These can be any appropriate queries, such as simple text queries entered through a search box or advanced queries. The query layer can convert a user query into the appropriate text queries, making sure security, authorization, authentication, and other aspects are addressed, such that the results are returned to the user based on what the user is allowed to access across the enterprise. This approach can be referred to as secure enterprise search, as an Internet search or other such searches typically done only for public documents using more rigid queries. SES can also allow for searching of public documents, but when accessing secure content SES can ensure that only authorized persons are able to retrieve that content. This can be accomplished using any of a number of different security approaches, such as role-based access and other higher levels of access as discussed later herein. Any of a number of Java components 106 (or other such components) can operate between the query layer 104 and the crawlers 110 in order to control and/or modify the information used for crawling and querying data as discussed elsewhere herein.

Figure 2:
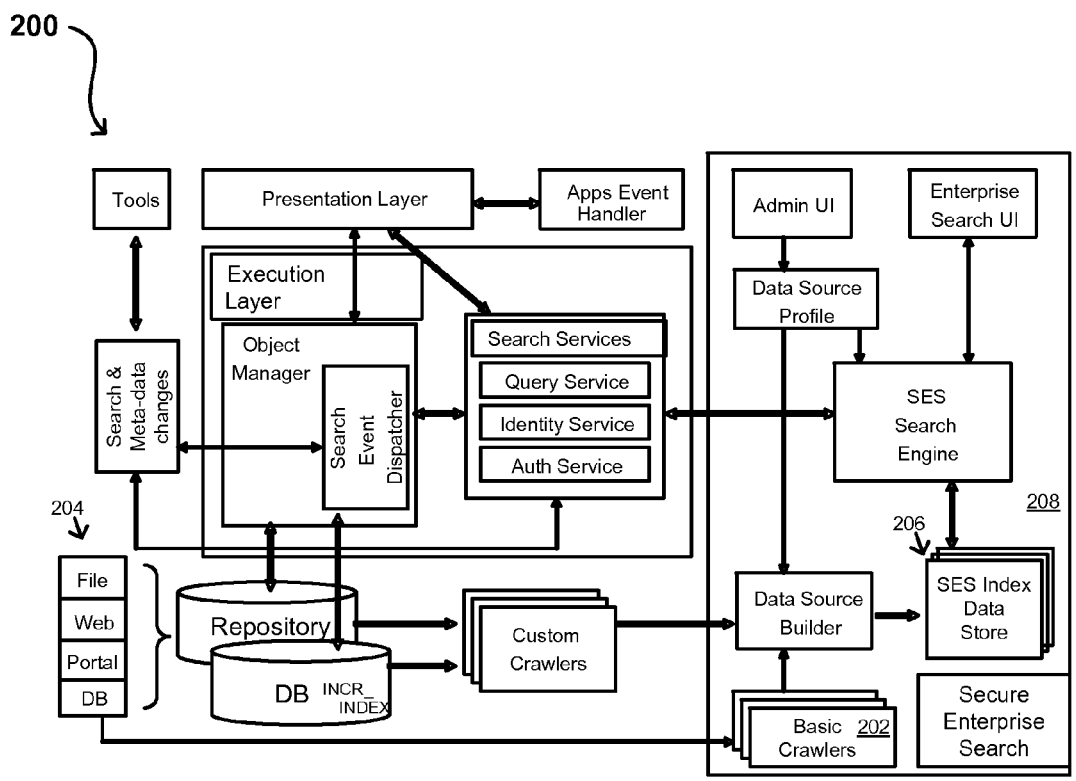
FIG. 2 illustrates an exemplary SES architecture that can be used in accordance with one embodiment of the present invention.

FIG. 2 shows an architecture for an exemplary SES system 200 that can be used in accordance with various embodiments discussed herein to provide a secure platform for user queries, searches, and other such functionality. This architecture includes a crawling component, an indexing component, and a query component. An administration API is available to administer the various components. The crawling component has an extensible plug-in API, which allows various crawlers to be plugged into the SES system. SES can provide basic/default crawlers 202 out of the box for crawling web sources, database tables, file systems, and other such resources 204. An SES data store 206 can accept a document (that may be virtual) and a set of attributes corresponding to that document. The indexing component indexes the document and its attributes using the database text index. The query component 208 takes a user query and applies various search techniques to retrieve relevant search results. The query component also can include various other technologies to enhance the search, such as suggested links, alternate keywords, real-time integration, and other technologies as discussed in more detail below. SES also can federate searches to other registered SES instances.

Security for an SES system can be enforced using an identity management system or directory service, such as the Oracle Internet Directory (OID) available from Oracle Corporation. SES can use an identity management system for a number of operations including user authentication during query time, using approaches such as single sign-on (SSO) and form logic. User authorization can occur at various times, such as during crawls and at query time. At crawl time, OID can be used to determine whether a user or group given by the crawler is valid and can convert the user identity to an appropriate identifier, such as a globally unique identifier (GUID). At query time, the OID can be used to obtain a list of groups belonging to the user. The OID also can be used for functions such as stamping users and/or roles for a data source, as well as managing entity credentials for federation and crawling of various sources. SES in one embodiment can be secure search enabled by registering with OID. The registration process registers the database with OID and also creates an application entity for SES in OID.

Figure 3:
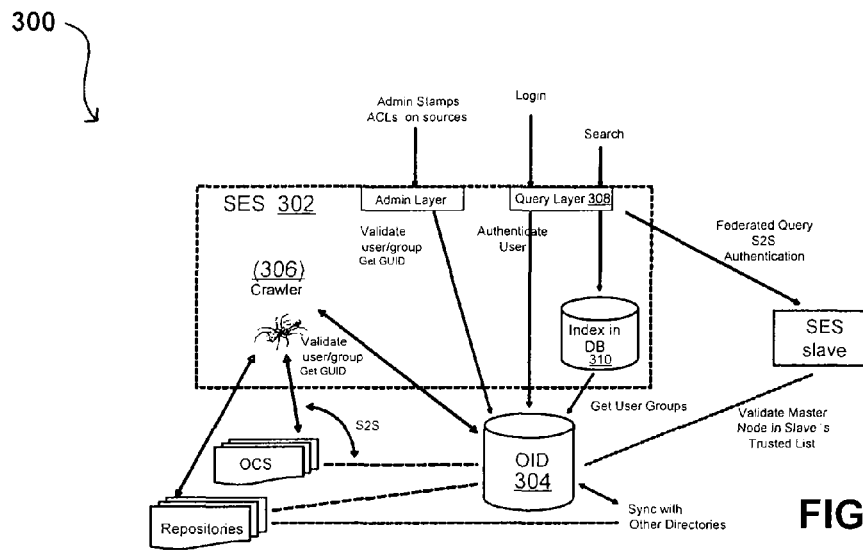
FIG. 3 illustrates an exemplary SES architecture utilizing a directory service that can be used in accordance with one embodiment of the present invention.

FIG. 3 shows an exemplary architecture 300 for using SES 302 with a directory service such as OID 304. In this example, the crawler 306 returns the user or group as a simple name, distinguished name (DN), or GUID. The crawler uses OID to validate the user/group names and convert them to a canonical GUID form. Administration screens can use OID to validate user/groups when the administrator stamps any data source with source-level access control lists (ACLs), and can convert the user/group to the canonical GUID format. When the end user logs into the query application 308, the OID user validation procedures are called to authenticate and validate the user. When a user performs a search through the query layer, the database 310 (e.g., through Xbase) uses OID 304 to retrieve the list of roles/groups to which the user belongs. For secure federated search Broker SES instance (Master) can translate the identity of the logged-in user appropriately for the endpoint SES instance (Slave) based on some mapping attribute in the Identity Management System.

Application searching in such an SES system can be accomplished using a variety of mechanisms. Using a direct navigation mechanism, for example, can allow a user to go directly to a function or action based on keywords. A user entering a keyword such as "W2" should be able to receive a link (or other resource access mechanism) that can take the user directly to the appropriate W2 page for the user. This is accomplished in various embodiments using suggested links or through menu crawls.

Using an information access mechanism allows a user to retrieve relevant application transactional data and static or generated documents in context. This can be achieved by crawling and indexing application data, through real time data access, or by federating to various search engines. The productivity of the search can be further enhanced by integration, wherein the user is able to go to a single screen and obtain information across applications and Intranet repositories. Further, the visualization of information specific to a data source can further enhance the productivity of the end user. For example, instead of showing a standard hit list for a human resources (HR) people result, it might be more useful to show a simple table that contains all the relevant information in an easy-to-understand format. This can be achieved in SES through XQuery/XSLT transformations, for example, that are applied to an XML format of the result.

A challenge facing SES systems involves application security, which is often complex and does not lend itself easily to a simple user/group model. Often there are dynamic security rules that must be applied. Authentication for applications can be accomplished through a mechanism such as single sign-on (SSO) or through the a user store specific to the application. Oracle eBusiness 11i, for example, allows a certain set of users to be enterprise users that are authenticated by SSO, while others are authenticated by the application itself. Systems such as SIEBEL® and PEOPLESOFT® systems also use their own user identity management.

Another challenge involves authorization, which can be specific to each application and can utilize various security attributes to achieve authorization. In a menu search example, such as is used in Oracle eBusiness, a menu system consists of paths and links to functions. The menu system is hierarchical with sub-menus, with each sub-menu being accessible by a set of responsibilities. An end user has a set of responsibilities based on user roles (e.g. a manager role gets a responsibility that allows it to see links for employee records). Thus each menu entry is protected by a list of responsibilities. When an end user logs in, the user can choose a specific responsibility based on the role of the user, which determines the menu items that user can see. One challenge is the desire to show all menu items without the end user having to pick a specific responsibility. Thus it can be desirable to take every menu item and stamp that item with all possible responsibilities associated with the menu item. When the end user performs a search, the list of responsibilities of that user can be found and matched with the relevant items. An eBusiness knowledge base application can consist of documents that are secured by a combination of categories and groups. Users may belong to certain set of categories and or groups. When an end user logs in, the list of categories and groups belonging to the user is used to limit the documents that can be seen by the user. Thus for search purposes, the documents can be stamped with the list of categories and groups associated with the document. During query time, the list of categories and groups for an end user can be obtained and used as a security filter. For a contracts application where contracts include clauses and attachments, the clauses and attachments can be indexed separately.

In SES, access to information can involve crawling and indexing the information content from various application data, suggested content access (integrating with live query results from applications), and federating to other search engines already used by the application. Information access also can include visualizing the information in an easy to understand format. In order to crawl and index application content, one should understand the application's security model. In order to understand the model, it can be necessary to identify the target application to search, understand the objects or data to search and how their security is mapped, identify whether there is a way to inverse the security, and identify the roles/attributes that belong to a given user. Once the application's security model is understood, a crawler plug-in can be written that can obtain the list of virtual or real documents along with the list of users/roles/security attributes for that document. If the security cannot be fully established during crawl time due to dynamic or fast changing security attributes, or if it is desired to check for enforced security between crawls, a query time filter can be used. A query-time filter is a plug-in that typically is called once the search returns results, such that the plug-in can further prune results based on the current security for the user.

A query application layer can be used to authenticate an end user, authorize the user, and perform the actual search. A custom application can be built using a Query API. The custom application then can take care of authentication of the user (login), which may not be necessary if the custom application is embedded inside the target Enterprise Application module. The custom application can authorize the user and obtain a set of valid values for the security attributes for that specific user. These are the values for the security attributes stamped per document during the crawl. The custom application then can build a query filter using that set of attribute values and send that query to the backend. The application can optionally rewrite the display URL if the URL is session specific.

Suggested content can be provided in a way similar to that of the suggested link mechanism, except that the link is actually traversed and the data retrieved from the backend store and displayed to the user. Real time data access requires that the link to the backend provider be registered as a suggested link, whereby the custom query application traverses the link, gets the result, and formats the result appropriately. The backend provider usually returns the results as XML and the result can be formatted easily using XQuery or XSLT. Suggested content can be useful integration for the cases where the backend data cannot be easily crawled and indexed, as well as where the data is highly transactional and hence does not lend itself to a crawl/index approach. Further, real time access can show the latest information that is not otherwise available until the next crawl. For example, in a purchase order case, the data might be crawled once an hour. The real time data access might be used to show results that have come within the hour. Suggested content also can show the most useful information immediately. For example, if the user types in "meeting" as a keyword, it is useful to return any meeting for that user within the next few hours. This is extremely useful, even if the information has already been crawled and indexed.

In an SES system, application search can be deployed in a number of different ways. For example, application search can be deployed in a standalone mode or an embedded mode. In a standalone mode, users come directly to a search screen to search data across applications and Intranet/Internet sources. The users do not have to log in to the target application before performing the search. In the case of the embedded mode, the user logs in to the application module and the application module presents a search box which routes the search to the SES backend and processes the results within the context of the application.

Figure 4:
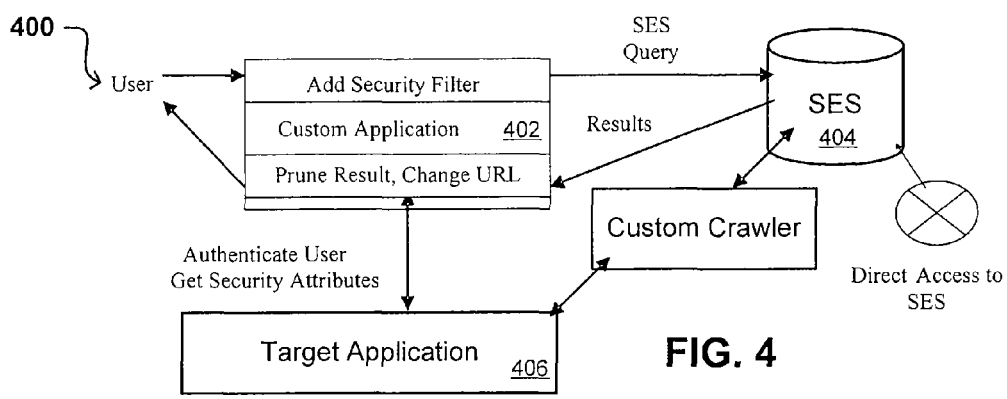
FIG. 4 illustrates an exemplary secure enterprise system (SES) configuration that can be used in accordance with one embodiment of the present invention.

An example of a standalone scenario will be described with respect to the configuration 400 of FIG. 4. In this case, a custom application 402 is built on top of a Query API for SES 404, which the users use for search. The users do not have to be in the context of the target application 406. FIG. 4 illustrates how secure search can be done using a custom application 402 separate from SES 404 and the target application 406. The sample application here is able to authenticate and authorize the user by talking to the Application component. An option to more tightly integrate this approach would involve embedding the custom application code within the target application. Authentication can use OID/SSO if the application also uses SSO. Application authentication can require that the custom application be able to authenticate the user directly against the target application using a form submission to the target application login screen or by using an API to pass in the user credentials. Another identity management system that the application shares can be used, such as where the application user has a mapping to an active directory (AD) that can be used for authentication. In this case, the name of the user may need to be mapped to the username on the target application. Authorization then can require that the custom application get the security attributes for the user for each data source. Each data source is configured so that all documents under that data source use the same set of security attributes. When the user enters any search term for a datasource, a security filter expression based on the set of security attributes can be attached to the query. For example: If {A1, A2, A3} is the set of security attributes used for the documents under a data source DS1. If a user A with values, V1 V11, V2, V3 for the security attributes A1, A2 and A3 respectively, logs in and makes a search, a security filter expression like (A1 value: "V1 V11") AND (A2 value: "V2") OR (A3 value: "V3") can be used appended to the user query.

In an example of embedded mode, the target application can use SES as a service to perform searches within the context of the application. Some of the steps mentioned in the standalone case are not required as the user is already authenticated and authorized by the application. In this case, SES can be installed as a separate product and the target application can use a web service query API to talk to SES. The administration of the crawlers, etc., can still be done using an SES administration API.

Figure 5:
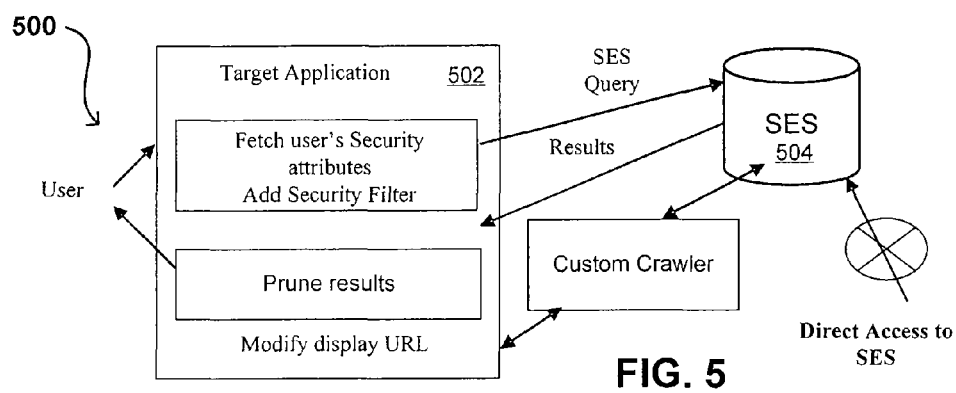
FIG. 5 illustrates an exemplary configuration wherein secure search is implemented by embedding the search in an application context in accordance with one embodiment of the present invention.

FIG. 5 illustrates an exemplary configuration 500 wherein secure search can be implemented by embedding the search for SES 504 from within an application context. Authentication is taken care by the target application 502. Since the context for the user is already established within the application, it can be trivial to get the authorization security attributes for the user. The query application can add the security filters for the search and format the results appropriately. The application can also include addition filters such path information (search under the folder /a/b/c, etc.)

As discussed above, SES can take advantage of a secure federated search (SFS) mechanism. Federated Search can be useful for scaling searches and for integrating results from multiple search instances across components and/or departments, for example. An SES federated search broker can communicate with an endpoint via a SES Web service API. SFS can achieve searching secure content across distributed search instances, which can necessitate propagation of user identity between the instances.

Figure 6:
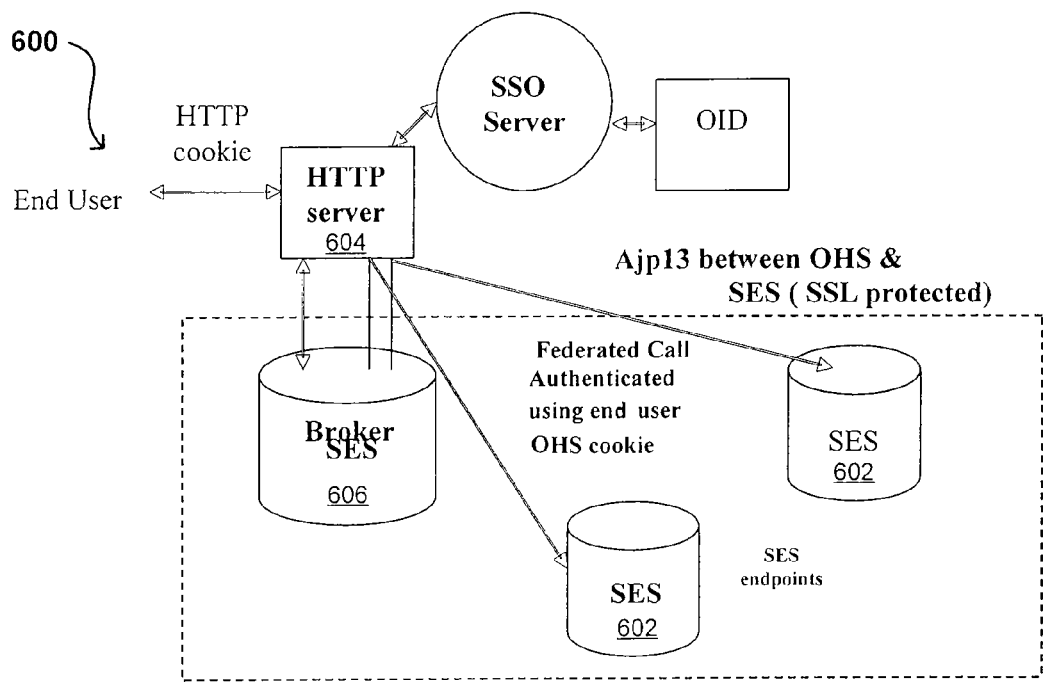
FIG. 6 illustrates an exemplary SES configuration wherein multiple SES instances are virtualized behind a single HTTP server in accordance with one embodiment of the present invention.

In a case where federation is used for scaling, typically there will be a cluster of SES instances that are fronted by a single broker. The data is distributed amongst the broker and endpoints. In an SSO setup, this can be done by fronting the broker and the endpoints slaves using a single HTTP server/SSO server. FIG. 6 shows an exemplary configuration 600 for such an approach. Multiple SES instances 602 can be virtualized behind a single HTTP server 604, which can use an appropriate protocol such as the AJP13 protocol to communicate with the backend. Since a user with an HTTP or SSO server can connect to the appropriate (e.g., AJP13) port on the SES instances 602 and masquerade as a specific person, the channel between the HTTP server 604 and SES instance 602 can be SSL enabled (else the entire OHS+SES instance machines may need to be fire-wall protected). In this setup, the user queries are directed against the broker SES instance 606. Since the broker is protected by SSO, the user is challenged for user credentials and a cookie is set for this domain to store the user's credentials in the session. When the broker makes a federated Web service call to the slaves, the broker 606 propagates the end user cookies. Since the same HTTP server fronts them all, the authentication succeeds and the end user identity is correctly setup in the containers in the endpoint SES instances.

In some scenarios, such as load balancing, the SES instances may be fronted by a pool of HTTP servers. In that case, the HTTP servers can be configured in the load balancing mode which enables them to share the same cookie. Thus the SSO mechanism described above passing HTTP cookies can be used across these HTTP servers. In cases where the same SSO server cannot front the slaves, a proxy login mechanism can be used.

When using federation for integration, which can involve a company wide search, for example, a request can be federated to the various SES instances across the various components and/or organizations and the results integrated. For example, the page "my.oracle.com" has a search box that federates searches to other embedded SES instances in Oracle Collaboration Suite (OCS), E-Business Suite, etc. The distribution of the SES instances may be geographical, organizational, or based on components or software suites. In this scenario, these SES instances do not typically share the same HTTP server. To authenticate to the slaves, the broker uses a proxy login mechanism. An S2S mechanism can be used to establish a trusted relationship between broker and endpoint SES instances.

Figure 7:
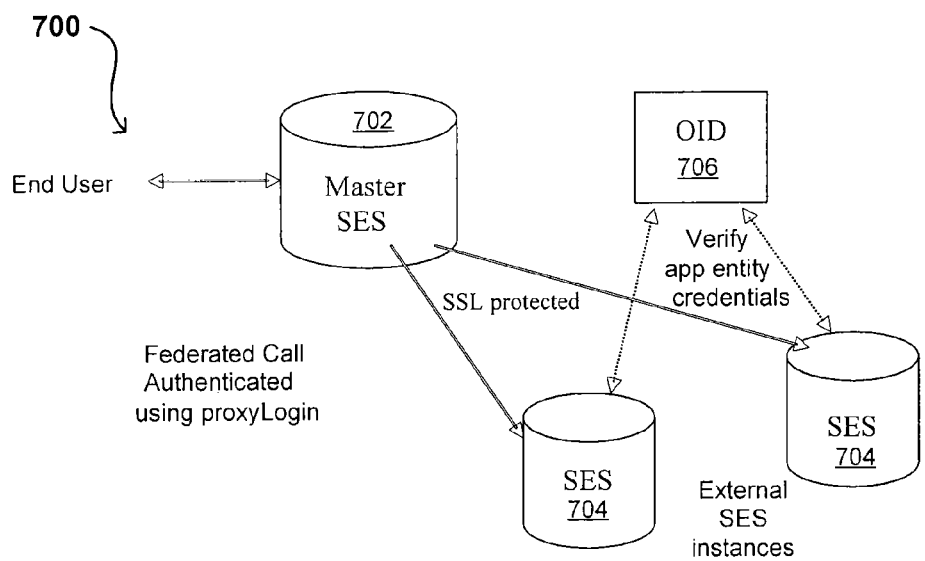
FIG. 7 illustrates an exemplary SES configuration that can be used in accordance with one embodiment of the present invention.

The Web service can expose a method such as proxyLogin( ) that can take in an application entity, password, and the user as which to proxy. This is illustrated in the exemplary configuration 700 of FIG. 7. The broker SES 702 passes the application entity, password, and the value of the authentication attribute (e.g. username) to the endpoint 704. The endpoint then talks to a directory server 706 such as an Oracle Internet Directory (OID) server to verify the application entity credentials and checks to see if this application entity is in the "trusted group." If so, the endpoint switches the identity to that of the passed in user, and the search query is executed. The broker may be protected by SSO, but the Web service end point in the slaves typically will not be SSO protected, as there may be no way for the broker to authenticate through SSO as cookies are not typically shared across HTTP servers. Also, since the application entity password is passed through the proxy login method call, the channel between the broker and endpoints should be SSL enabled in this example.

An SES system also can allow for secure connectors to be built to various data sources and applications. Such application connectors can use any appropriate mechanism, such as Oracle's Service to Service (S2S) mechanism, to establish an application level trust with the target source and to crawl the content either as a super user or proxy as various OID users. In general, a S2S mechanism requires that an application entity be created in OID and added to a group such as a global trusted applications group. The application entity and password can be passed.

Figure 8:
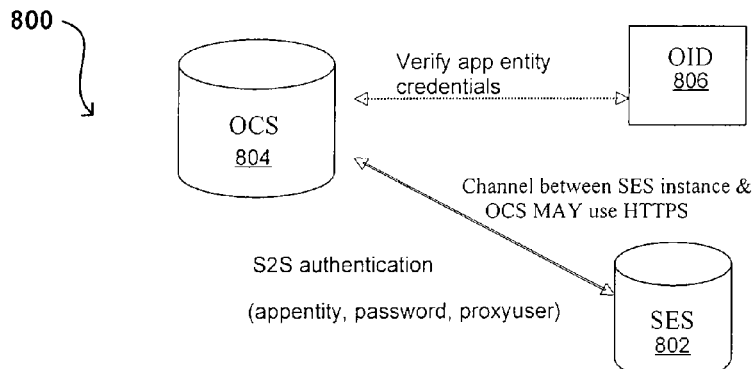
FIG. 8 illustrates an exemplary architecture useful for crawlers that can be used in accordance with one embodiment of the present invention.

FIG. 8 illustrates an exemplary architecture 800 useful for crawlers such as Oracle Collaboration Suite (OCS) crawlers for OCS 804. For a calendar application, the SES application entity 802 can be added to a user proxy privilege group under the calendar application entity. The calendar can provide a jarfile such as "calendarlet.jar" which can take in the application entity, password, and the user as which to proxy, and can pass it in clear text to the backend calendar server. The secure https protocol can be used to provide a secure transport between the crawler plug-in and the calendar server. The crawler plug-in can talk to OID 806, retrieve the list of users, and can proxy as every user and retrieve their calendar data. The calendar data can be access control list (ACL) stamped with the GUID of the proxied user.

Content services can require that the application entity be added to the global trusted applications group. Content services can provide a Web service API to navigate the folder hierarchy along with the metadata and ACLs associated with every document. A special S2S endpoint can be provided for S2S login. The application entity and password can be passed to this endpoint along with an administrative user who has privilege to "read" the entire tree. Again, like calendar, the https protocol may be used to secure the channel. However, unlike calendar, content services can use the digest authentication for the application password, so there is little risk of the password being sent in clear text. Once logged in as the administrative user, the entire tree with the data, metadata and ACLs is fetched and indexed in SES.

Email may not provide any Web service end point. A Web service connector can be deployed on the collaboration server side as an application. The Web service connector can use APIs such as JavaMail APIs to talk with a mail store. This Web service can be protected by S2S. The crawler plug-in can send the S2S credentials and can proxy as different users (similar to calendar), getting their mail and indexes the messages. Each mail message can be ACL stamped with the GUID of the proxied user.

SES also can be embedded as a service within components such as OCS and Portal components, etc. In this scenario, the SES instance is typically fronted by the same OHS/SSO server as the component. The components (e.g., OCS, Portal) use the Web service methods to invoke the search service, using an approach such as SSO or proxy login to establish the end user identity.

When crawling enterprise data, for example, it can be desirable to enforce virtual private database (VPD) policies for the table crawls. In one example, row level security (RLS), also known as fine grained access control (FGAC), allows restricting access to records based on a security policy implemented in PL/SQL. A security policy, as used here, simply describes the rules governing access to the data rows. This process can be done by creating a PL/SQL function that returns a string. The function is then registered against the tables, views, or synonyms to be protected by using a package such as a DBMS_RLS PL/SQL package. When a query is issued against the protected object, the string returned from the function is effectively appended to the original SQL statement, thereby filtering the data records.

Figure 9:
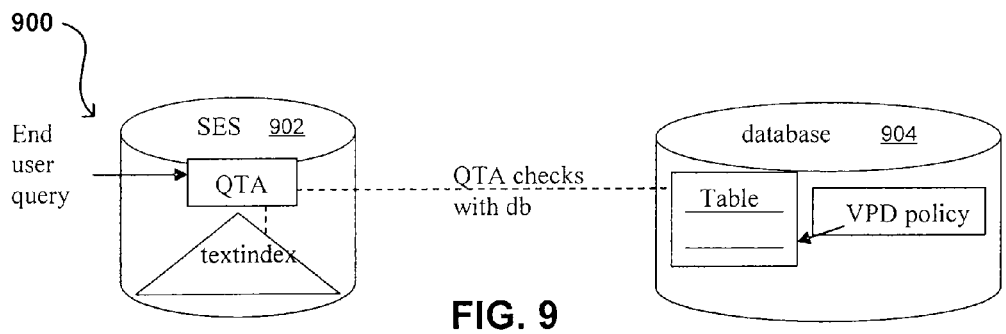
FIG. 9 illustrates an exemplary row-level security configuration that can be used in accordance with one embodiment of the present invention.

While SES can crawl and index table content, a VPD policy for a table enabled is not easily enforceable in SES, as row-level security (RLS) policies can be implemented using arbitrary security policies. Such mapped security schemes may not always be enforceable. Query time filtering (QTF) can instead be used to address these situations. From a QTF perspective, RLS is implemented as illustrated in the exemplary configuration 900 of FIG. 9. In this example, a connection is made from SES 902 to the appropriate database 904 as the query user. The primary key is then obtained that is associated with each document. A test is then run for select privilege on the underlying database record.

A user can provide credentials for the crawler to use in SES. While the repository may be unaware of this arrangement, the crawler can appear to be a normally authenticated user. Templates can be used to define a subscribable unit of secure documents, and can define the location of the repository as well as how to crawl that repository, leaving out the crawling credentials. A user can subscribe to a template in a query application interface. A self service source then can be crawled at a time determined by an administrator, for example, in order to prevent denial of service.

Figure 10:
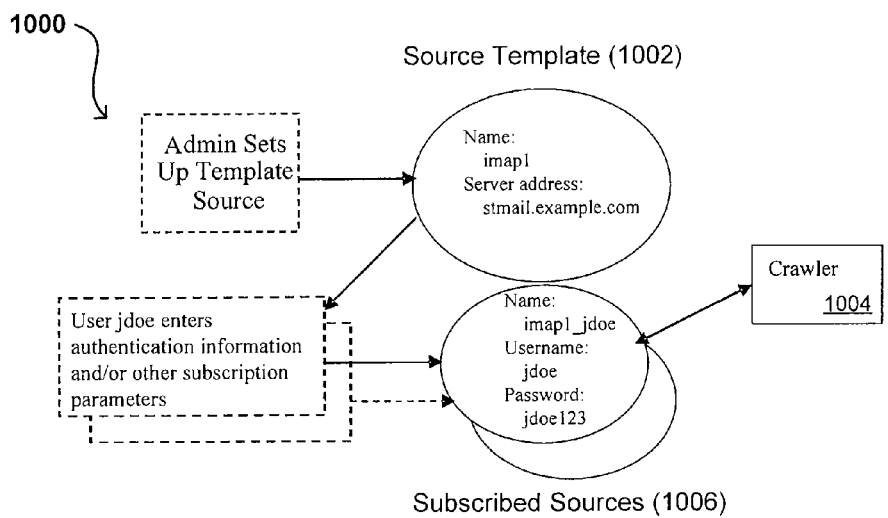
FIG. 10 illustrates an exemplary SES configuration that can be used in accordance with one embodiment of the present invention.

An example will be described with respect to the exemplary configuration 1000 of FIG. 10. Here, an administrator creates a template 1002 for an email source 1006 and defines the email server address. A user then subscribes to the template, and provides a username and password (or other appropriate user identification information). Subsequently, the search system uses an appropriate crawler 1004 to crawl the email account as the user and indexes the messages. These indexed documents are protected so that only the particular end user can view these documents.

When SES indexes documents, SES can also index accessible user information to the document into a text index. The indexed accessible user information then can be used for secure query. For example, when doing text index optimization for ACLs, SES can use a datastore, such as Oracle's User Datastore which is Oracle Text function. The procedure name for User Datastore is datastore_proc. Oracle Text picks up rows in eq$doc one by one, and calls datastore_proc with the appropriate row ID (rowid). Datastore_proc gets the rowid, collects the necessary data from the row, and constructs a string. This string is then returned to Oracle Text and indexed. SES performs additional functions during the construction of the string in order to provide for a field section secure search. For example, a datasource_id can be stored into a tag such as a <D> tag for all the documents. If a document belongs to data source ID 101, for example, then SES can add "<D>101</D>" to the string to be indexed. For documents with the appropriate ACL policy, SES can add a grant or deny tag as discussed later herein. In the case where ace1, ace2, and ace3 are granted for a document and ace4 and ace5 are denied, SES can build a string such as:

<GRANT>ace1 ace2 ace3</GRANT><DENY>ace4 ace5</DENY>

The datasource_id can be added to all the documents. If this document belongs to datasource_id 101, the string can be formed as:

<D>101</D><GRANT>ace1 ace2 ace3</GRANT><DENY>ace4 ace5</DENY>

If the document is assigned to OWNER, the OWNER GUID can be added to the GRANT tag. If the document has no ACL though its ACL policy, the document can be a public document, whereby SES adds 'pub' to the GRANT tag. To get all the ACEs in a given ACL, SES can call a function such as get_generated_acl_internal using, for example:

aces:=eq_acl.get_generated_acl_internal (acl_id)

and then parse aces to get the individual ACEs. This string then can be added to the end of the document. The whole string then can be returned to Oracle Text and indexed.

Figure 11:
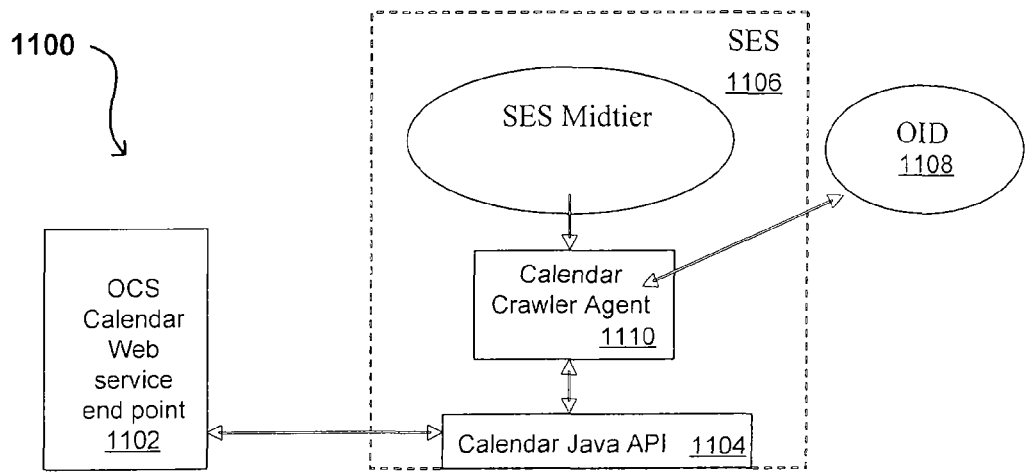
FIG. 11 illustrates an architecture useful for calendar crawling that can be used in accordance with one embodiment of the present invention.

In order to crawl certain resources, such as email and calendaring resources, it can be necessary to create or utilize special crawler plug-ins, such as may be built upon extensible crawler plug-in APIs. For example, FIG. 11 illustrates an architecture useful for calendar crawling. A Calendar resource 1102 can provide a Java API 1104 (e.g., package oracle.calendar.soap), which allows querying of calendar data by the SES components 1106. This Java API 1104 can use a protocol such as SOAP to talk to the calendar backend Web service 1102. An exemplary API requires users to provide username, application entity, and password information, along with the end point with which to talk. The application entity can be registered as a trusted entity under the appropriate calendar entry in an identity management system such as OID 1108. The Calendar crawler plug-in 1110 can contain code to invoke the Calendar Java API. Users can install the calendar type through the Global source type addition, then create sources of this type giving the calendar Web service end point, OID user, and other information, and then crawl the source.

When a crawl of this source is initiated in one embodiment, SES will first call the agent to start crawling and fetch URLs. At this time, the crawler plug-in fetches the first valid calendar user from OID and uses the calendar API to get all the calendar items (events) for this person for a three-month time period, starting from a month prior to the current date. The calendar data is then extracted and various attributes are created. The attributes and properties are returned through a DocumentMetaData object to the crawler plug-in through the fetch call. The body of the document consists of the event title, event description, location, and summary. The body is submitted through DocumentContainer object to SES. The agent checks for the next event in the current user, processes the event, and returns the new URL data object. This process is repeated until all events under the user is fetched, and then can be repeated for the next user obtained from the OID. Once all users and all events are processed, a null is returned for the fetch call, which instructs the SES crawler plug-in to start processing the documents for indexing purposes.

Figure 12:
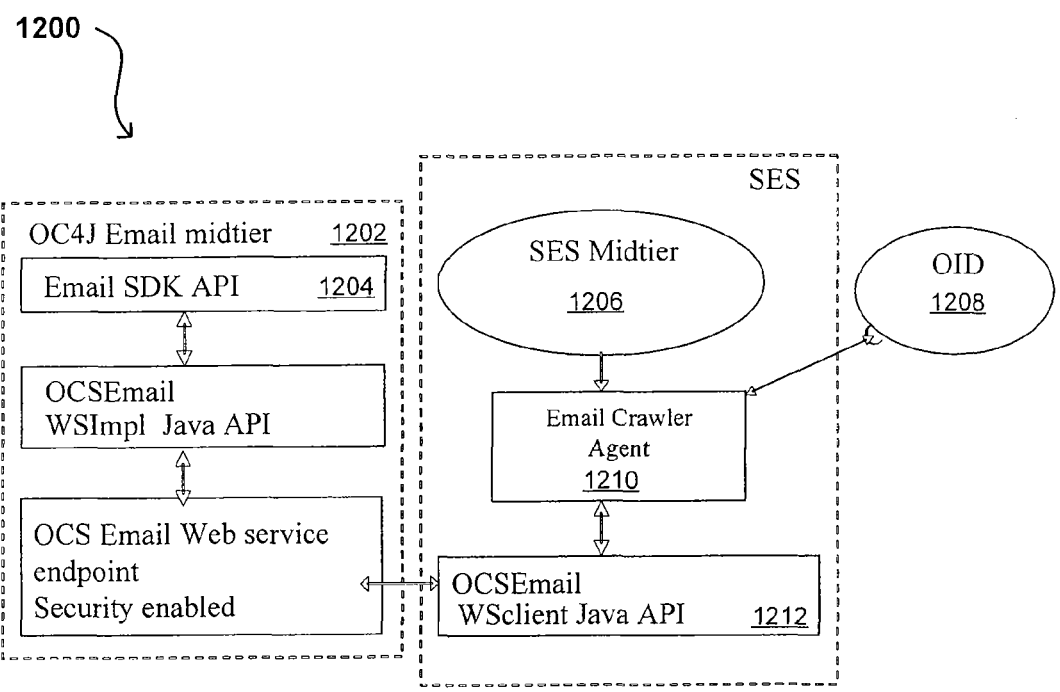
FIG. 12 illustrates an exemplary architecture useful for email crawling that can be used in accordance with one embodiment of the present invention.

FIG. 12 illustrates an exemplary architecture 1200 that can be used for email crawling in accordance with one embodiment. An email package 1202 such as OCS Email may not provide a Web service API for email. For example, OCS Email provides an email SDK API 1204 that is an implementation of the JavaMail API. In order to support this as a remote deployment, Java RMI, Web services, or another appropriate package may be employed. Web services is the current standard format being used for content services, calendar, and other OCS products, and is supported by the application tier, such that Web services typically is used to communicate with the remote email system. A Web service server can be deployed on an SES mid-tier 1206 that runs the email server. This may be protected by a basic authentication with SSL, digest authentication, or S2S mechanism. If S2S is used, the SES application entity can be registered in OID 1208 and added to the Trusted Applications Group in OID. The Email crawler plug-in 1210 contains code to invoke the client API 1212. Users can install the OCS email type through a global source-type addition, such that they are able to create sources of this type giving the email Web service end point, OID user, and other such information to crawl the source.

When a crawl of this source is initiated in this example, SES will first call the agent to start crawling and fetch URLs. At this time, the crawler plug-in fetches the first valid email user from OID 1208 and uses an API such as the OCSEmail-WSClient API 1212 to get all the email folders and download all messages in the folder. The SES crawler will add one DocumentMetaData object which contains the URL for each message or folder to its queue. The DocumentMetaData is returned through the fetch call later when the plug-in checks for the next message in the current user. It then processes the message by downloading the body. The email body is submitted through DocumentContainer object by the crawler plug-in. The crawler framework can handle the email parsing including extracting the attributes like "author", "from", "to" and process the attachments. This process is repeated until all the messages under all folders under the user are fetched, then is repeated for the next user obtained from the OID 1208. Once all users and all events are processed, a null is returned for the fetch call, which instructs the SES crawler plug-in to start processing the documents for indexing purposes.

Flexible Authentication and Authorization

As discussed above, secure search across enterprise applications can require authorization of the information being retrieved for an authenticated user. Traditional security models utilize user and group entities to represent the subjects and access control lists (ACLs) to represent security policies. This model does not address the requirements for secure search across a variety of disparate systems, modules, and resources across an enterprise. For example, a Web business application may use a custom paradigm instead of simply defining users and groups. Further, security policies may change frequently, and an approach is needed to capture these policies in a timely manner while providing efficient and acceptable performance. While query-time authorization can provide dynamic checking, such authorization can pose significant performance degradation problems due to the high cost of passing each document through a Java filter plug-in or other such component.

A flexible authorization mechanism allows crawlers, as well as documents, to indicate certain security attributes. In the case of a contracts crawler, for example, the crawler can indicate that there are two associated security attributes such as "Category" and "Visibility," which can receive values during crawl time. For a given document D1, the associated security attributes can specify that any user or group with attribute Category value C1, C2, or C3 can access this document, as well as any user or group with attribute Visibility value V1 or V2. In some cases, a user or group must have one of these Category values and one of these Visibility values to access a document. The crawler can provide these security attributes, which can be indexed internally. At query time, a callback mechanism can be used so that when a user logs in, the callback mechanism can be used to obtain the Category and Visibility values for that user. These attributes then can be associated with any query in order to determine dynamically and at query time which documents are accessible to the user.

In one embodiment, all the Category and Visibility identifiers for a document can be stamped or fixed for that document, so that it is simply a matter of determining the attribute values for the user at query time. In a case where roles or security hierarchies are not static, such as is the case for employees or project teams, for example, the entire hierarchy cannot be stamped as there may be changes between crawls and/or queries. By using the callback mechanism, an indenter such as employee ID can be used a query time to determine all other users or groups that have access, as well as which groups, projects, etc., that are currently associated with the user. This information then can be used to return the result.

Figure 13:
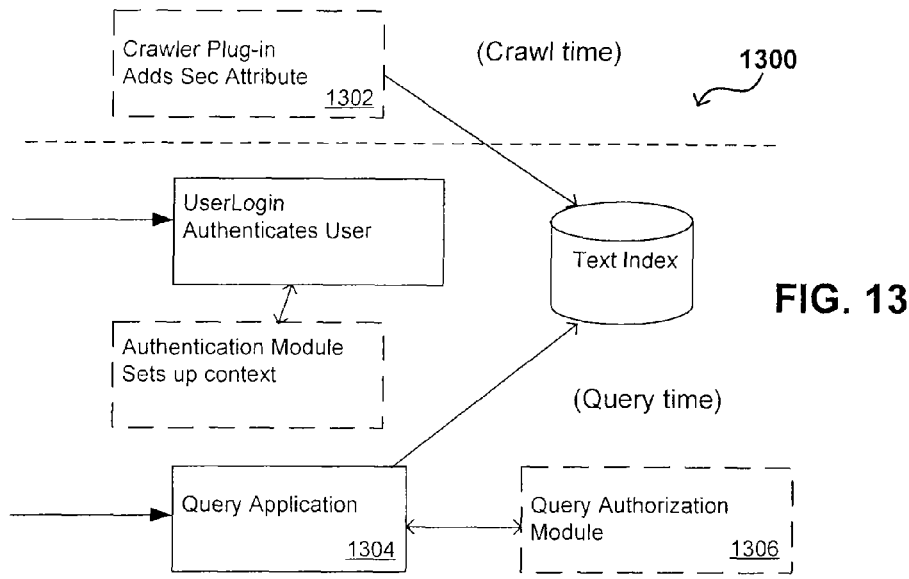
FIG. 13 illustrates an exemplary architecture including a crawler plug-in that can be used in accordance with one embodiment of the present invention.

FIG. 13 illustrates an exemplary architecture 1300 including a crawler plug-in 1302, which can provide the name of the security attribute that the crawler uses at crawl time, as well as the values for the associated attributes. For each document, the crawler can indicate the values for security attribute S1, for example, as it is desirable to not show the security values as attribute values in the search results, the security values can be hidden. The crawl plug-in 1302 can provide the tag names and the associated values for each document. At query time, the user logs in and then can perform a query using the query application 1304. At login time, which can take a period of time due to the occurrence of callbacks, the user can be authenticated as discussed elsewhere herein, such as by validating username and password, for example. Callbacks for authorization then can be performed to obtain the values for the security attributes for that user. When a query is subsequently received from the user, the values for the security filters can be obtained from the authorization modules 1306. The security query then can be appended automatically to the original user query. For a user searching using a keyword, the query can be appended with security attribute information such as c=$date and d=$userID, for example. This tagging of the query with security information happens transparently to the user, and the user is unable to view the appended attribute values.

An initial user query might search for results related to "Company A." From the authorization process, it may have been determined that the user has security attribute values (C1 or C4) and S2. The query thus can be re-written to say:

"Oracle" AND ((C1 or C4) IN C) AND (S2 IN S)

where C and S are security attribute tags. Such an approach can guarantee that no one can thwart the security due to the level at which the security is being enforced.

In addition to the types of tags discussed above, referred to herein as GRANT tags, a user might also have associated at least one DENY tag, wherein a document can be available to everyone in a group except for a certain user, everyone in a company except a certain group, etc. In this case at crawl time values can be passed for tag C where C1 and C2 are grant attributes and C3 is a deny attribute. If a query later is received with a value for C3, then access should be denied to that document for that user or group. At crawl time the crawler is able to determine that certain tags are grant attributes and certain tags are deny attributes. The values passed at query time then can be used to determine whether to provide access.

In one embodiment, security attributes or type "GRANT" or "DENY" are stamped onto documents at crawl-time. These attributes are stored in FIELD sections in the search index along with the document. At user login time, filter such as a Java plug-in filter (e.g., QueryFilterPlugin) provides security attribute values that represent the current user. A security filter, such as may be in the form of a stored query expression (SQE), is generated to represent the user, and filter is used along with the search query to retrieve documents securely. Only documents with security attributes matching the security filter are returned.

Figure 14:
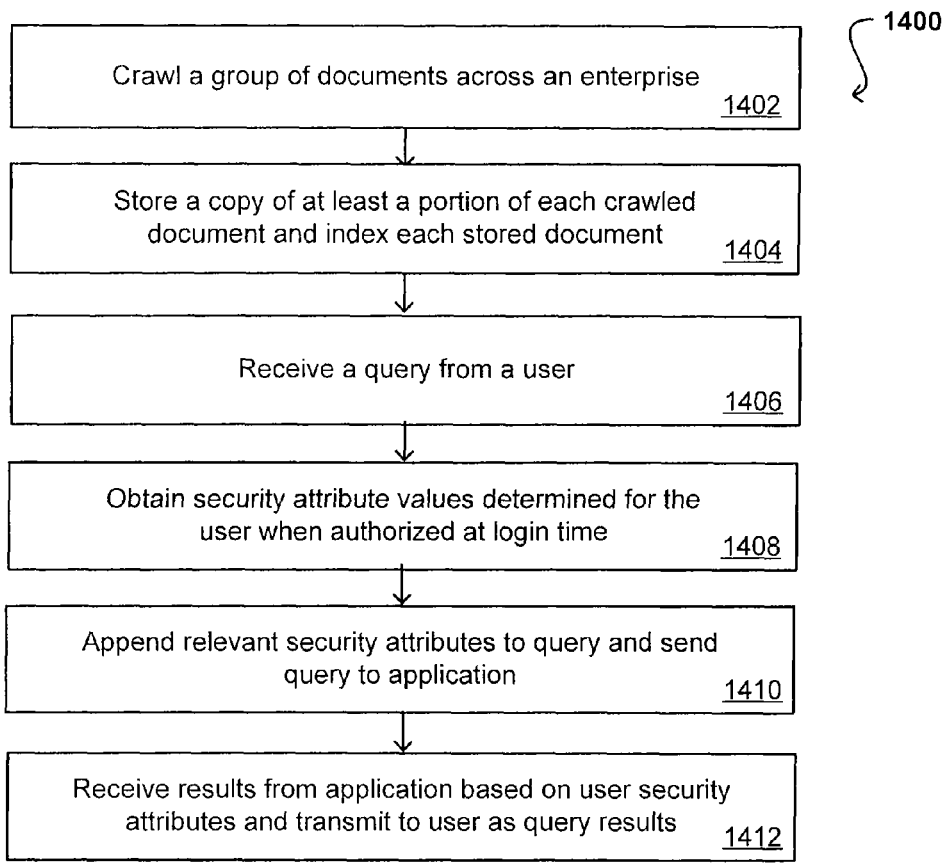
FIG. 14 illustrates an exemplary method that can be used in accordance with one embodiment of the present invention.

Such a flexible and extensible authorization model allows secure search to work with a more diverse number of data repositories and other resources. Flexible authorization can also rely on flexible authentication to determine and accurately identify a user. As illustrated in the exemplary steps 1400 illustrated in FIG. 14, an SES crawler can crawl a group of documents (or other data sources) across an enterprise 1402, and can further crawl documents outside the enterprise. A copy of at least a portion of each crawled document then can be stored and accessible to SES, and each such document can be indexed appropriately 1404. When a query is subsequently received for a user 1406, the associated security attribute values obtained for the validated user are obtained 1408. These security values then are appended to the user query and passed to the application 1410. Results are received from the application based on the security attribute values for the user, and are transmitted to the user 1412. As discussed herein, the user can be shown documents to which the user has GRANT access, for example, and denied documents to which the user has DENY access.

Before authorizing a user to have search access to secure data, such as by using a flexible authorization mechanism described above, the user must be authenticated in order to validate the identity of the user requesting access. A secure search system must be able to authenticate users, such as against an identity management system. In existing systems, a single vendor of identity management systems was chosen and the search system was permanently linked with the vendor systems for authentication. Typical user authentication approaches involve communications with a number of directory servers, a large number of usernames and passwords are stored, then verifying the correct username/password combination. When the username/password pair is validated, the user is determined to be authenticated. A problem with such an approach for enterprise applications is that applications can each have their own database tables where user identity information is stored, and there are a number of different directory and non-directory servers that do the authentication for these applications, such that this single model is insufficient for a user across all these enterprise applications.

Systems and methods in accordance with embodiments of the present invention can address these and other issues by providing a flexible and extensible authentication architecture. A flexible authentication framework in accordance with one embodiment is an abstraction of an identity management system utilizing a two-tier hierarchy that abstracts the notion of users and groups. The framework consists of a public interface defining generic authentication and validation activities for an identity management system, and a security module for the search system that is implemented internally using this generic interface. A concrete implementation of the public interface based on a specific identity management system permits the search system to perform authentication and validation activities through that identity management system. This can be done in the field without any software changes to the search system by registering name of the concrete implementation class with the search system through an administrative interface. Such a search system is not tied to a fixed identity management system, and virtually any system that can authenticate users can be used as an identity management system.

Similar to the flexible authorization architecture discussed above, a flexible authentication architecture can include a set of APIs for SES, whereby user identification values can be passed at login time to the appropriate application to validate user identity. Such an approach allows any new identity management system to easily be added into the SES environment by simply adding a plug-in to obtain user identification information from the service and validate the user identification information. This flexible approach to passing user information can be accomplished similar to that discussed above with respect to flexible authorization. In one embodiment the set of authentication APIs at the time of user login makes sure the user is valid, determines groups to which the user belongs, roles for the user, etc. The system can obtain user role information at the time of validation, or in response to a callback after the user is validated.

Figure 15:
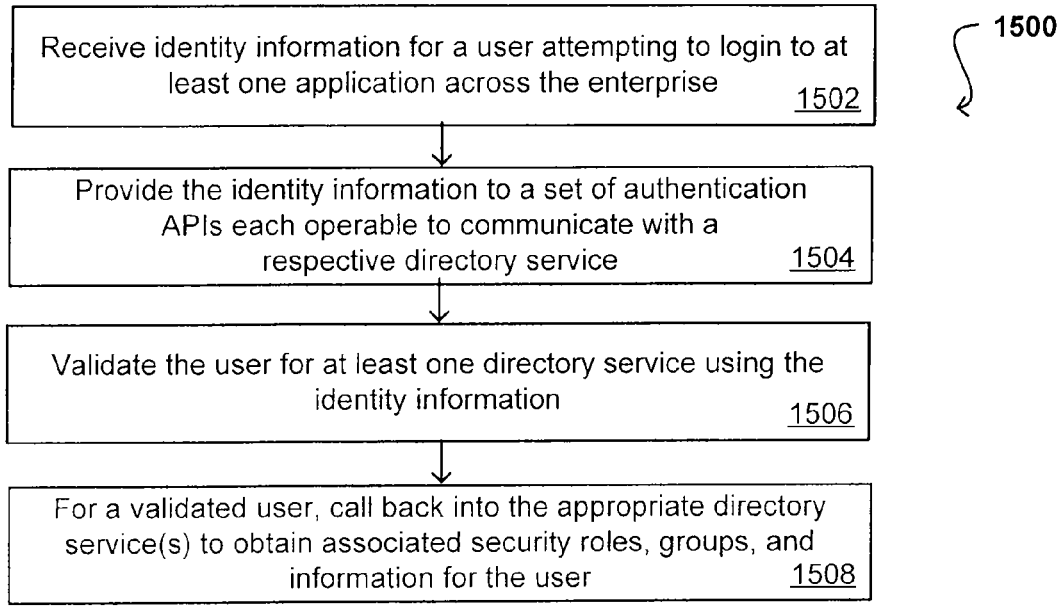
FIG. 15 illustrates an exemplary method that can be used in accordance with one embodiment of the present invention.

FIG. 15 shows steps of an exemplary method 1500 for authenticating a user in accordance with one embodiment. In such a method, identity information is received for a user attempting to log into the system 1502. This can be any arbitrary information used by any identity management system to validate a user. The identity information is provided to a set of authentication APIs that each are operable to act as an interface for a respective identity management system 1504. The user is then validated for at least one identity management system 1506, else denied access to the secure enterprise system. For a valid user, a call back is made into the appropriate identity management system(s) to obtain security roles, groups, and other information associated with the user 1508. It is understood that this information can change over time and may need to be refreshed as discussed elsewhere herein.

By making the authentication and authorization models flexible, the search system can handle not only user/group identification models but can handle a variety of different identification and authorization schemes. In one example, a hard dependency on OID and GUID-based ACLs can be removed through use of the flexible, extensible framework, which in one embodiment can allow customers to implement a custom interface to a directory (a 'Identity Plugin') and connect SES to that directory via the plug-in. Likewise, GUID-based ACL stamping can be replaced by Authorization plug-ins that permit customers to define their own security model for each source.

Figure 16:
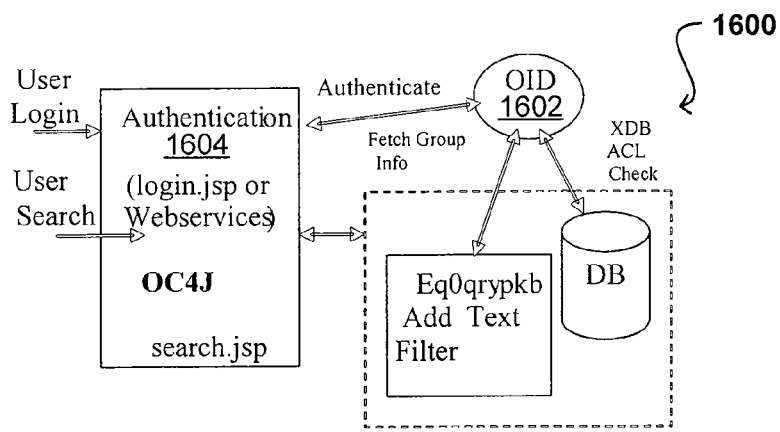
FIG. 16 illustrates an exemplary configuration wherein authentication of a user is performed using an authentication module in accordance with one embodiment of the present invention.

Current authorization models would require SES to first be registered to an OID server in order to perform secure search. At crawl time, the crawler provides ACLs which indicate which users can access a document. The ACL consists of grants and denies to individual users or groups all of which must exist in OID. The ACL grant and deny information is pushed into the text index in the form of text attributes EQGRANT and EQDENY. Optimization is done in the case of datasource level ACL to only publish the datasource id to the text index to prevent re-indexing of the entire source in the case of ACL changes. As shown in the exemplary configuration 1600 of FIG. 16, authentication of the user is performed using an authentication module 1604, such as may rely upon form authentication or in the case of SSO, using the SSO authentication. In all these cases, the user GUID is obtained from the OID server 1602 and the secure search is made. For the search itself, the groups for the current user can be obtained from OID 1602 and a query such as ((PUBLIC OR <userguid> OR <group1> OR <group2> . . . ) WITHIN EQGRANT and NOT (PUBLIC OR <userguid> OR <group1> OR <group2>) WITHIN EQDENY) added to retrieve all documents with the right grants and no deny privilege to the specific user or group. The result can be further filtered using an XDB ACL mechanism at the row level, which again talks to the OID server to retrieve the group information for the user.

A flexible, extensible approach then can rely primarily on two main components: a flexible authentication module and a flexible authorization module. An authentication module is responsible for validating and authenticating users, while the authorization modules provide a mechanism for controlling document access based on arbitrary security attributes.

A principal responsibility of an authentication module in such an embodiment is to authenticate and validate users and groups against an identity management system. These modules can replace an existing authentication framework, such as may depend explicitly on OID. A customer can implement their own custom identity plug-in to provide an interface between SES and any identity management system that suits their needs. SES can provide a default implementation so that existing implementations will continue to work without change, and datasources that rely on existing will not have to do anything differently. In one embodiment, only one identity plug-in is active at a given time, the plug-in being responsible for all authentication activities throughout the application. A developer interface for identity plug-ins can assume a hierarchical structure based on users and groups. Individual data sources requiring authorization based on the actual user/group model implemented by the currently active identity plug-in can achieve their needs without additional work. This will be referred to herein as an identity-based security model.

For user-defined data sources with authorization requirements that do not fit the user/group model, authorization plug-ins can be used to provide a more flexible security model with authorization based on security attributes similar to document attributes. Authentication can still be handled by an identity plug-in. This will be referred to herein as a user-defined security model. With an authorization plug-in, a crawler plug-in can add security attributes similar to document attributes. The values for the security attributes can be indexed in FIELD sections, for example. The authorization plug-in can be invoked at login time, as shown in FIG. 13, discussed above, to build security filters that will be automatically appended to the query string. These security filters can be applied against the values of the security attributes for each document. Only documents with security attribute values that match the security filter will be returned to the user. In this way the GRANT and DENY attributes are opened up to admin and data source implementers.

There are several advantages to such a flexible, extensible mechanism, as registration with an identity management system or directory service, such as OID, is not required. Further, an Admin password for the directory may no longer be required. A plug-in then can be used in any identity management system, including databases, files, tables, etc., for authentication. Such a mechanism also allows for creating custom authentication code for connecting to different directories, as well as custom authorization methods that are not restricted to users and groups in the directory. If any of the authorization plug-ins cannot self-authorize, or if there are errors when returning the filter for the query, the data from that datasource(s) can be silently dropped. The query log then can indicate the exception stack traces. This behavior can be similar to that of query time authorization.

Other advantages include the ability to allow a flexible authentication scheme to be able to plug-in any authentication module. Such systems can be independent of database technology such as Xbase, and can allow security attributes to be directly associated with data sources, as well as providing a way to resolve user authorization to entire data sources. Such a system can provide for an identity-based security model using only an authentication module, can allow crawler plug-ins to supply security attributes in lieu of user/group ACLs, and can allow for a flexible authorization scheme by which hits from a user-defined data source can be filtered based on the values of security attributes provided by the crawler. Such systems also can utilize large security filters, which can be necessary for cases where the security filters provided by the user are quite large, such as in the case of HR applications.

Secure search is enabled in one embodiment by activating an identity plug-in. An admin application allows a user to add new Identity plug-ins, which can emulate the OID or any other identity management system. The identity management system can be a simple set of database users and roles, a file based JAZN plug-in, a proper LDAP directory, etc. New plug-ins can be registered at any time, and inactive plug-ins can be deregistered at any time. Authentication in this embodiment will not register the database with the directory server, but will simply record the attributes such as host, port, username, and password to connect to the directory. An admin can create a user or application entity anywhere on the directory and assign appropriate credentials. The app entity or user may need enough privileges to perform Validate user operation to validate logins.

In order to implement a user-defined security model, a crawler plug-in manager can implement an interface such as a UserDefinedSecurityModel interface, which provides a method that returns the name of the class implementing an authorization manager interface, and the names and types (e.g., GRANT or DENY) of the security attributes used to build the security filter for a given user. All security attributes can be required to have string values. The crawler plug-in can simply set the attribute values corresponding to each security attribute. Security attributes Values can be stored in a text index using field sections, or can be stored using MDATA sections from field sections. Values in field sections are tokenized. To avoid generating multiple tokens from one security attribute value, certain constraints for security attribute values can be set. When the crawler accepts a document which has invalid security attribute values, the crawler rejects the document and logs the error message to the log file.

In order to access secure search, users typically will be required to login, such as through a form login page, a Web service API, or through a single sign-on mechanism. These or other methods can call an Identity plug-in module, passing in the username and password or other identifying information. When authenticating with a plug-in, a configurable timeout can be used to handle cases in which the Identity plug-in does not return after a specified period of time. If such a timeout occurs, an error message (e.g., "Unable to authenticate") can be displayed to the user.

After login, document-level access control can be enforced with a combination of indexed document metadata and security filters that operate on this metadata. In the case of identity-based security, the metadata can be communicated via document ACL objects, and a default global security filter can be generated from data provided by the active identity plug-in. In the user-defined security case, the crawler plug-in can supply values for document security attributes, and filters can be provided by associated query filter plug-ins.

At the startup of an exemplary query application, the names of the Authorization plug-ins are obtained and new instances of each Authorization Manager are created. The Authorization Managers are initialized with the parameters supplied in the admin screen at source creation time. Every time a user logs in, and subsequently whenever the security filters are invalidated, authorization plug-ins are instantiated with the user name and Servlet Request being passed in. An authorization plug-in serves as a manager for both the query filter plug-in interface and a query time authorization result filter plug-in. The AuthorizationManager interface can be initialized with parameter values configured from an Admin tool. The AuthorizationManager can also serve as a factory for the query filter and result filter plug-ins.

A query plug-in interface can return the security attributes values that correspond to the currently logged in end-user. These can be used to construct a user-defined query filter string to be added to the Text query. For example, if "resp" is a grant security attribute for responsibilities and if User1 is logged in, then QueryFilterPlugin.getSecurityValues ("resp") should return an array of values corresponding to the responsibilities of User1. These values can be used to build a filter to return the documents authorized for User1 and her responsibilities.

Figure 17:
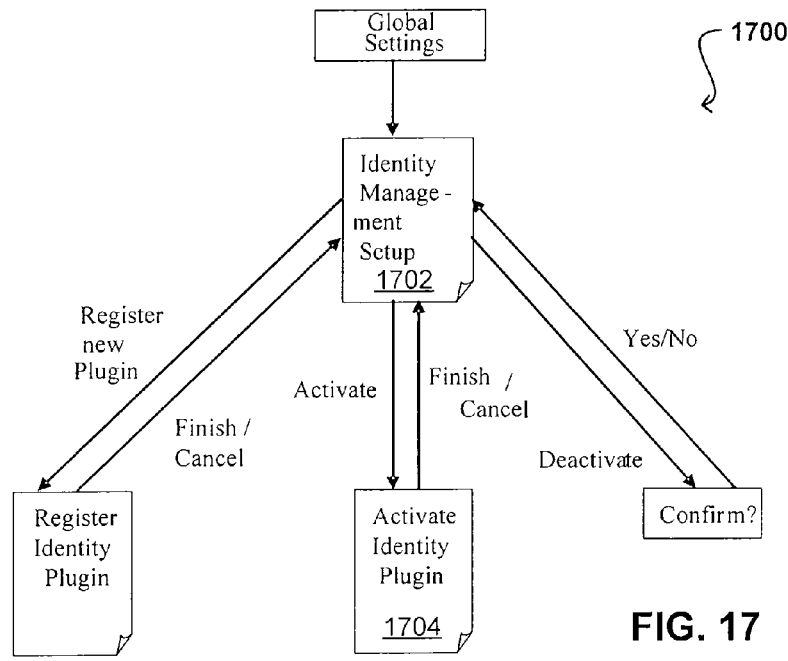
FIG. 17 illustrates an exemplary method that can be used in accordance with one embodiment of the present invention.

In order to administer Identity plug-in settings, an admin user interface can be provided. Such an interface can have a flow 1700 as illustrated in FIG. 17. The main page for managing the Identity plug-in in this example is the Identity Management Setup page 1702. The admin user can view the details of the current plug-in (if any), register new plug-ins, activate a registered plug-in, deactivate the currently active plug-in, or delete inactive plug-ins. An SES system can include a pre-registered identity plug-in for resources such as OID. When not connected, the Identity Management Setup page displays the available (i.e., already registered) plug-ins. The admin user can select an available plug-in and remove or activate that plug-in. The Remove command will remove the selected plug-in. Clicking on the Activate button will take the user to the activate page 1704 for the selected plug-in. The admin user can also register a new plug-in by selecting 'Register New Plug-in', which goes to the Register Plug-in page. The register plug-in page allows the admin user to register new Identity plug-ins. This can be done regardless of the connection state (i.e. whether or not a plug-in is currently active). The user must enter the class name and jar file for the Identity Plug-in Manager. The jar file containing all the classes must reside in a search/lib/plugins directory, for example. Clicking on Cancel returns the user to the Identity Management Setup page without registering the plug-in. Clicking on Finish will register the plug-in if the provided information is valid, and return the user to the Identity Management Setup page. If the user clicks on Finish but the information is not valid (e.g. class can't be loaded), an error page is shown indicating the nature of the failure. The combination of class name and jar file name for each Identity plug-in manager must be unique.

When the admin user selects a registered Identity plug-in and clicks on Activate, the user is taken to the Activation page. The class name, jar file, version, and description for the selected plug-in are displayed. The user then enters the values for the parameters needed to initialize the Identity Plug-in Manager class. The authentication format (the format used to log in to the query app) must also be specified here. Clicking on Cancel returns the user to the Identity Management Setup page without activating the plug-in. Clicking on Finish will activate the plug-in if the provided information is valid, and return the user to the Identity Management Setup page. If the user clicks on Finish but the information is not valid, an error page is shown indicating the nature of the failure.

When a Identity plug-in is active, the Identity Management Setup screen will display a connection message, as well as the parameters and authentication format for the active plug-in. 'Deactivate' button will appear. Upon clicking the deactivate option, the user will be taken to a confirmation screen. Depending on the confirmation, the directory may not be deactivated. In either case, control returns to the setup screen in the corresponding state (connected or not connected). The Activate button will be disabled when there is already an active plug-in. If the user tries to select and remove the currently active plug-in, an error page will be displayed.

Figure 18:
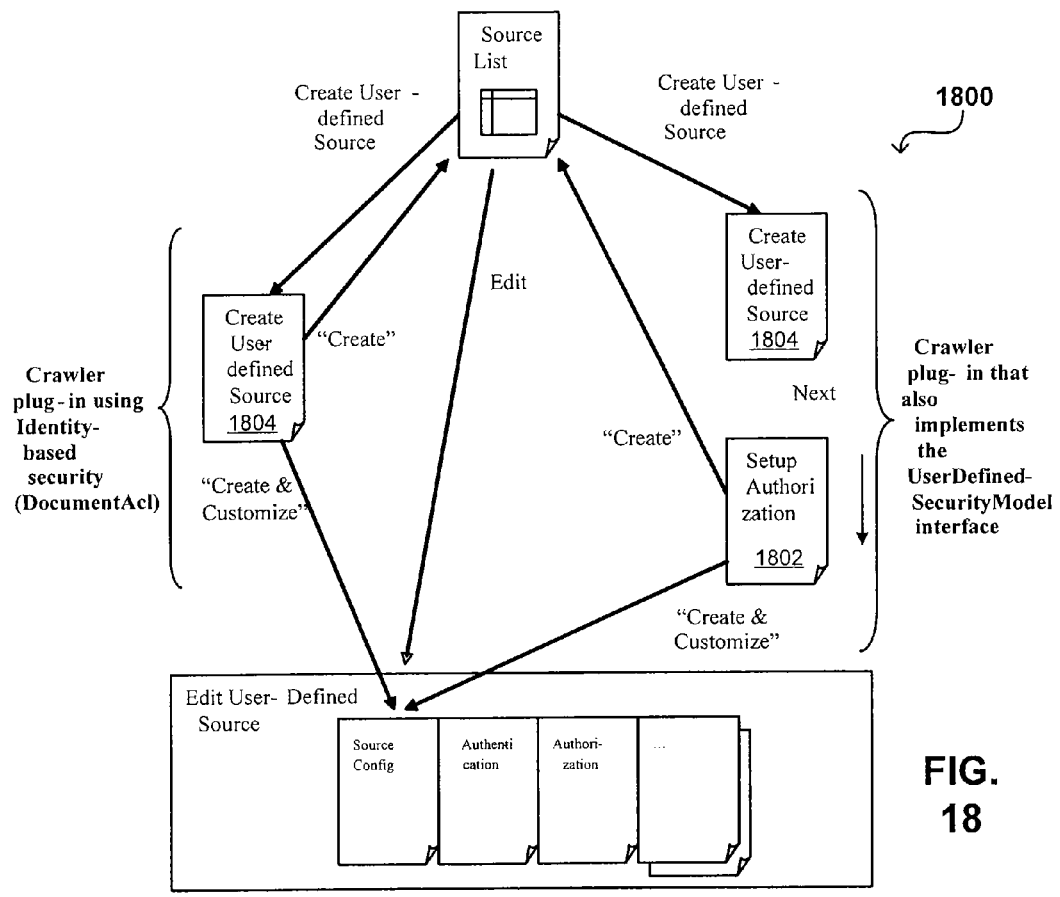
FIG. 18 illustrates an exemplary method for administering user-defined source level settings that can be used in accordance with one embodiment of the present invention.
Figure 19:
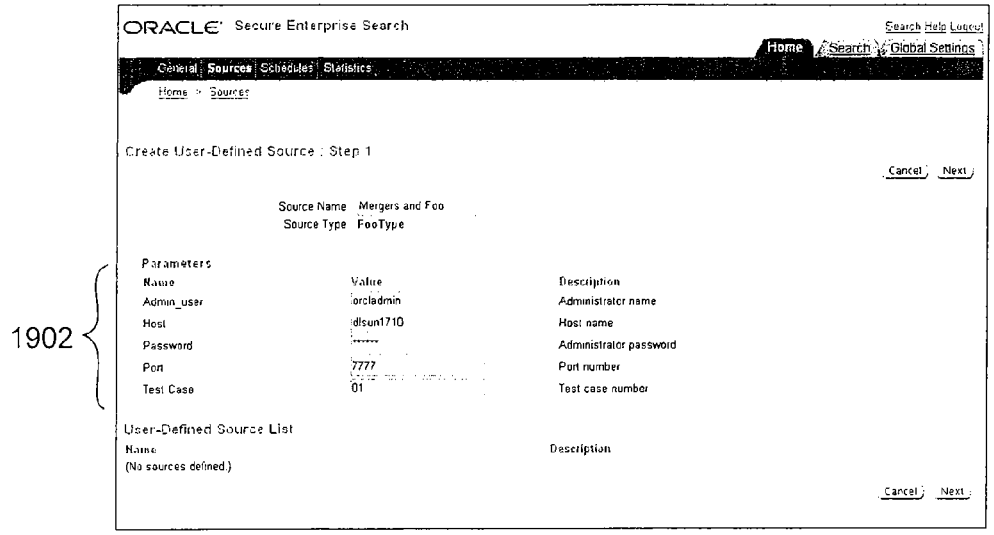
FIG. 19 illustrates an exemplary create source page that can be used in accordance with one embodiment of the present invention.
Figure 20:
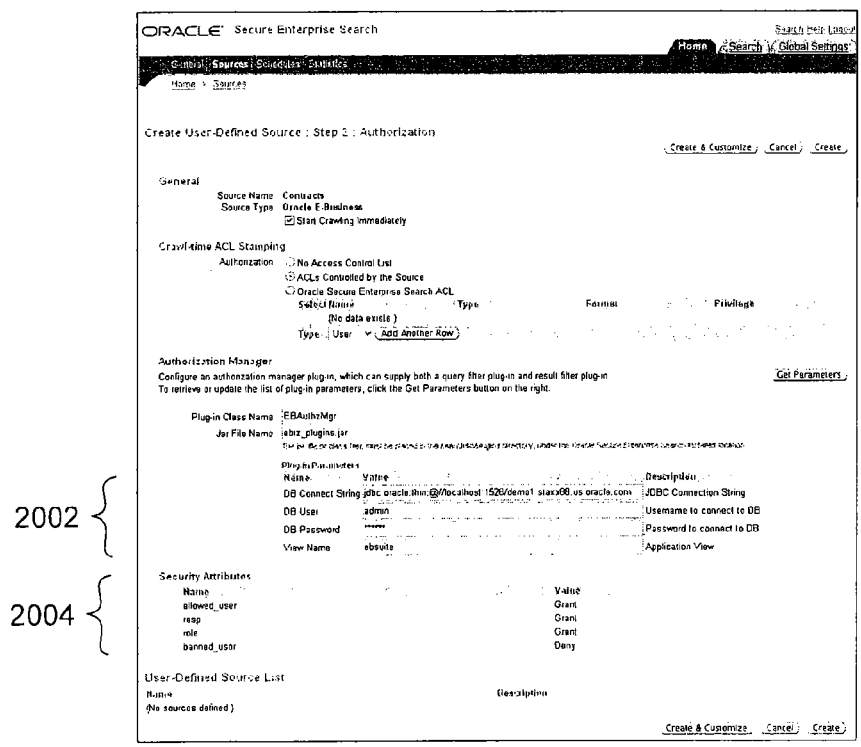
FIG. 20 illustrates another exemplary page that can be used in accordance with one embodiment of the present invention.

A page flow 1800 for administering user-defined source level settings is illustrated in FIG. 18. The Admin UI flow can force the user to an Authorization setup screen 1802 before creating a new User-defined source through a create source page 1804. When creating a user-defined source based on a crawler plug-in that implements a user-defined security model interface, a two-step flow is utilized. The first step is to enter the crawler plug-in parameters 1902, such as is shown in the exemplary create source page 1900 of FIG. 19. The authorization settings are then configured. If a default authorization manager class name is returned by the crawler plug-in manager, this class name will be filled as a default in a "Authorization Plug-in" page 2000, such as is illustrated in FIG. 20, and the parameter list 2002 will automatically be loaded. If no default is given or the admin wishes to override the default, the class name and jar file can be entered, and "Get Parameters" clicked to retrieve the list. Once the parameter values have been entered, the admin may click "Create" to finally create the user-defined source. If an authorization plug-in is specified, the admin tool will perform validation to make sure the supplied parameter values are valid, and that the authorization plug-in supports the security attributes 2004 exposed by the crawler plug-in and this set of security attributes is sufficient to determine authorization, including at least one GRANT attribute. Editing the Authorization settings for a user-defined source that implements the UserDefinedSecurityModel interface is very similar to Step two of the creation process. At this point, however, the Authorization Manager class is fixed.

Figure 21:
FIG. 21 illustrates an exemplary user-defined source page that can be used in accordance with one embodiment of the present invention.

FIG. 21 shows an example user-defined source page 2100 including an ACL table 2102 that contains an additional column: Format 2104. This indicates the format of the principal being entered, such as Simple, DN, or GUID. This can mirror the authentication format configured for the IdentityPluginManager.

As discussed above, an SES system can also provide for federated searching. In order to provide SES-SES federation in one embodiment, a WS API in used to communicate with remote SES applications. Methods in the WS API for user authentication can include, for example, proxyLogin and login. A federator can use these methods for proxy authentication and simple authentication, respectively. In the secure search mode the federator can fetch the correct username mapping from the Identity plug-in based on the authentication attribute that was registered with the federated source. There will be functionality in the plug-in interface to get this mapping. In secure mode, if broker and endpoint SES instances use different user authentication attributes, the broker SES must translate or map the user identity of the logged in user to authenticate the user against an endpoint SES. Identity plug-in registered on the broker SES can do the mapping of the user identity to the authentication attribute that was registered with the federated source. In the case where the Identity plug-in registered at the broker cannot do the mapping, the mapping can also be done at the endpoint using the Identity plug-in registered there.

Creating a federated source in one embodiment involves two parameters: Source Name and Web Service URL. Federation can be supported to search applications that implement SES WSDL. An authentication section of a create federated source flow can involve three parameters: Remote Entity Name, Remote Entity Password, and Search User Attribute. For the Remote Entity Name and/or Password, each SES instance can have federation keys in the form of federation entity username and password. When any remote SES instance wants to federate to this instance, the instance needs one of the federation keys for this instance. When creating a federated source, the parameters Remote Entity Name and Remote Entity Password correspond to the federation key for the remote SES application. The Search User Attribute here is used by the remote SES instance for user authentication. For example, by default for SES connected to OID the search user attribute is username. An identity manager can use this attribute name to get the value of the attribute corresponding to the logged-in user and pass the name to the remote SES as a user credential for authentication.

With a flexible authentication model, there is no need to depend on a directory such as OID to provide application entity username/password for S2S authentication and proxy login. Each SES instance can have its own Federation entity and password. This entity can be used in S2S authentication and proxy login for federation between two SES instances. Each SES instance can have multiple such entities for multiple remote SES instances that want to federate to that instance. These entities can be configured in a separate page under global settings as shown above. An admin can configure each entity such that the authentication during federation is performed either by SES itself or the identity plug-in by selecting the option associated with the entity configuration.

Figure 22:
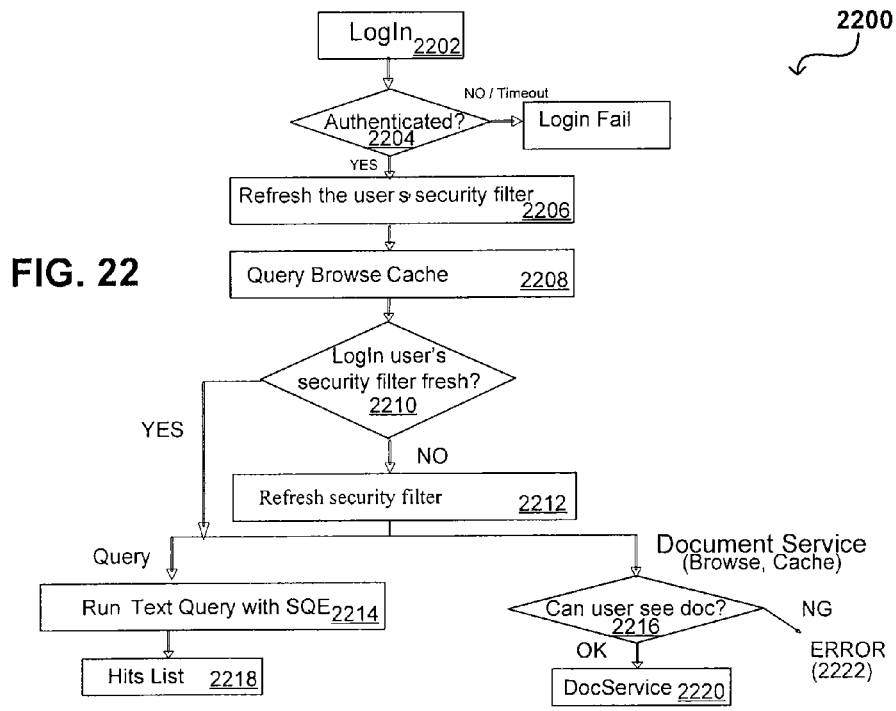
FIG. 22 illustrates an exemplary process for refreshing a security filter that can be used in accordance with one embodiment of the present invention.

Since security and access parameters can change continually, it can be necessary to update various information throughout the system. In one example, a security filter (e.g., SQE) is refreshed during query and document service. When a login user is authenticated, the user security filter can be forced to refresh by calling a routine such as refreshSecurityFilter. During query and document service (i.e., browse and cache), the security filter may only be refreshed when it is stale. A method such as isSecurityFilterFresh can determine whether a user security filter is fresh. An example of a process 2200 for refreshing a security filter is illustrated in FIG. 22. In this example, at login 2202 a determination is made as discussed above as to whether the user is authenticated 2204, and if so the user's security filter is refreshed 2206. At query time cache 2208 can be checked and it can be determined whether the user's security filter is fresh 2210. If so, the query can be allowed and a text query can be run with SQE 2214 to obtain a hits list 2218, and a document service can check to determine whether the security filter allows the user to see the document 2216. If so, the docservice returns the document to the user 2220, and if not an error message (or a null result) can be returned 2222. If the user's security filter is not fresh, the filter can be refreshed 2212 as discussed elsewhere herein before proceeding.

In one embodiment, a UserLogin.Validate method is invoked to validate the user. The method calls the Identity plug-in module, passing in the username and password. To save the time for updating the security filter at query time, the user security filter can be updated every time when a user logs in, regardless of the freshness. A refreshSecurityFilter method can be used to refresh a given user's security filter if necessary (e.g., where the filter is stale). If a value of TRUE is given to an attribute such as force_option, the user security filter can be refreshed regardless of the freshness.

Search Hit URL and Metadata Modification

In many existing search systems, the hits or results returned in response to a search query include URL hyperlinks to access the original documents. If a search hit represents a document or item in a Web application, the destination URL may be specific for each user. If the application item is crawled generically, this URL will need to be rewritten for each search user. Furthermore, a search hit may relate to a logical set of items (e.g. an email message and its attachments) which may be represented by different URLs in an application.

Documents typically are indexed to have the document contents and metadata including information such as the URL. When doing a typical search the user will want to receive URLs in a returned browser page as each URL will direct the user to the appropriate application page, site, application, etc. Typically, these URLs are obtained at crawl time, which is not sufficient for enterprise applications, such as eBusiness suite, for example, where the server names and addresses change continually. The URLs then cannot simply be stored as persistent data on disk, as the index would have to be continually refreshed and would often be out of date and could return erroneous URL values. Further, as the URL information can include millions and millions of rows of data, it is undesirable for efficiency, bandwidth, and other purposes to continually have to re-crawl all this information (i.e., to compensate for changes in server name, port, etc.).

An approach in accordance with one embodiment addresses these and other problems by obtaining a somewhat generic URL that is stored as a search hit resulting from a crawl. At query time, there then can be a callback mechanism used to dynamically manipulate the generic URL to a URL that is specific to the user making the query. In this way, when the query or search results are returned to the user, the user receives links that are active and valid for that particular user, directing the user to the appropriate site, application, etc. Such an approach is not straightforward, however, as many applications also use dynamic URLs. For example, an application make take information identifying the user's current session, encode that session information in some proprietary way, then generate a URL including the encoded information. A URL modification approach as described herein can work with such applications, as the callback mechanism provides the application with the document, metadata, and user session information, and the application generates the appropriate URL for the user in that session. The URL then can include any dynamic information, encryption, etc., needed for the target application. The appropriate links then can be returned to the user as a result of the secure search query. Such a mechanism does not require any modification of the applications, but can be implemented through an API or other interface at a higher level.

Figure 23:
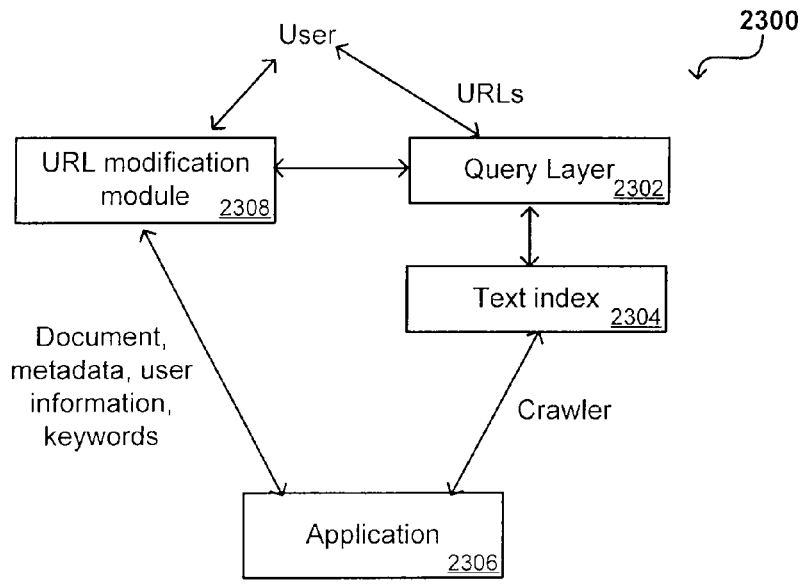
FIG. 23 illustrates an exemplary SES configuration that can be used in accordance with one embodiment of the present invention.

FIG. 23 illustrates an exemplary configuration 2300 for implementing such an approach. This configuration utilizes a text index 2304 and a query layer 2302 for accepting a user query. Before results of the query are returned to the user, there is a callback into the application 2306 from a module 2308 operable to modify the URL as discussed herein and generate a callback. The callback provides the document from the crawl, the metadata, and the user information. The application then generates a dynamic URL that is accurate for the application, user session, etc., such that when the user selects that URL the user will be directed to the appropriate application page, etc.

Figure 24:
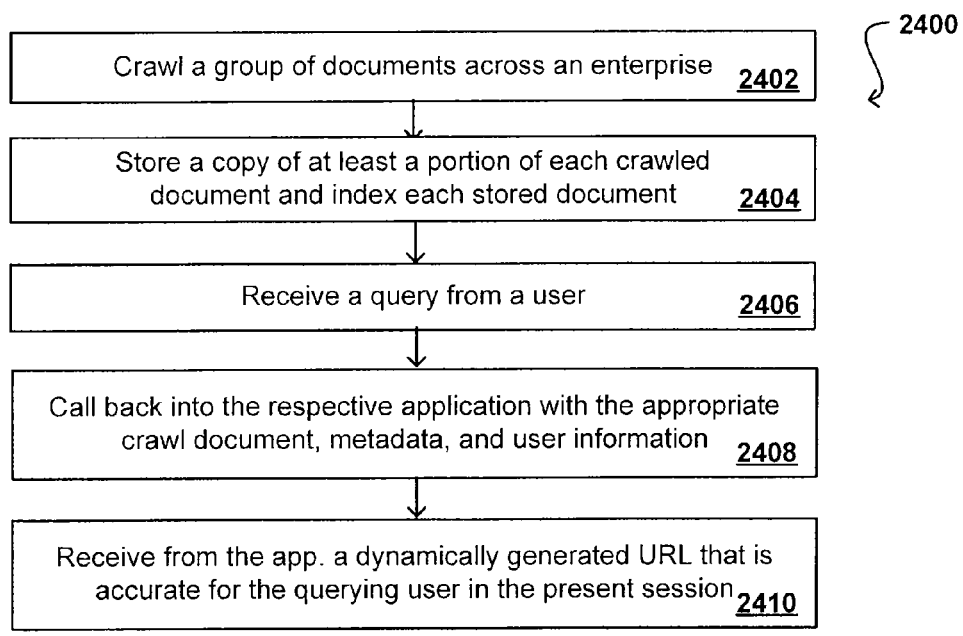
FIG. 24 illustrates an exemplary method for providing modified information that can be used in accordance with one embodiment of the present invention.

FIG. 24 illustrates step of an exemplary method 2400 for providing such modified information. In this method, an SES crawler can crawl a group of documents (or other data sources) across an enterprise 2402, and can further crawl documents outside the enterprise. A copy of at least a portion of each crawled document, along with the appropriate metadata, then can be stored and accessible to SES, and each such document can be indexed appropriately 2404. The metadata for a document can include a generic URL where appropriate. When a query is subsequently received for a user 2406, a callback is made into the respective application with the crawl document, metadata, and user information for the querying user 2408. A response then is received from the application that includes a dynamically generated URL that is accurate for the current user and session 2410. As discussed elsewhere herein, the metadata for the document also can be modified accordingly.

In one embodiment, a Java plug-in object (e.g., ResultFilterPlugin) is allowed to rewrite the URL returned to a search user. This operation is performed at query time, just prior to the results being returned to the user. From this search result set, every document belonging to a filtered data source is passed through the plug-in for that source. An object such as a DocumentInfo object representing the document can provide methods such as getDisplayURL( ) and setDisplayURL( ) to access and modify the URL. For secure results, the rewriting process may take into account the currently logged-in search user. The URL may also be rewritten based on environment specific parameters. The resulting URL may be created on the fly or to a pre-existing URL, such as a hyperlink pointing to the main body of a message as opposed to an attachment. Such an approach provides for integration between secure search and deep links into Web applications customized for each user and search query, where in the past, a destination URL for a search hit would be generic and commonly shared.

Since callbacks are being made into the applications, each application can also decide whether to show or provide URLs or documents based on the current user/session information. Such an approach can prevent a user from accessing a resource, for example, to which that user previously had, but not longer has, access. Further, such an approach can be used to modify not only the URL but also any of the metadata. For example, number of documents such as a purchase order documents might be represented in several different languages. It then is desirable to show at least a title and possible a summary of the document to the user in an appropriate language for the user. With the URL modification architecture, the callback mechanism can be used to go back to the application and ask the application to modify URL or other information for the appropriate language. The application in one embodiment actually modifies the title and description of the document that are returned to the user.

The callback can further go against the previous results obtained at query time, and need not result in another full crawl. In one embodiment, Web services is used for the callback mechanism, and can act as an endpoint that can be called into. This provides an extensible mechanism to call into a third party application module where current information is fed and an application can dynamically changes the URL(s) and/or metadata that are returned to the user in response to the query. Such an approach provides for across different identity authenticating systems (e.g., email, exchange, etc.) using the appropriate APIs. Authentication can be normalized so that identifies can be recognized across disparate systems as discussed elsewhere herein.

Suggested Content with Attribute Parameterization

Suggested content can provide functionality similar to that for suggested links, but in this case rather than returning just links, a query application can respond to certain queries with information that is relevant to those queries. This information could be in the form of link(s) or the actual data content. For example, if a user is searching for directory information of a person and enters (dir xyz) as a query, a suggested content provider like Aria could return a URL pointing to the directory page for user xyz or can simply return all contact information of that person (e.g., email address, phone numbers etc.) and the query application can render this information in the search page along with the result list.

Suggested links provide a way to associate a specific fixed URL with a query token, whereby if a user enters a query which contains the specified token, the associated URL is returned along with the search hit list. A Suggested Content feature also provides a way of mapping queries to specific URLs. However, suggested content can provide a facility for capturing parameters from the query string and inserting those parameters into the associated URL according to a URL template. Further, rather than simply returning the URL that results as a link, SES can actually fetch the XML content associated with the URL and apply a supplied stylesheet to generate an HTML fragment. The resulting HTML fragment can be rendered on the search page of the default query app, and will be available via the Web Services API.

When using suggested content with search, information can be crawled and indexed as discussed above, then results for a query can be returned to the user. Often there is data that cannot be crawled, such as transaction data or data that is changing too quickly, or because the data is from systems that cannot be accessed as they are out of the control of the SES system. In many of these situations the addition of suggested content would be useful. In order to provide suggested content, a group of triggering words can be provided and a group of providers registered. As used herein, a provider can be any type of application, search system, etc., that, when given a keyword, can return a set of results. For each of these providers, a regular expression, etc., can be registered such that when any of the triggering keywords is received in a query or search from a user, a corresponding registered provider is triggered. For example, if a user submits a query including the term "travel" and "travel" is a triggering keyword, information for the user and/or query can be submitted to a travel-related provider and any information returned from that provider can be displayed to the user along with the search results as suggested content. If the query contains a term such as "San Francisco," then the returned content can include travel-related content pertaining to San Francisco, such as a list of airfare deals to San Francisco from the user's location, if available.

Suggested content also can be used with enterprise applications, which typically are transactional systems. A user might type in a term such as a client name, and the suggested content may relate to the latest expense reports or upcoming calendared meetings relating to that client, for example. This transactional type of information happens in real time and is not easily crawlable as discussed above. It still is desirable, however, to enter a quick query into the SES system and have such results returned. While existing approaches attempt to obtain such information from suggested content providers, such system usually use URL template with a fixed format. The template indicates what and where to send the query and the provider does what it will with the data. A provider understands the appropriate API, then a query is received in a standard form from the API, such as:

```
<query>
    ... a b c
</query>
``` which includes the query, terms, and other information in a fixed URL scheme. In order for the provider to be able to understand this protocol, it was necessary to code an extensive set of logic as simply function calls such as POST or GET will not work in such situations.

Systems and methods in accordance with various embodiments provide a more flexible and extensible mechanism by parameterizing the URL to avoid the need for a fixed protocol. The URL instead can be templated. If you provider is located at, for example, "a.b.c", the URL can be parameterized to recite, in URL syntax, something such as:
    https://a.b.c/ . . . ?c=$ora:date&d=$ora:userid
In this way, the URL template can be parameterized such that values for attributes such as "date" and "userid" can be filled in dynamically at query time. These attributes can include, for example, date, user ID, location, etc. The URL thus can be created in template form with "$" values that will be substituted at run time with the actual data values for the appropriate user, session, and/or query. It then is possible to simply follow the dynamically generated URL to obtain the information to return to the user. Such an approach is simple and flexible as there is no fixed protocol and the template is very extensible. Further, it is not necessary to write systems that have to parse and consume these fixed templates that are coming in, as this is just a URL packet that can easily be made to work with servlets, JSPs, etc.

Further, a suggested content mechanism can incorporate the security necessary for enterprise applications. Using such a URL template, the security credentials for a user can be passed with the URL such that separate security mechanisms do not have to be established prior to the query. For other real-time providers, it is necessary to first establish security between the two systems, which can be problematic due to the need to pass user session information, etc. An extensible template mechanism can take advantage of a group of predetermined and other values for these templates such as user ID, user authentication credentials, etc., which can easily be passed through the URL. Templating the URL it makes it much simpler to implement a suggested content provider, and the implementation can be done in a secure fashion.

Such an approach differs from known content suggestion technology as an actual query is being used to dynamically create a URL that transforms the query so the query can be propagated to the appropriate provider. The information is not just fixed information such as data or user IDs, but can include information extracted from the query string itself. Previously, all the URLs would just be blindly passed such that the backend system or application would have to interpret the URL and thus had to be more sophisticated. SES can instead provide the ability in a search configuration, for example, to match terms such as "bug" followed by a six digit number, etc. Any appropriate six digit number then can be substituted in the URL, such that the bug system need not know anything about how the user entered the query, or even what was the original query string. Such flexible templates also provide for other functionality such as processing synonyms of a term, such as by matching "problem" or "case" for "bug," etc. This then allows for the use of hybrid regular expressions, whereby match terms may not just be simple keywords but can include sophisticated text operators (i.e., synonyms). For example, query can express a "synonym of (bug)" which can match anything in the bug family. If the user types in any of these terms, the suggested content provider can know how to match and process the term(s). This allows for sophisticated processing without significant additional coding.

Such an approach makes the provider simple, and parameterizes the URL with things such as the current environment (e.g., user, userID, username, session, locale, data, etc.) and information about the user's identity (as this is also linked with the identity management system). Security information such as the role(s) of the user (e.g., project manager, etc.) can also be included, which are very unique. A search provider can be as simple as reciting $ora:$A1 (attribute A1). It is possible to simply go to the identification system for this user to determine the value for A1, then substitute that value. A user can have a lot of associated information, such as local time zone, address, managers, etc., all of which can be parameterized and sent to the backend very easily. The suggested content provider also does not have to process the entire query, but can instead process extracted portions of the query that are relevant to the suggested content provider.

Figure 25:
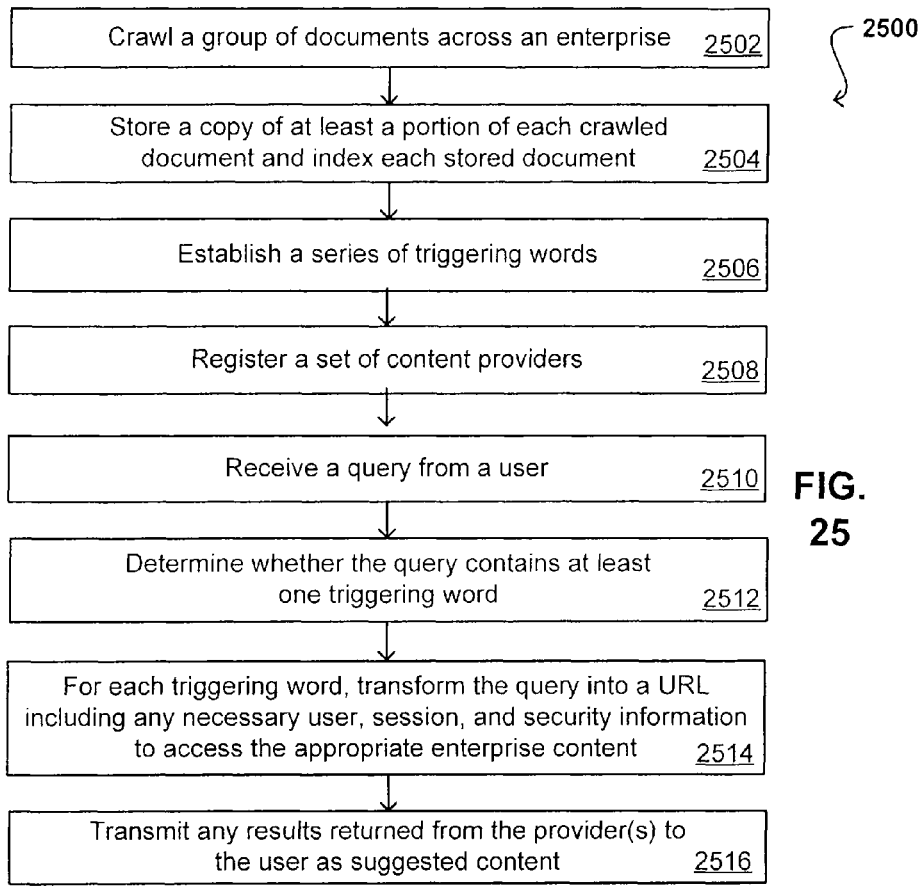
FIG. 25 illustrates exemplary method for providing suggested content that can be used in accordance with one embodiment of the present invention.

FIG. 25 illustrates steps of an exemplary method 2500 for providing suggested content in accordance with one embodiment. In this method, an SES crawler can crawl a group of documents (or other data sources) across an enterprise 2502, and can further crawl documents outside the enterprise. A copy of at least a portion of each crawled document, along with the appropriate metadata, then can be stored and accessible to SES, and each such document can be indexed appropriately 2504. The metadata for a document can include a generic URL where appropriate. A series of triggering words can be established 2506, and a set of content providers registered 2508. When a query is subsequently received for a user 2510, a determination is made as to whether the query contains any triggering words 2512. For each triggering word, the query can be transformed into a URL that includes any appropriate user, session, and security information necessary to access the appropriate enterprise content 2514. The results then are received from the provider(s) and transmitted to the user as suggested content 2516.

Figure 26:
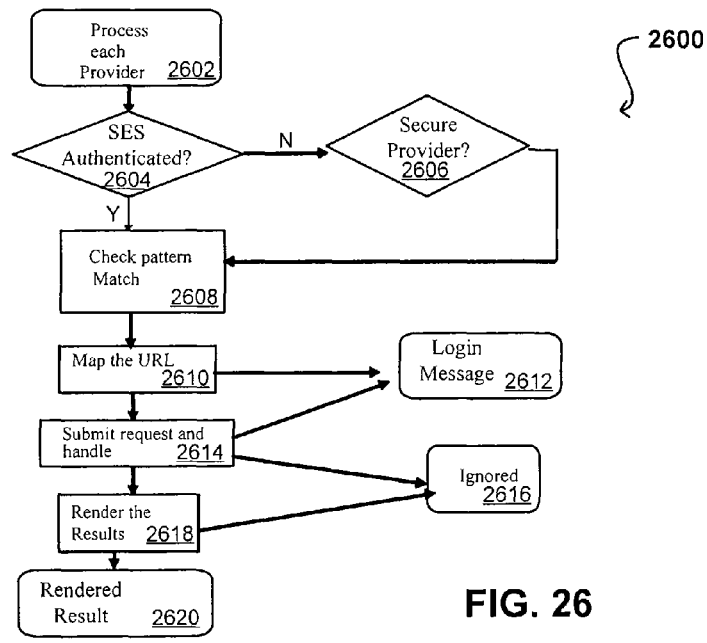
FIG. 26 illustrates an exemplary process by which SES can interact with a provider in accordance with one embodiment of the present invention.

FIG. 26 illustrates an exemplary process 2600 by which SES can interact with a provider. In this process, for each provider 2602 a determination is made as to whether SES has authenticated the provider 2604. If not, a check is made to determine that the provide is a secure provider 2606. A pattern match then can be checked 2608, after which the URL can be mapped 2610. If necessary, a login message can be sent 2612.

Figure 27:
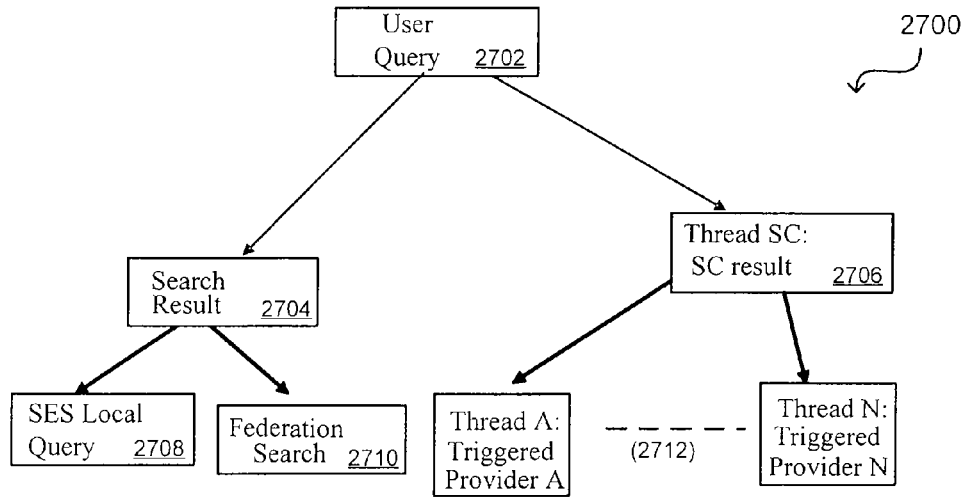
FIG. 27 illustrates a hierarchical overview of integration with a query application in accordance with one embodiment of the present invention.

The request is then submitted and handled 2614, after which the request is ignored 2616 or the results rendered 2618 and returned 2620. FIG. 27 illustrates a hierarchical overview 2700 of the integration with the query application. This exemplary overview shows the relationship between the user query 2702, search result 2704, suggested content result 2706, local query 2708, federation search 2710, and triggered providers 2712.

In one embodiment, a pattern match is based on the information from the categories such as provider, user, and query. The provider information can be defined through an admin tool and retrieved from database, the information being refreshed if there is any change. Each provider can have a single instance object for the whole query application. The end user information can be fetched based on a query http request such as browser/agent type, browser host name or IP, browser language setting, and previous cached information from login. Some user account information can be retrieved through a security plug-in from OID or other LDAP directory. The query information can be fetched based on the current http request. The query information can include, for example, the query string, current source tab name, info source group ID, query language, etc.

Such a Suggested Content feature can extend a suggested link framework to support the display of real-time content that is relevant to a user query. This can involve a keyword-based retrieval of data from content providers in XML format, for example, with an optional transformation of the data using XSLT or XQuery, and placement of the results in the result list. The placement can be in a configurable location based on, for example the "shape" (e.g., height and width) of the data. Suggested links allow users to be directed to a particular Web site for a given search string. For example, when users search for (Oracle Secure Enterprise Search documentation) or (Enterprise Search documentation) or (Search documentation), the SES system could suggest a URL of the technology page of www.oracle.com. In a default search page, suggested links can be displayed at the top of the search result list, or at any other appropriate location. This feature can be especially useful to provide links to important Web pages that are not crawled by SES.

A suggested content mechanism can allow SES administrators to register triggers mapping to URLs for suggested content providers, along with XSLT style sheets for rendering the returned content. The resulting content is distinct from the search results and can be displayed anywhere. Such a system also can support secure access to suggested content results, can include support for access to suggested content in a Web services API, and can allow for configuration of the number of SC results to display. The mechanism also can provide a facility for uploading suggested content provider configuration data (query pattern, provider URL, style sheet) from an XML source, can support Xquery as an alternative to XSLT for SC style sheets, can support internal as well as external SC sources, and can allow configuration of the presentation of SC results (e.g., size/shape, location on search page).

Each provider can be checked against its own pattern, in order, such as in a Suggested Content thread. The provider pattern is REGEX based in one embodiment, such as may be implemented based on a jdk java.util.regex package. The regex pattern for each provider can be pre-compiled. After the pattern is checked, the matched groups can be are returned as a MatchResult object. If the end user query matches the provider pattern, the actual provider URL is returned as result. The provider URL template can be defined during provider setup in an admin tool. The URL template can be defined in a way to support URLs such as Google OneBox provider URLs, as well as URLs for other providers with more generic XML over an http interface.

A group of common variables can be pre-defined which can be used in the provider URL template, representing the end user and query information. A portion of the information such as query string, source group ID, etc., can be used for the provider pattern match. The URL template for each provider can be parsed once into a string array. Variables defined in the provider URL template can be replaced by the actual value for the current user query or empty string. The new URL then can be the actual URL for the provider, and can be ready for launching an HTTP or HTTPS request. A common format for variables in such a URL is given by the following:

$ora:variableName where "ora" and variable names are all case sensitive. All the $ora:variableName instances in the URL for the trigged provider will be replaced by the appropriate variable value based on the current user query, etc. Supported variables can include, for example, $ora:lang, $ora:q and $ora:username.

A dedicated thread pool can be utilized for a Suggested Content ("SC") feature. If a user query matches a provider pattern, steps such as sending the request to provider, waiting for a response, parsing, and rendering the result can be treated as a single task to be queued in the thread pool. The SC thread can be notified when each provider search completes. The SC thread can end when, for example, there are enough providers returned, the global time out is reached, or all searches complete.

For secure providers, pattern matching can be processed only when the end user is authenticated, such as by SES or by the provider. If the query from the authenticated SES user matches the pattern defined for the secure provider, the Suggested Content module can submit the final provider URL, which includes the authenticated SES user information, to the provider to further authenticate and authorize the user. The Suggested Content module can provide the end users with messages other than the suggested content if user authentication by the provider fails. An SES Suggest Content module may not always handle security directly for the drilldown links created by the providers.

For a cookie based implementation, the end user can be required to manually login whereby the provider can set domain level security cookie, the name of which can be defined while setting the provider in an admin tool. The provider should be able to find the user information based on the cookie. For S2S option, the provider user identification can be based on the user information from the SES login, and can be mapped into another field by a security plug-in. The field in the SES security repository can be specified during setting of the provider. The provider URL can specify whether SSL over HTTP is going to be used for the provider search.

The query application can maintain cached copies of all necessary provider information, which can be kept fresh by using a versioning mechanism similar to the one used for security plug-ins. On the query side, whenever provider information is required, the database can first be queried to determine whether the cached info is stale, and reload the information from the database if the cached information is stale. The version information can be maintained in the PL/SQL layer (i.e., every time provider info is added or updated, a version number will be incremented) and read by the mid-tier query code.

As discussed above, regular expressions can be used to define query patterns for suggested content providers. Parameter values to be extracted from the query and cached for insertion into the template URL are specified in one embodiment using parentheses, which is a standard capture group mechanism that can be provided by a Java regular expression API (e.g., java.util.regex). Subsequently, named parameters in the template URL can be replaced by the captured values or other user-specific data according to the rules below. In one embodiment, the following exemplary parameters are supported in the provider template URL and are replaced with capture group values or user data as described:

The expression $ora:qn, where n is a positive integer, will be replaced by the nth capture group in the regular expression, or the empty string if there is no corresponding numbered capture group.

The expression $ora:q in the template URL will be replaced by the entire query expression.

The expression $ora:username in the template URL will be replaced by the logged-in username, or the empty string if the user is not logged in The expression $ora:lang will be replaced by the two-letter code for the current browser language All parameter names are assumed to extend until the first ampersand (&) character following the initial dollar sign ($), or the end of the string, whichever comes first. "$ora:" is the reserved word for the variable prefix in the provider url template. The implementation of the provider should avoid using the reserve word if possible.

Figure 28:
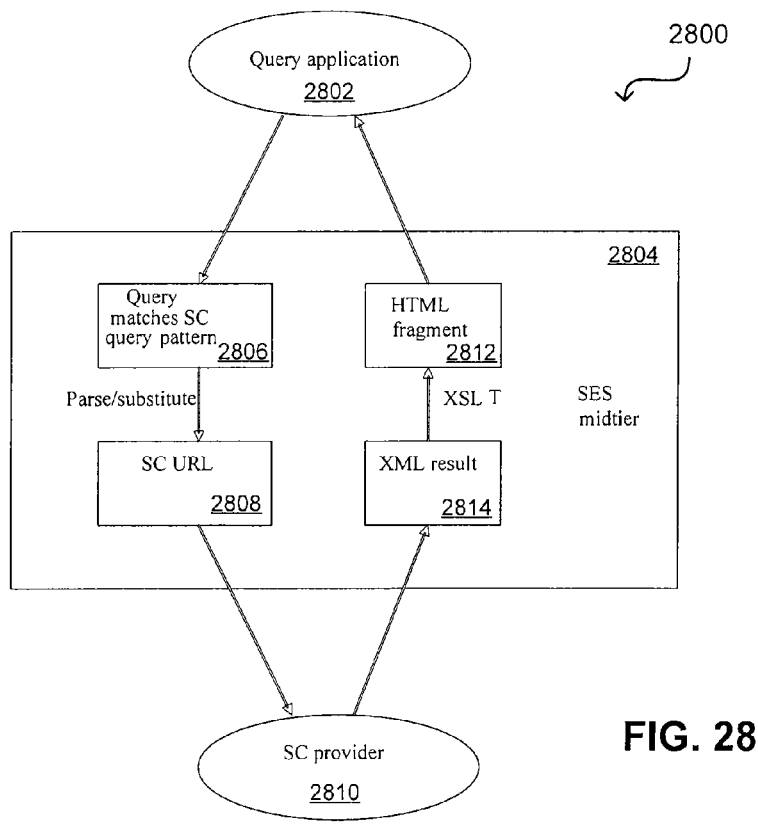
FIG. 28 illustrates an exemplary flow diagram of a process that can be used in accordance with one embodiment of the present invention.

Suggested content triggers can support the empty string as a query pattern, which will be considered a match for every query. As an example usage, this might be used to serve up advertisements on every query page. The diagram of FIG. 28 illustrates the data flow 2800 involved in a query triggering a SC result. In this flow, a query from the query engine 2802 undergoes pattern matching (for triggering words) at a matching module 2806 of the SES midtier 2804, and then passes to a module 2808 for generating a URL for secure content that is passed to the secure content provider 2810. The secure content provider can send an XML result 2814 back to the midtier, which can extract and generate the relevant HTML fragment 2812 including the suggested content to be returned to the user.

Figure 29:
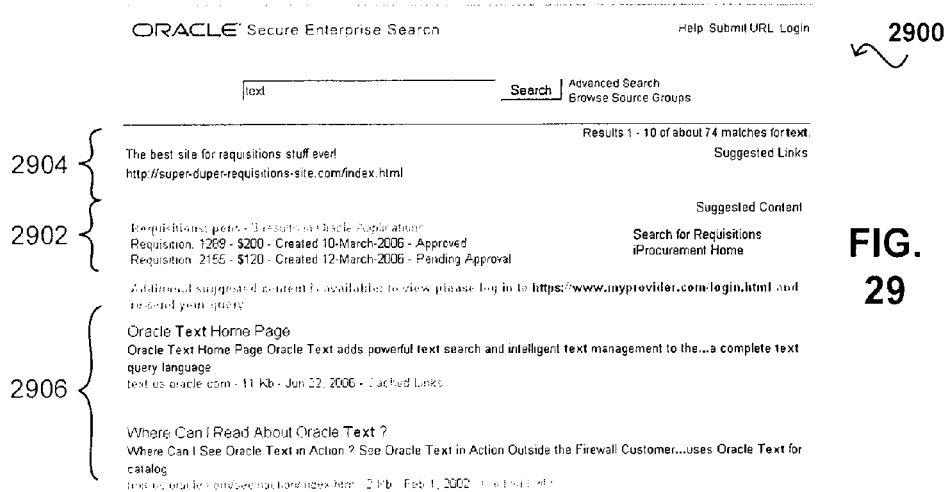
FIG. 29 illustrates an exemplary default query application page that can be used in accordance with one embodiment of the present invention.

As discussed above, in a default query application page 2900, suggested link results 2904 can appear above the search results 2906, while suggested content results 2902 can appear below any suggested links 2904, above the query results 2906, such as is illustrated in FIG. 29. The style sheet registered for the individual query patterns can control the size and style of the suggested content results. The final 'look and feel' of the suggested content section can depend, for example, on the content returned by the SC providers. If a query results in suggested content, the page may not be rendered until the content is available, or until the timeout period has expired. Suggested content may not be displayed for advanced search queries, and no content from secure providers may be displayed if the user is not logged in to SES. Content from public providers can always be displayed if available. In a typical setup, it is unlikely that a query would match more than one or two provider patterns. In any case, however, a maximum number (e.g., at most 20) of provider requests can be invoked for a given query. The results then can be rendered on a first-come, first-rendered basis up to the maximum number of provider results specified by the admin user.

As support for a Suggested Content feature may not be supported by components of existing systems, such as an existing WSDL interface, a search result object for an SES Web service may only contain an array of suggested links for a given query. The WSDL will require additional operations to access suggested content for different providers. To avoid any backward compatibility problem, signatures for existing search methods may remain unchanged, with a new search method (e.g., getSuggestedContent) instead being added that can return suggested content in either HTML or XML format. The parameters to such a method can be the query string and a string representing the desired return type. The return types supported in one example are XML and HTML. A reason for providing at least two different return types is that the end-user may wish to apply a custom style-sheet in a custom search UI, so the user can request XML and therefore will not have to depend on the rendering style used on the default SES query application. A new complex data type, such as SCElement, can be added in the WSDL definition. Unlike alternate keywords and suggested links, suggested content may not be returned as a part of a search operation. The user may have to invoke one of the above WS operations explicitly to get the suggested content.

Integration of SES and a suggested content provider application can handle secure access to the suggested content through SES. When an end user makes a search on an SES application, the SES application can be able to grab the authentication information for the user, if available, and pass that information to the SC provider in a secure manner.

One approach to handling the security for an SES-SC provider integration utilizes cookie-based authentication. In this approach it can be assumed that a single security cookie is domain based, and that SES and the provider are hosted on the same domain, such that SES can access the cookie for the provider and is able to be authenticated through the cookie from the provider as the end user. An end user is authenticated by the provider before the user is able to access data from the provider. Once the user is authenticated by the provider, an appropriate cookie is set for the user to maintain a session. SES is notified of the cookie used by the provider for the authentication, such as during registration of the SC provider. When the end user makes a search on SES, SES can grab the cookies from the request header for the user and pass the cookie information on to the SC provider. If the cookie is valid, the SC provider will return the data; otherwise, the provider can return an appropriate error message. SES itself need not be protected by SSO, as SES simply acts as a carrier of information between the end user and the SC provider. It can be a requirement that the verification of authentication cookies not depend on the IP address of the client IP address, as the request will be made by SES and not the query end-user.

For a default query application, when the end user is not authenticated successfully by the provider, SES can behave in different ways. For example, SES can ignore the SC provider and just return the normal hit-list without showing any suggested. Alternatively, SES can show an information message in the suggested content display area for the SC provider that the user has not logged into the SC application and hence cannot see any information there. The unauthorized user action can occur when the user is not logged in, for example, which can occur when: the specified session cookie for the provider is not available from the user's http request; the specified cookie has expiration other than "the end of session" and the expiration time is earlier than current timestamp; the specified security cookie for the provider is there but the http request with this cookie to the provider is returned with 401 status code; or the provider is Google OneBox compatible, the xml element "<resultCode>" is checked and the value is "securityFailure" (plan).

Another approach utilizes S2S based authentication. In this approach a mutually trusted relationship is established between the SES application and the SC provider application. Any user already logged into SES application need not be authenticated by the provide application again. The SC provider application can simply trust the request coming from SES on behalf of the end user and provide the data for the user. To establish the mutually trusted relationship between the two applications, the applications share the trusted entity. The provider implementation allows the trusted application to act as the proxy for the end user and also honors the end user permission to perform the search.

The trusted entity can be a (proxy) user configured in an Identity Management system used by the SC provider application, or the trusted entity can be just a name-value pair such that the SC application can extract the entity information in the request coming from SES and authenticate that information. This trusted entity and its password can be defined during the registration of the SC provider. Proper permission on the entity must be given in the provider security repository so the entity can proxy other end users in the provider system to do the search for the end users based on the provider URL.

In order to support a case where the provider and SES use different information to identify the end user, such as where SES uses user "name" and an e-business provider uses user "email" as user login identification, and SES also needs a name such as "email" for the mapped attribute in the SES user repository for the end user to be defined. For end user identification, there can be a number of situations. First, the username format on the SC application can be different than on the SES application. The username format used by SC provider then should also be registered along with the trusted entity as a mapping attribute. The Identity plug-in registered on SES should be able to translate a username like "name" value from SES to SC format like an "email" value based on the mapping attribute. In another situation, the same user identification may be used for both of the SES and the provider, such that no map format should be defined for this provider.

Self-Service Sources for Secure Search

An enterprise can have an inventory control system containing data regarding inventory levels, a catalog system describing product data, an accounting financial reporting system containing data relating to costs of products, an ordering system containing delivery schedules, and a customer system containing customer relationship information, etc. In addition, some data may be connected to proprietary data networks, while other data sources may be connected to and accessible from public data networks, such as the Internet.

Information within a single enterprise also can be spread across Web pages, databases, mail servers or other collaboration software, document repositories, file servers, and desktops. Further, many data sources are protected from certain individual users. For protected sources, a crawler is needed that has the ability to index documents with the proper access control list. That way, when end users perform such a self-service search, only documents that they have privileges to view will be returned. No existing solution allows a user to self-service search across the entire enterprise data through the same interface, fully globalized in multiple languages.

When secure content is crawled, credentials must be supplied to be able to crawl the data. In some instances, the data is not controlled by the same person who controls the search system, or the data is not configured in the same manner to allow an individual end user to provide a consistent set of user security attributes, such as username and password. Another issue is that the administrator for an enterprise search system may not have access to all data as found in a service-to-service (S2S) arrangement or a broad set of login information for certain target repositories unless a trust relationship has been established between the target application and an enterprise search application. In situations where a search administrator does not have full authorization to access a data source, providing search over the protected content within the enterprise may not be possible.

Systems and methods in accordance with embodiments of the present invention can overcome these and other deficiencies in existing search systems by providing a self-service source for secure enterprise search. A self-service source secure enterprise search application can authenticate and crawl as an individual end-user. Self-service authentication allows end users to enter the user credentials needed to access an external content repository. The secure enterprise search then can crawl and index the repository, using these credentials to authenticate as the end user. In one embodiment, only the self-service user may be authorized to see these documents in their individual search results.

In one embodiment, an administrator sets up a self service source within a secure enterprise search application system by first creating a template source and defining a target data repository without including any credentials needed to crawl that repository. From a search application, an end user can view a customize page and subscribe to the template source by entering the appropriate user credentials in an input form. A new user-subscribed source then is created, along with a copy of the template schedule. The secure search system can create an access control list (ACL) for this user to be applied to the user-subscribed source. User-subscribed sources can be viewed in a page such as a "Home-Sources-Manage Template Source" page, and the associated schedules can be administered accordingly. Any changes applied by the administrator to a template source then can be dynamically inherited by the associated user-subscribed sources for the next crawl.

To further set up a self-service source system, a secure enterprise search application can allow an administrator to configure the template source to describe a predetermined unit of secure documents within which the end user may view returned results. This template defines the location of the repository along with other crawling and query settings. However, the credentials for the crawl are omitted from the template. An end user of the search system may subscribe to a template in the query application interface by providing their own credentials to the target repository. The user's self-service source then can be crawled at a time determined by the search administrator to prevent denial of service attacks against the target repository. The personalized end user source is linked to the template source and can inherit settings from the template source. Further, a child relationship to additional sources (i.e., related sources) can allow for changes in the target sources. Specifically, the personalized end user source can map directly to the related sources during the time the self-service source system settings remain active. Such a system also provides the capability for an administrator to determine how long such settings should remain active. A copy of a template schedule assigned to a new source can be held in a log by the administrator, and a personalized source then can be stamped with end-user ACL.

The self-service source can match an individual's end user credentials with the template source. During crawl, authentication can be accomplished by augmenting the individual end user and the source credentials with certain target repositories. In this way, each individual user's documents on the target repository are only available for search to that particular user.

A crawler then can be launched on the personalized target sources and not on the generic template sources. To accomplish this task, the secure enterprise search crawler application can obtain seed URLs or server addresses from the template sources, as well as username and password data and/or other subscription parameters from the current end user's subscribed source. Source group membership can be manually handled by the administrator. Each self-service source can store the credentials of an individual end user, and at crawl time it inherits the rest of its configuration from the template source. In this way, the configuration of the template source can be modified at any time without requiring each user to re-subscribe to the template.

During crawl, the crawler can authenticate with the target repository as the individual end user. The repository may be unaware of this arrangement, as the crawler appears to be a normally authenticated user. As a result, no special setup is required on the target application. The documents crawled for any particular self-service source are stamped with that end user identity. In this way, each individual's documents on the target repository are only available for search to that particular user. This self-service security model for crawling credentials allows a search administrator to configure the crawl of a target repository without requiring broker access to the repository. Self service crawl can support at least two source types, including Web applications (e.g., with single sign-on enabled) and e-mail.

Self service e-mail sources can require an administrator to specify an IMAP server address, and the end user to specify the IMAP account user name and password. According to this embodiment, self service Web sources are limited to content repositories that use a single sign-on (SSO) authentication process. SSO is an integral portion of this embodiment of a secure enterprise search system. The administrator can specify the seed URLs, boundary rules, document types, attribute mappings, and crawling parameters, and the end user can specify the single sign-on user name and password.

The basic model for self-service sources can be extended to allow the template source to designate additional parameters (i.e. subscription parameters) that can be provided by the subscribing user. Some examples are to allow a user to specify which e-mail folders to crawl (e.g. just Inbox and Pending Messages), an external web site address to crawl (e.g. http://w3.org/XML/Query/), or how much of the calendar to crawl (e.g. next and last 7 days). This and other information can be entered when subscribing to a template. However, in some of the previously mentioned scenarios, a search administrator may require authorization by launching a workflow in order to subscribe. For the e-mail example, the administrator could configure the template to specify: Server:imap.us.com; Directory on server to store cache files: /scratch/mail/cache/; E-mail folders to crawl: specified by user. Then, when subscribing to this template, the end user would enter: Username; password; E-mail folders to crawl—"Inbox" and "Pending Messages".

The default security model for self-service sources also can be extended to allow a user to specify a group (as defined in an identity or directory server) that can view the documents. Under the default rule, only the subscribing user may view the documents crawled for that source. The extended security model can be done as part of the process to subscribe to a template source. For example, a manager may wish to crawl all of the functional specification documents for the manager's group, which may be stored in a content server. If the template were set up by the search administrator, the manager could subscribe to the template, enter the folder path to the manager's group functional specifications, and then specify the manager's group name as authorized to view the crawled documents. This can be viewed as a subset of the example above, allowing for additional parameters. In this way, a member of the authorized group then can view documents for that particular group by entering the specified folder path. This can be an important example, however, as it concerns the default security model of self-service sources to allow only the subscribing user to view the user's documents. This example illustrates the ability to specify a trusted group that could also view these documents.

Figure 30A:
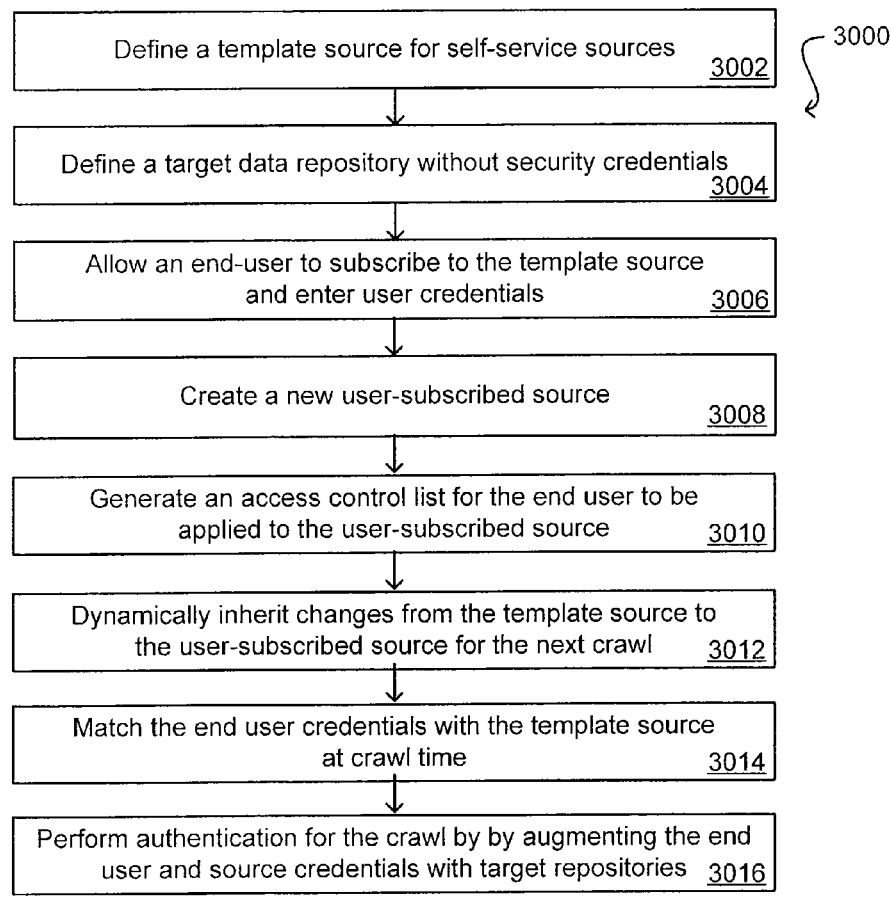
FIG. 30($a$) illustrates an exemplary method for utilizing a self-service source that can be used in accordance with one embodiment of the present invention.

FIG. 30(a) illustrates steps of a method 3000 for utilizing a self-service source in accordance with one embodiment. In this method, an administrator defines a template source for self-service sources 3002 and defines a target data repository without required security credentials 3004. An end user can subscribe to the template source and enter user credentials 3006, whereby a new user-subscribed source is created 3008 along with a copy of the template schedule. An access control list is created for the end user to be applied to the user-subscribed source 3010. Changes to the template source can be dynamically inherited by the user-subscribed source for the next crawl 3012. The self-service source can match the end user's credentials with the template source 3014, such that during crawl on the personalized target sources, authentication can be accomplished by augmenting the individual end user and the source credentials with certain target repositories to the documents on the target repository are only available for search to that particular user 3016.

Minimum Lifespan Credentials for Crawling Data Repositories

As discussed above, it is desirable to provide a secure search mechanism to provide for searching over any and all content, such as across an enterprise. A secure search, however, requires access to the secure content repositories holding the data to be searched. In some cases the credentials required to crawl a repository may be extremely sensitive, or the user may be reluctant or unwilling to store user identification information in memory or on disk for any longer than is absolutely necessary. Storing passwords in a repository can provide a mechanism, for example, by which hackers can access multiple systems. In cases such as these, it can be desirable for the search system to store username, password, or any other such authenticating information for the minimal amount of time required in order to crawl the data. Traditionally, these credentials are stored in the search system along with the other settings for a data source, which can be a default setting, but a user or administrator, for example, may select not to allow such information to be stored. It therefore is necessary to provide a way to provide search capabilities for these situations.

Figure 30B:
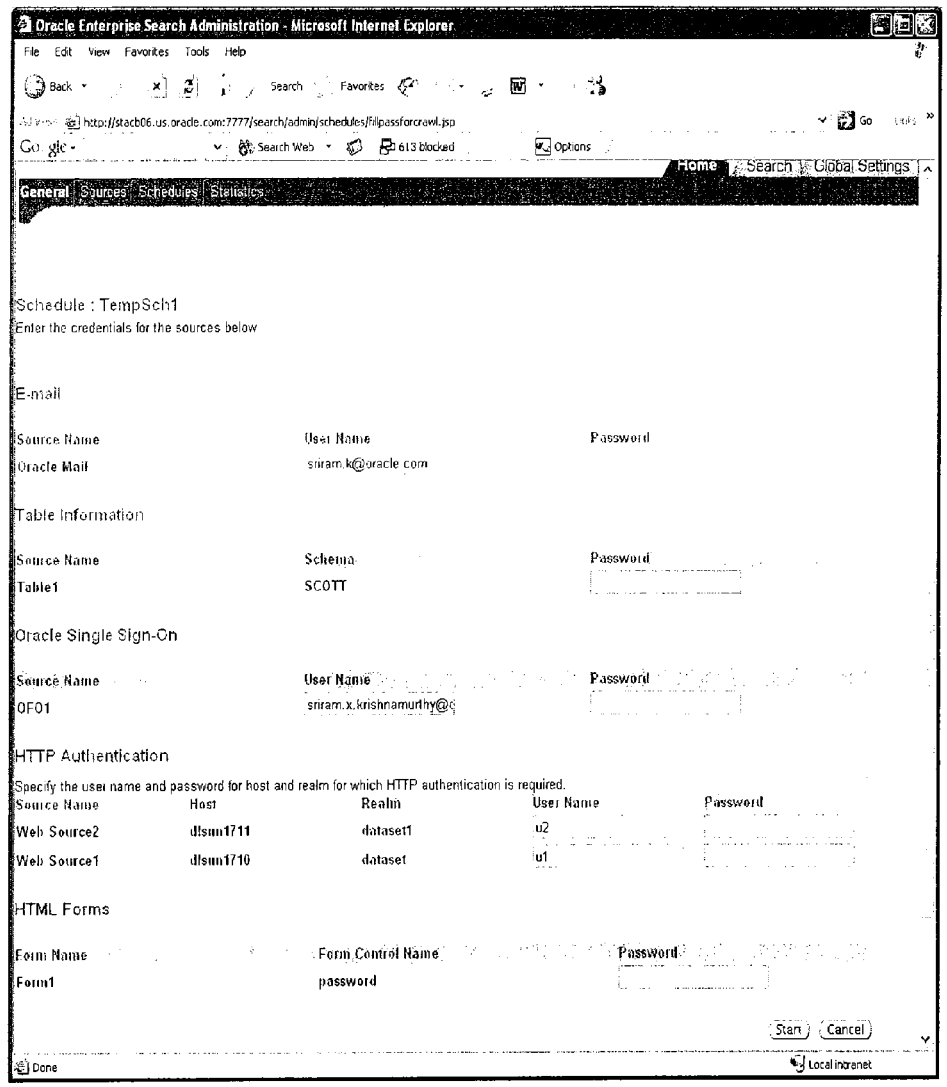

Systems and method in accordance with various embodiments allow a data source configuration to indicate that credentials for crawl on that source should not be stored permanently with the remainder of the settings. Such an approach can require a manual launch by an administrator or user with sufficient credentials in order to crawl, for example, an enterprise or backend repository. In one embodiment, a constraint is placed on the crawler schedule so that it cannot be launched automatically, since it will require human intervention to provide the credentials for crawl. When a crawl is subsequently launched, the search system can detect whether the source and/or user has a "temporary passwords" or other such setting enabled. If so, the administrator or user can be prompted to enter the required credentials, such as through a popup window of an appropriate GUI or an interstitial page in a web application flow 3050 as illustrated by the screen of FIG. 30(b). After the sensitive crawling credentials are entered, the credentials can be stored in appropriate temporary storage (such as cache or resident memory) and can deleted as soon as possible. In one embodiment, the table sources require a database link that is used throughout the crawl, and then is deleted when the crawler finishes. In another embodiment, the credentials are deleted when the crawl for the source is started successfully, or when the crawling schedule is stopped, paused, or interrupted for any reason. The credentials also can be deleted when the host system is restarted, in which case the credentials are removed upon first start of the search system.

Such a temporary password feature allows a search administrator or user to indicate that a highly sensitive set of credentials should not be stored permanently on the search system. This gives higher control to an organization in managing security, as well as to individual users with security concerns.

Figure 31A:
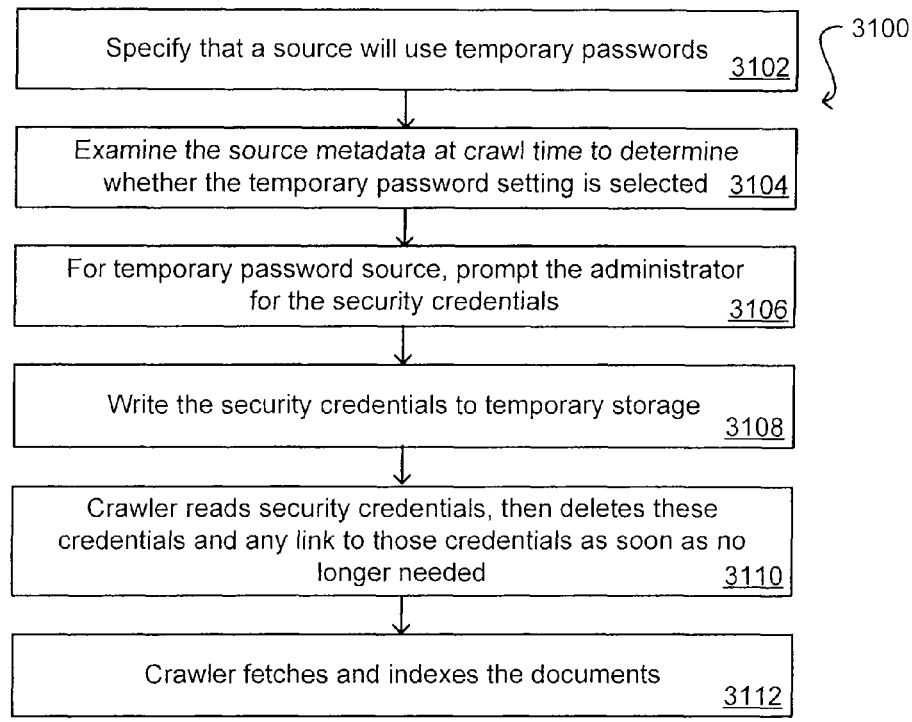
FIG. 31($a$) illustrates an exemplary process for providing a minimum credential lifespan that can be used in accordance with one embodiment of the present invention.

FIG. 31(a) illustrates an exemplary process 3100 for providing minimum credential lifespan in accordance with one embodiment. In this process, an administrator setting up a source specifies that the source will use temporary passwords 3102. At crawl time, the source metadata is examined to determine whether the temporary password option is selected 3104. For a source with the temporary password option, the administrator is prompted to enter the security credential information necessary to crawl that source 3106. The security credentials are written to temporary storage 3108. The crawler reads security credentials, then deletes these credentials and any link to those credentials as soon as they are no longer needed 3110. The crawler then fetches and indexes the documents 3112. This deletion in one example is done at the end of a crawler callback, while in other systems the credentials may simply be stored in memory for the crawler process then deleted when no longer necessary. Such a process also can be done for an individual user, whereby the user can set an attribute specifying that security credentials for the user should not be stored on the system and that the user should be prompted for credential information before searching, querying, etc.

Figure 31B:
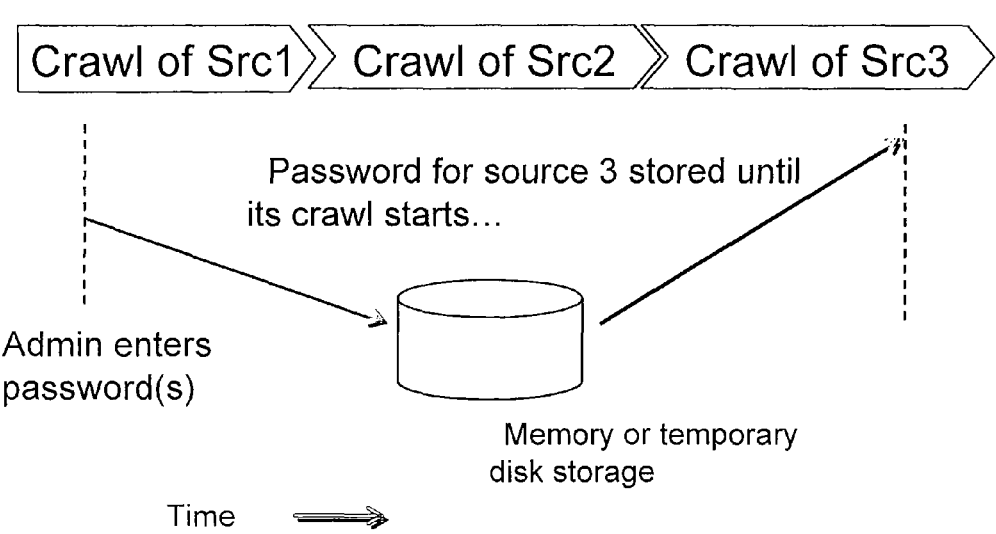

In some cases multiple sources can be crawled sequentially with the same crawler process, and if more than one of these sources has this feature it may be necessary to retain the security credentials until they are no longer needed by the crawler to access any of the multiple sources to be crawled. If different credentials are used for each source, then the user can have the option of entering all the credentials before the crawl begins, or entering the credentials for each source as they are needed. All information can be stored automatically by default, but user can have the option of entering the information manually instead as needed. The user may then lose any ability to crawl those sources automatically. For example, FIG. 31(b) illustrates an exemplary temporary passwords timeline 3150.

As mentioned above, if a crawl is stopped, the system reboots, or there is another such cause for premature stoppage of the process, the credentials can be cleared from memory. There can be hooks in the relevant code so that, in the event of any stops or restarts, the source can be checked to determine whether the source has the temporary password feature enabled, and if so, any references to the credentials can be deleted. If system restarts, any credentials stored under this feature can be deleted.

Other embodiments allow the 'temporary passwords' option to be enabled for self-service sources. In such a self-service setup, the crawler schedule will be controlled by an administrator. The credentials will be provided by the end-user when subscribing to the source. This contrasts with the generic scenario for temporary passwords, in which the administrator would provide the secure crawling credentials at crawler launch time. However, in the self-service scenario for temporary passwords, the credentials will be deleted upon next crawl. This will allow for a one-shot crawl of the data, unless the credentials are subsequently re-entered by the end user. The credentials will likely be stored for much longer in this setup, as the crawler schedule is not controlled by the user and will therefore be likely to launch much later.

Suggesting Web Links and Alternate Terms for Matching Search Queries

As discussed elsewhere herein, suggested links returned with a search results page can allow an administrator, source provider, etc., to define URL hyperlinks to be presented to a user in response to a search query. Any suggested links that are returned can supplement the search hit list. This feature can be used to register a set of links to authoritative web pages and have those displayed at the top of the search results, for example, or to register a set of links to Web pages that are not crawled, but still have them returned for certain search queries. This feature also can allow an administrator to map search queries directly into Web applications.

Further, alternate keywords can be used to allow a search system to provide a user with alternative keywords to be used for a search query. These alternative terms can be useful for fixing common errors that users make when entering search queries, such as spelling mistakes, or for suggesting different keywords, such as synonyms, product codename, acronyms, or abbreviations.

In order to provide these features for an installed search system, an administrator must configure these systems such that they are triggered for appropriate search queries. This can be tedious if specific query terms are specified or computationally expensive if a flexible match such as regular expressions are used.

Systems and methods in accordance with various embodiments can provide improved functionality by taking advantage of a text rule index, such as is supported by Oracle Text (CTXRULE), which allows matching rules for suggested links and alternate keywords to be specified in a flexible and performant manner. A suggested link or alternate keyword definition in accordance with one embodiment is a mapping between a rule pattern and a hyperlink or alternate term. These definitions can be stored in a search configuration repository, for example, can be used to build a rule index that maps a query string to a set of matching suggested links and alternate keywords. The rule language can allow for the use of certain operators to define the matching rule pattern for a suggested link. The operators can include AND, OR, NOT, PHRASE, STEM, ABOUT, NEAR, WITHIN, or THESAURUS.

Utilizing a text rule index for matching search queries to suggested link and alternate keyword definitions stored in the search system, an administrator is given a flexible means to specify hyperlinks or alternate search terms for incoming queries. Such a system is more flexible than a strict string equality match, more performant than full regular expression support, and utilizes some traditional linguistic Text features such as word stemming.

An application such as Oracle Text typically uses standard SQL to index, search, and analyze text and documents stored in a database, in files, and on the web. Oracle Text can perform linguistic analysis on documents, as well as search text using a variety of strategies including keyword searching, context queries, Boolean operations, pattern matching, mixed thematic queries, HTML/XML section searching, and so on. The application can render search results in various formats including unformatted text, HTML with term highlighting, and original document format. Oracle Text supports multiple languages and uses advanced relevance-ranking technology to improve search quality, and offers features such as classification, clustering, and support for information visualization metaphors.

Embodiments in accordance with the present invention can take advantage of such text rule index functionality to index on actual incoming search queries, instead of simply performing document classification as in current usage scenarios. Such a feature allows for the defining of rules that can be applied to a query in order to locate the links or alternate keywords that most closely match the query. As discussed above, existing ways of matching keywords typically use patterns or regular expressions that are defined. Using a text rule index feature allows an index to be created for the rules to be used for the query. Subsequently, when a query is received, a matching procedure can use the rule index to determine the rule that most closely matches the query.

A query containing a text expression with multiple terms then can be matched in a number of different ways using a rule language and applying the rules to each variation. For example, a search expression such as "dog sled" can be examined using variations such as "dog AND sled," "dog OR sled," the phrase "dog sled," or using a stem such as "$dog." Each of these variations can match different rules that can have associated therewith different suggested links or alternate terms. The different results then can be scored to determine which provide the best match to the query in order to suggest links or terms that are most appropriate for the query.

There also can be additional features to improve the results. Synonyms, terms in other languages, and several other variations also can be built into such a feature, such a feature also can consider uni-grams, bi-grams, tri-grams, and quoted phrases. When multiple phrases exist in a query, the longest phrase can be matched first in order to provide the most likely suggestions. Variations also can include iterative term replacement, nesting, space ignoring or adding, analysis of word boundaries, and case sensitive matching.

Figure 32:
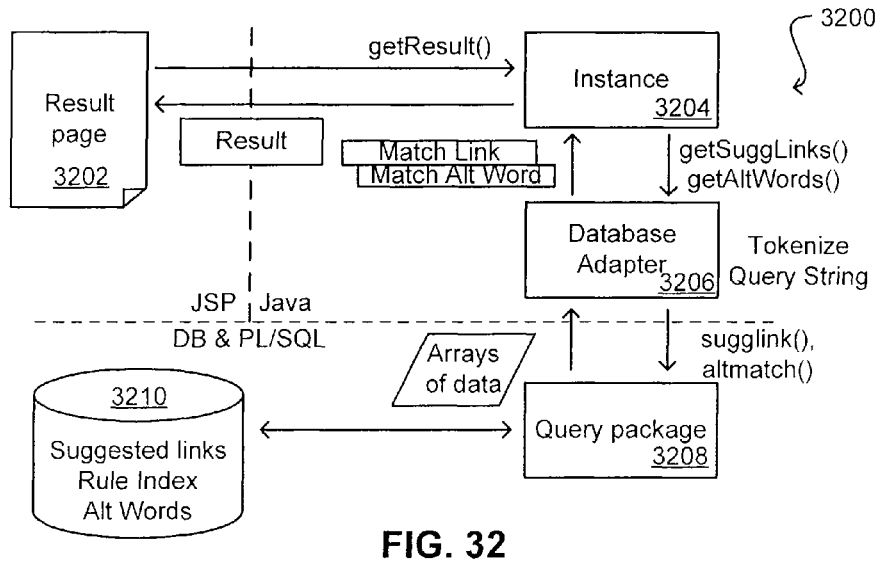
FIG. 32 illustrates an exemplary flow for returning suggested links and alternate keywords to a user that can be used in accordance with one embodiment of the present invention.

FIG. 32 illustrates a flow 3200 for returning suggested links and alternate keywords to a user in response to a search query. In this flow, a method such as getResult( ) is called to get the suggested links and alternate keywords in response to the search query, passing the actual text query or portions thereof. The method call can be received by an application instance 3204 operable to call methods such as getSuggLinks( ) and getAltWords( ) to get a set of suggested links and alternate keywords to be returned to the user. A database adapter 3206 can tokenize the query string and pass the tokenized string to a query package 3208 operable to query the repository 3210 and receive back the links and alternate keywords based on the rule index. Arrays of data then can be returned to the application instance, which can do a matching of the data in the arrays to determine the suggested links and alternate keywords to be displayed to a user in a search results page 3202 for the query.

Figure 33:
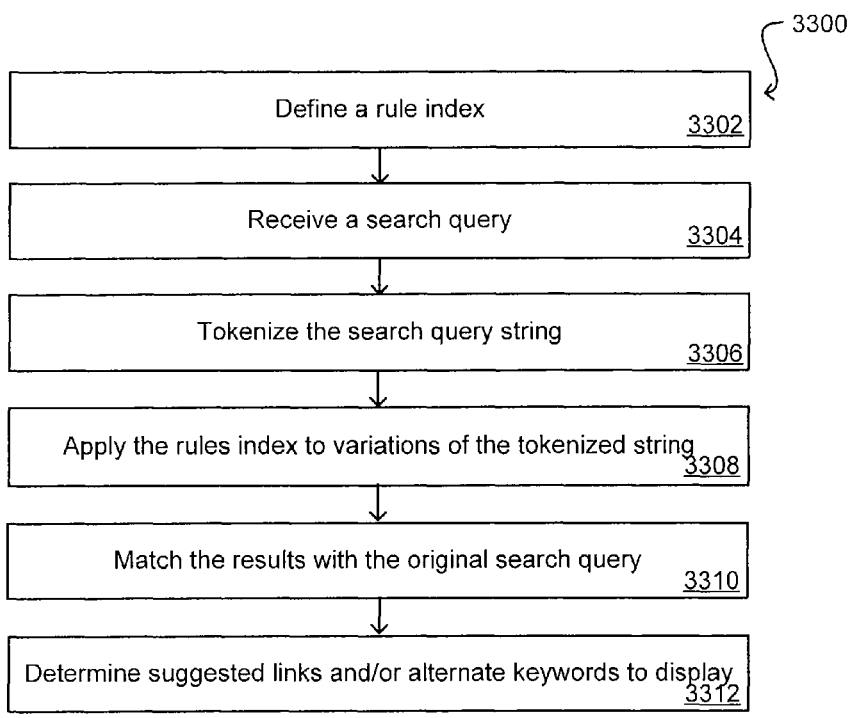
FIG. 33 illustrates an exemplary process for determining suggested links and/or alternate keywords that can be used in accordance with one embodiment of the present invention.

FIG. 33 illustrates steps of an exemplary process 3300 for determining suggested links and/or alternate keywords that can be used with a flow such as that of FIG. 32. In this process, a rule index is defined for a repository, application, or source 3302. When a search query is subsequently received from a user 3304, the query string can be tokenized 3306 and a rules index can be applied to variations of the tokenized query string 3308. The results can be matched with the original query 3310 to determine suggested links and/or alternate keywords to be displayed to the user in a search results page 3312.

Secure Search Performance Improvement

Figure 34A:
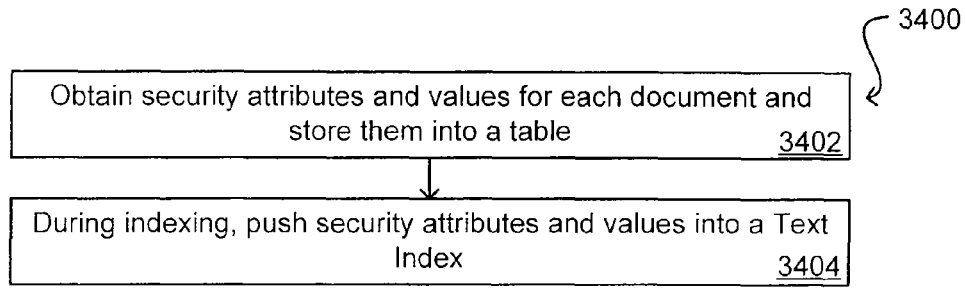
FIGS. 34($a$) and ($b$) illustrate an exemplary process for appending user-defined security attributes to a document or query that can be used in accordance with one embodiment of the present invention.

Systems and methods in accordance with embodiments of the present invention also can provide for the pushing of user-defined security attributes. An exemplary process 3400 for pushing such user-defined security attributes to the text index is illustrated in FIG. 34(a). In this process, during crawling, user-defined security attributes are sent to crawler, which stores those attributes into a table 3402. When indexing is called, the stored security attribute values are pushed into the text index 3404.

Figure 34B:
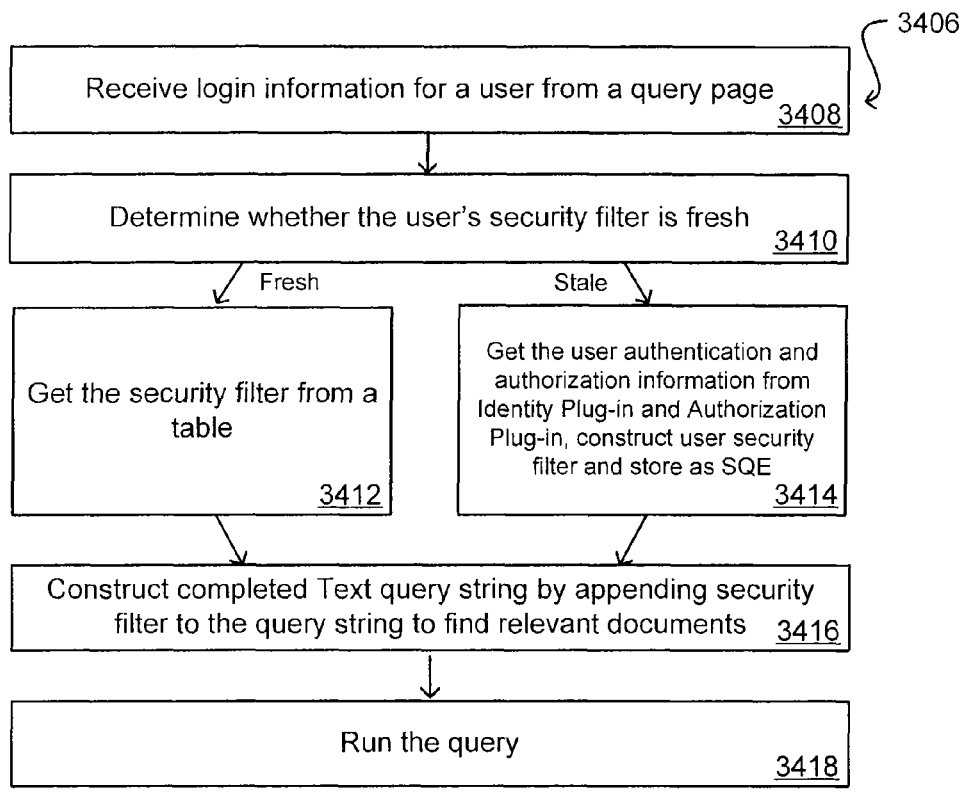

An exemplary process 3406 for using secure search is illustrated in FIG. 34(b). A search user needs to log in to query page to do a secure search 3408. After the user passes the authentication, SES checks whether there is a fresh security filter for the user 3410. If the security filter for the user already exists and it is fresh enough, then the security filter is obtained from a table 3412. If there is no security filter for the user, or stored security filter is stale, then SES communicates with identity plug-in and an authorization plug-in to obtain authentication and authorization information for the user, creates a security filter for the user, and stores the filter into a table 3414. The security filter is appended to the query 3416. Finally, the whole query string is executed and hit list is returned 3418.

Link Analysis for Enterprise Environment

As discussed elsewhere herein, a secure enterprise search system can search crawled pages within a repository and calculate a link score for each crawled page using any of a number of standard scoring algorithms. However, standard link score algorithms do not work well for the enterprise environment. One reason for this problem is the occurrence of same host links, for example. Generally speaking, pages which have more incoming links have higher link scores. For example, all child documents might have links to a top page or parent document. In this case, the top page gets a very high raw link score. This kind of thing can be seen very frequently in the enterprise environment, like a site which has a users manual or some internal web application. To avoid these biased scores, an improved secure enterprise search system ignores the links within the same host during the link score calculation.

The link score calculation is called a post-indexing process. The link information (which page has a link to which page) is stored in a table with a flag that indicates whether the link is a same host link or a different host link during crawling. During the link score calculation, same host links are ignored and only the different host links are counted. After the link score calculation, some documents have the link score of the document. Since SES ignores same host links, there are documents that do not have the link score. At this point, the link score is a small fractional number. SES can bucketize the link score into, for example, 1, 2, 3, 4, and 5. A bucketized link score of 5 can be given to the top 0.5%, 4 to the following 1.5%, 3 to the next 8%, 2 to the next 20%, and 1 to the others (70%). As described already, there are documents that have no bucketized link score. The bucketized link score can be pushed into the text index using LIN tag (stands for LINkscore) of a MDATA section. The value in the MDATA section can be updated without re-indexing the whole document. Since the text indexing is completed before the link score calculation, SES can store the bucketized link score (1, 2, 3, 4, or 5) to each document's MDATA section.

During query time, the most relevant documents for a query should be shown first. Documents that have a higher link score are regarded as more relevant documents. Since SES returns hits in Oracle Text's scoring order in one embodiment (Oracle Text uses an inverse frequency algorithm based on Salton's formula), SES needs to push up Oracle Text's score of the documents that have higher link score. For example, the Oracle Text query string that finds documents that have query term "ORACLE" and bucketized link score 5 looks like:

ORACLE and MDATA (LIN,5)

Here, MDATA(LIN,5) is used to find documents that have "5" in MDATA tag "LIN". This query is not sufficient because the query cannot find documents that have "4" in MDATA tag "LINK". So more conditions can be added.

ORACLE and
(MDATA(LIN,5), MDATA(LIN,4), MDATA(LIN,3), MDATA(LIN,2), MDATA(LIN,1))

This query string finds documents that have query term "ORACLE" and linkscore 1, 2, 3, 4 or 5. A higher text score can be given to documents with linkscore 5 than for others. To satisfy this, SES can use a weight operator, such as is given by:

ORACLE and (MDATA(LIN,5)*15, MDATA(LIN,4)*12, MDATA(LIN,3)*9, MDATA(LIN,2)*6, MDATA(LIN, 1)*3)

By giving different weight for different linkscore, SES can map linkscore to Oracle Text score.

Figure 35:
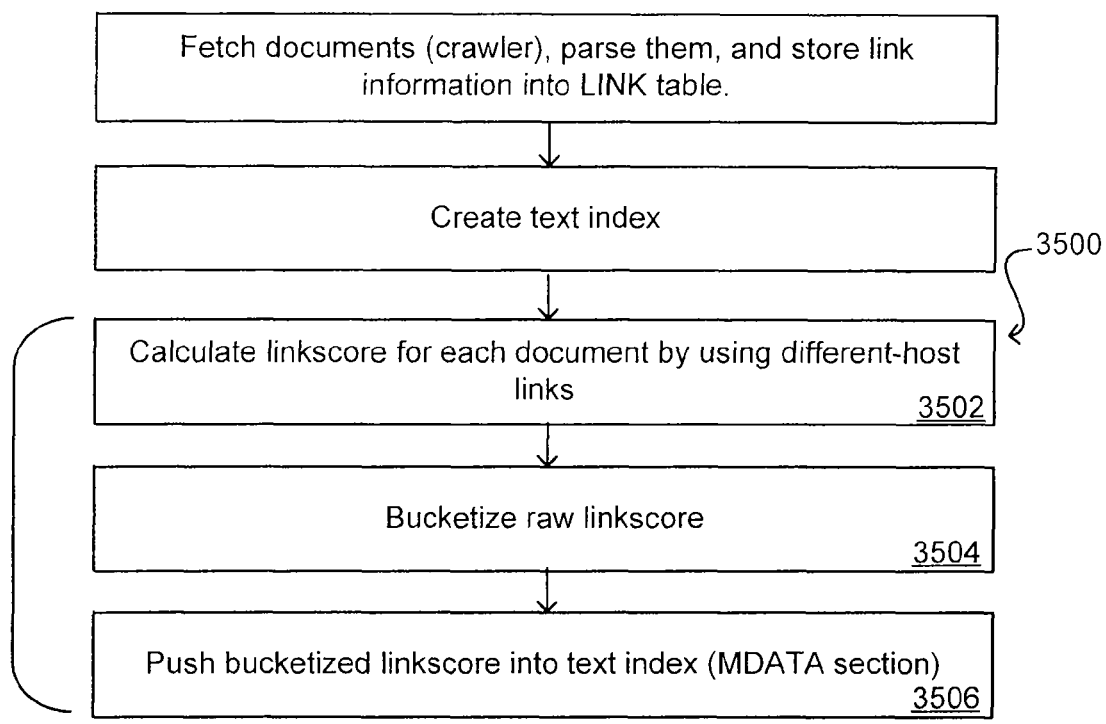
FIG. 35 illustrates an exemplary method for providing improved link analysis that can be used in accordance with one embodiment of the present invention.

A method 3500 for providing improved link analysis for a secure enterprise search system is illustrated in FIG. 35. This method is called as a part of crawling pipeline process after indexing 3502. The calculated raw link score is bucketized to either 1, 2, 3, 4, or 5 based on the link score value 3504. Then, the bucketized link score is pushed into the Oracle Text index using MDATA section 3506.

For example, a returned results list with pages such as Refresh, Left Border, CVS Repository, Products, and Customer Profiles is replete with examples of same host links. The previous list with the entire URL listed shows the top 10 results using all links. On the other hand, a list that includes results such as Oracle Corporation, Oracle Partnet Network, Oracle Corporation Metalink, Support Time Scheduling, Legal Notices, Interim Privacy Notices, and Oracle Products is a better list than the one above with fewer instances of same host links in the results returned to the end user.

Propagating User Identities in a Secure Federated Search Environment

As discussed above, information within a single enterprise can be spread across Web pages, databases, mail servers or other collaboration software, document repositories, file servers, and desktops. Further, many data sources are protected from certain individual users. A secure enterprise search system that can provide uniform search capabilities across multiple repositories would increase enterprise productivity. The administrator for an enterprise search system may not have access to all data if the data is collected in a service-to-service (S2S) arrangement or a broad set of login information for certain different target repositories unless a trust relationship has been established between the target application and an enterprise search application. For example, one application of the enterprise may require user name, domain and log-in password. However, another application may require information such as a last name, second password, and department. In situations where a search administrator does not have full authorization to access a data source, providing search over the protected content within the enterprise may not be possible.

It therefore can be desirable to provide a "generic" or universal framework that allows for searching across multiple search platforms in a secure federated search. A federated source is a repository that maintains its own index. A secure federated search is therefore one that is capable of searching across multiple indexes, each with its own identity management system that is unique from other management systems across the enterprise. A federated broker can be used to transform a user search query for each of a group of disparate sources so that each transformed query instance has the appropriate syntax for the respective source. The federated broker then can merge the results from the data sources, remove any duplication from the multiple sources, and present the results in a unified format to the user so that the results appear to have come from a single source. A secure enterprise search system with a universal framework is able issue a search whereby a repository can return results even across multiple repositories that each require different security authentication.

It also can be desirable to provide a crawler to collect data from these multiple disparate sources, where the crawler is a component of an overall secure enterprise search system capable of implementing a software solution that propagates user identities in a secure federated search system. In a unified framework a single user query can be used to search against multiple disparate local or remote data sources or search applications, the results from these data sources then being merged based on some predetermined criteria, such as relevancy scores of items in the results and a single unified result is returned to the user. Typically federated search involves a broker search instance to which the end user submits a search query and the broker translates and submits the query to multiple disparate search instances on behalf of the end user. Query translation, hit-list merging, de-duplication are some of the well known problems in existing federated search approaches.

In the context of secure federated search, each of the data sources or search instances involved can have a unique way of enforcing security as to which data is accessible for search by an end user. For example, access policies can be based on users or groups, at a document level or data source level, etc. Each of the search instances also can be connected to different identity management systems to authenticate a user and enforce access privileges. However, one challenge is that one user may have different identities and credentials on different identity management systems. In this case, a user could be identified by a username on one system and by an application user identifier on another system. Thus, passing user credentials from one system to another is not always feasible. In federated search, when a broker search instance federates the query to different search instances on behalf of a user, the user identity must be translated appropriately for different search instances.

Figure 36:
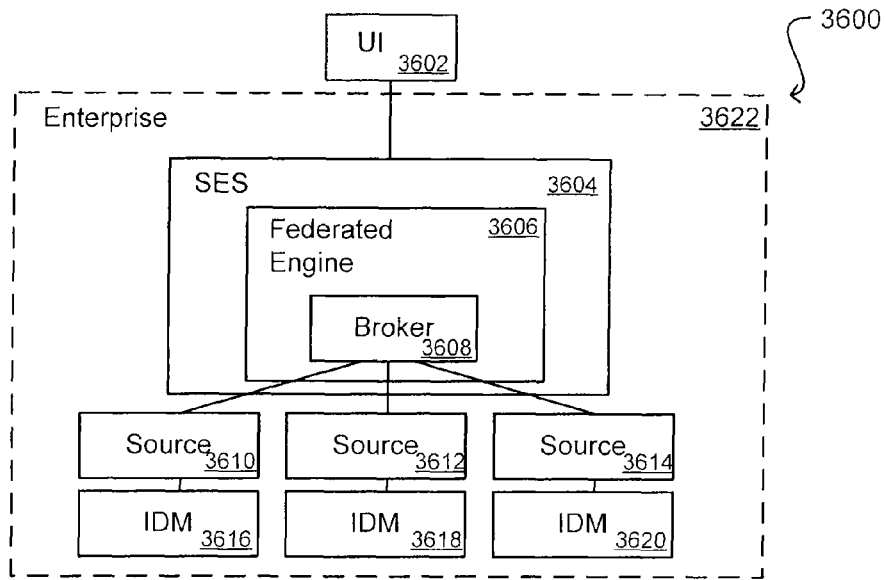
FIG. 36 illustrates an exemplary SES configuration that can be used in accordance with one embodiment of the present invention.

Systems and methods in accordance with various embodiments overcome the aforementioned and other deficiencies in existing federated search systems by providing a universal framework for a secure enterprise search system that is capable of propagating user identities across a federated search environment. The framework can utilize a federation broker operable to federate the query system to each federated source, configured on the broker, on behalf of the authenticated end user. The method used to propagate the end user identity and user query to the federation endpoints can depend upon the configuration of the federated sources and/or the search instances themselves. In a federated search environment, each search application has a different authentication and identity management process, such as is illustrated in the configuration 3600 of FIG. 36. A user can provide user authentication information and search or query information through a user interface 3602, such as a standard browser search page. The can be received by a secure enterprise search system 3604 for an enterprise 3622, which can handle the user authentication and authorization as discussed elsewhere herein. The SES system can include a federated engine based on a universal framework 3606 that can utilize a federated broker 3608 to translate a query from the user for each of a plurality of different applications or sources 3610, 3612, 3614 across the enterprise 3622. Since each of these sources can be associated with a different identity management system 3616, 3618, 3620, the federated broker can obtain the authenticated user identification information and normalize or translate the user identities from the various sources. The broker can propagate the transformed queries to the sources and receive back the results. The federated broker then can consolidate the federated search results to be displayed in a search results display page of the user interface 3602. In this way, one common unified framework can be used to obtain and display results for an end user.

Figure 37:
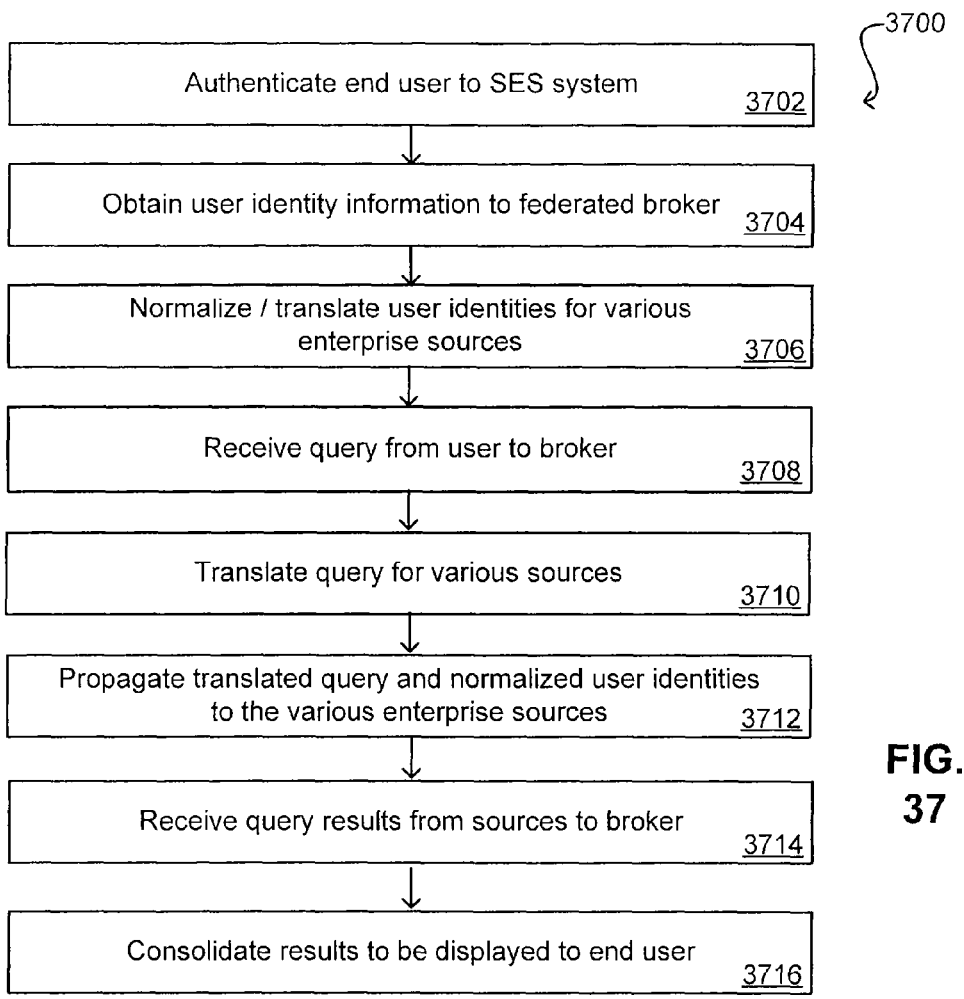
FIG. 37 illustrates an exemplary method for propagating user identities that can be used in accordance with one embodiment of the present invention.

FIG. 37 illustrates steps of an exemplary method 3700 for propagating user identities in accordance with one embodiment of the present invention. In this method, an end user logs in and is authenticated to the SES system 3702. A federated broker can obtain the individual user credentials for each source to be searched across the enterprise for the authenticated user 3704, and can normalize and translate the user identities from the various sources 3706. When a query is received from the user 3708, the federated broker can translate the user query for the various sources 3710, and can propagate the translated queries to the various sources using the normalized user identities to access each source, appearing to each source as the end user 3712. When the federated broker receives back the results from the sources 3714, the broker can consolidate the results to be displayed to a user in a uniform manner 3716.

User identities also can be propagated using a universal framework for secure federated search when the same end user has different identities on different search applications. For example, one search application may utilize an identity management system requiring user name, password, and domain for logging in, while a second search application within the same enterprise system may require information such as a first name, last name, and a second password. In such cases, the various user identities can be mapped appropriately by the broker or endpoint before secure search is performed. This mapping can be accomplished by an identity plug-in, for example, that can be registered on the search application based on the mapping attribute in the identity managements (IDM) system.

In accordance with one embodiment, propagating user identities in a secure federated search may also be implemented in a single sign-on (SSO) federation environment. In SSO, all search instances are connected to the same identity management system IDM, and the broker instance is protected by SSO. No special configuration typically is needed for secure federation. If the SSO is based on cookies, the broker can pass the SSO cookie for an authenticated user seamlessly to the endpoint application for each query, and an endpoint application can authenticate the user based on the cookie.

Figure 38:
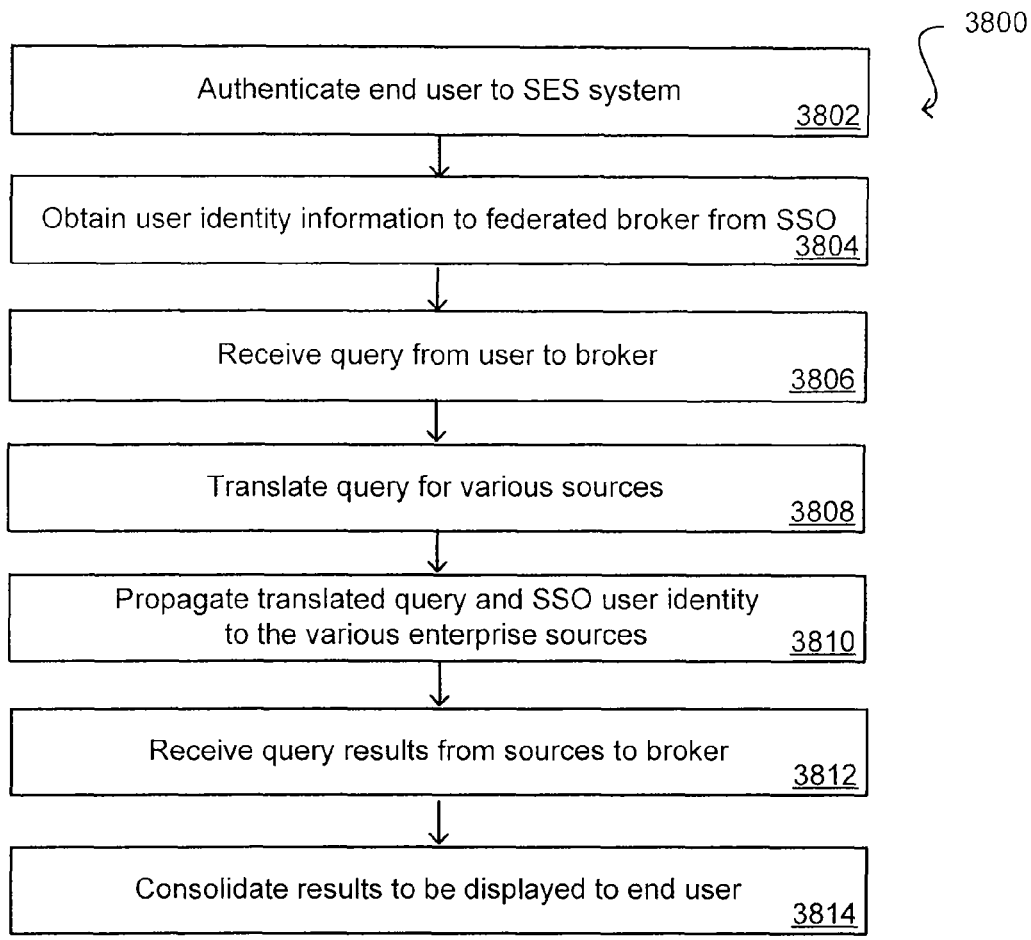
FIG. 38 illustrates an exemplary method for propagating user identities with a single sign-on (SSO) process that can be used in accordance with one embodiment of the present invention.

FIG. 38 illustrates steps of an exemplary method 3800 for propagating user identities with a single sign-on (SSO) process in accordance with one embodiment of the present invention. In this method, an end user logs in and is authenticated to the SES system 3802. Since the system utilizes SSO, all search instances are connected to the same identity management system such that a federated broker can simply obtain the user credentials for SSO 3804. When a query is received from the user 3806, the federated broker can translate the user query for the various sources 3808, and can propagate the translated queries and SSO identity credentials to the various sources in order to access each source, appearing to the source as the end user 3810. When the federated broker receives back the results from the sources 3812, the broker can consolidate the results to be displayed to a user in a uniform manner 3814.

Auto Generation of Suggested Links in a Search System

When searching using a standard Web-based search engine, for example, the search result page for a user often will include links to pages containing content related to the user search. Such links can help to user navigate to other sites that might be of interest, and might be setup by a manual mapping or association of links with keywords in the search. For example, when searching using a keyword such as "car," an automotive Web site might have an agreement with a search provider that a link to that site will be displayed as a suggested link whenever the term "car" appears in the search query. This suggested link then can appear regardless of whether the link appears in the search results. When a user is crawling the Internet, for example, the user might not care which links are returned as search results and which are displayed as suggested links. When a user is searching across an enterprise, however, the user might have certain expectations as to the types of search results that will be returned. When searching across an enterprise system, the pages or documents of that system might include links to external pages. For example, an office services page might include a link to the U.S. Postal Service. A user searching for a term such as "mailing address" across an enterprise will not expect to see a link to the external US Postal Service site in the enterprise results. Such information, however, may still be useful to the user. These links also can have anchor text providing a brief description of the link, such as "patent" for a link to the U.S. Patent and Trademark Office. These links can be fetched during a crawl, and a typical search system might either ignore these links, as they are not part of the enterprise corpus, or show them in the result page. In the case of the former, the user does not get these relevant links, and in the case of the latter this might be confusing if the user is not expecting to see results not in the enterprise corpus.

Systems and methods in accordance with various embodiments can automatically add these "external" links as suggested links when discovered during a crawl of enterprise application(s), for example. Keywords for triggering the suggested links also can be auto-generated, such as by using anchor text associated with a link or text around a given link. In some embodiments, the links can actually be traversed to determine the title or other relevant words from the page, which then can be added as keywords for the suggested link. If the crawl is a portal crawl, external links typically are represented as URL items, which can be processed in the same way.

Finding a URL that is not in the enterprise corpus can be difficult, as crawlers typically are configured with boundary rules and URLs that are outside the boundary may be valid candidates for consideration. However, during a crawl of other enterprise sources these URLs might themselves be crawled, such that it can be desirable to purge the links from the suggested link section as they are no longer considered to be external links. During a crawl, then, any URL that is crawled that is the same as an auto-generated suggested link can be dropped from the suggested links section.

Figure 39:
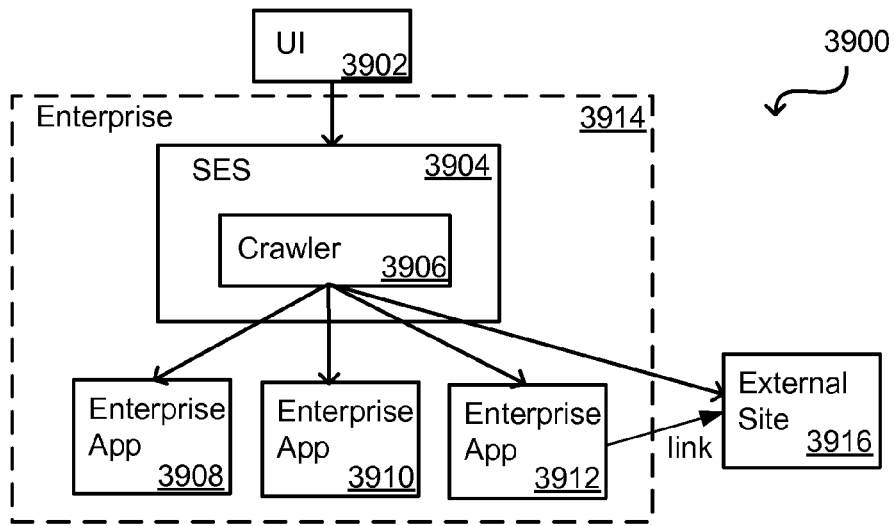
FIG. 39 illustrates an exemplary configuration wherein a user can attempt to search across an enterprise in accordance with one embodiment of the present invention.

An advantage to such an approach is that external links can easily be separated from actual content in the corpus. For example, FIG. 39 shows a configuration 3900 wherein a user, through a user interface 3902, can attempt to search across an enterprise 3914. SES 3904 can receive the request, and a crawler 3906 can attempt to crawl the appropriate applications 3908, 3910, 3912 or sources across the enterprise. During the crawl, the crawler 3906 might locate a link to an external site 3916. It would be desirable to be able to easily and automatically separate the information from the external site 3916 from information contained within the enterprise corpus 3914. Further, it would be desirable to automatically generate suggested links and keywords using this "external" information that would make it easy for users to identity pages of "related interest."

Figure 40:
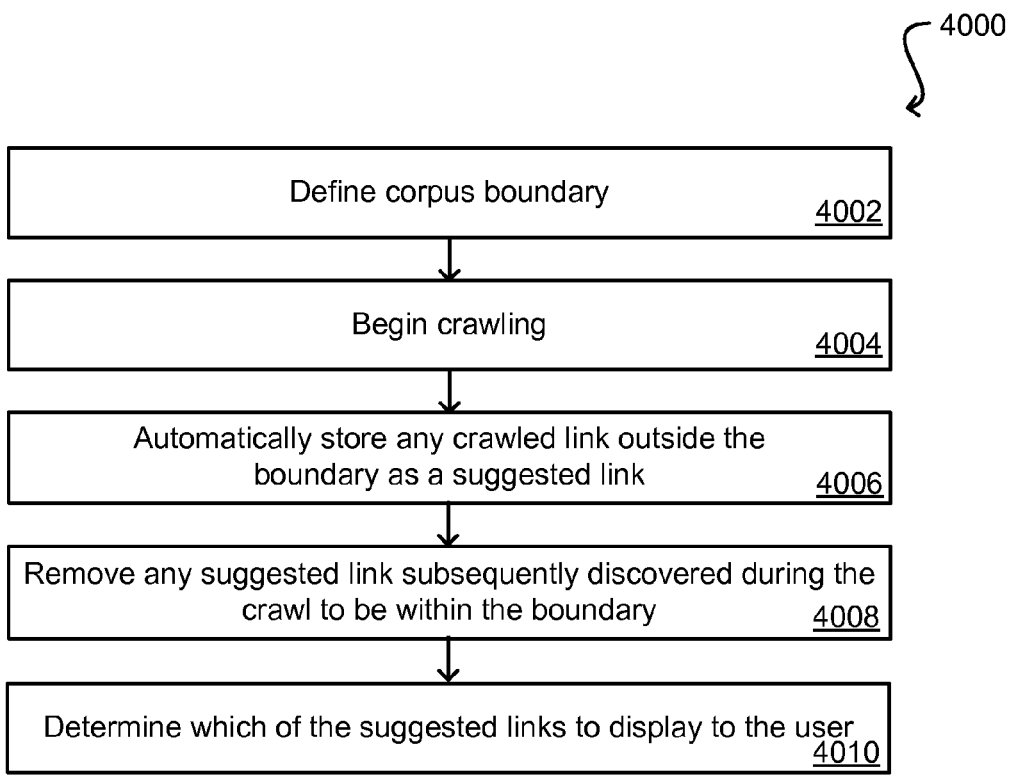
FIG. 40 illustrates an exemplary process for generating suggested links that can be used in accordance with one embodiment of the present invention.

An exemplary process 4000 for generating such suggested links is illustrated in FIG. 40. In this process, a boundary is defined as to the corpus to be searched 4002. A crawler then can begin crawling across an enterprise 4004. When the crawler encounters a link that is outside the corpus boundary, the crawler can automatically store that link as a suggested link for the search 4006. If a suggested link is encountered within the boundary during the crawl, then that link is removed from the list of suggested links 4008. Upon completion of the crawl, a mechanism such as relevancy scoring can be used to determine which suggested links to show to the user, separate from the search results, along with the number of suggested links to show 4010. In other embodiments, the administrator or user can set how many suggested links to be shown.

Using such a process, any tag or link that is discovered through a crawl can be used to populate the search result list or a suggested link list. An advantage to such an approach is that a user searching for a term such as "patent" on the a company site can automatically be provided with a link to the patent office as a suggestion, which might be very useful to the user. Further, this suggestion need not have been mapped or otherwise set beforehand, as this association is made automatically during the crawl. Further, this external link is not displayed in the main results, as the user will not expect to see patent office links when searching within the company corpus.

The system also can obtain suggested keywords by following an external link. For example, a link to an external document might simply indicate something such as "doc," which is not very useful or descriptive. A crawler can follow the link, however, then retrieve and parse the document in order to obtain more useful keywords. In one embodiment, a crawler automatically attempts to determine the title of the document and extract useful keywords. For example, the "doc" link might be associated with a document entitled "forensic examination," which can provide useful suggested keywords (and a useful suggested search phrase) and can be used to provide appropriate keywords for the suggested link. In another embodiment, anchor text for these external links can also be used as keywords. Such an approach can be done when crawling any appropriate source, such as a Web site, email application, calendar application, enterprise application, portal site, etc. And if during crawling it is determined that the link is actually part of the enterprise corpus (e.g., another source that is discovered during the crawl), the suggested link can simply be deleted to clean up the suggested results.

Adding Document Date to Relevant Ranking Factors

When crawling documents, there are cases where it is preferable to rank documents more highly that have a more recent "created" or "modified" date. For example, when searching email messages it can be desirable to give higher priority to more recent messages, even though the content of the returned messages might otherwise earn a common score. Further, in a calendaring system, it can be desirable to give higher priority to recent meetings with a given client. In existing systems, most documents that should be ordered by modified date are instead returned with same relevant score. It therefore can be desirable to utilize a document modified date, for example, as a score tie breaking factor.

In one embodiment, a hit list re-rank process is used wherein documents are fetched one by one from the hit list that is generated by an inverted text index. The relevant score of each of these documents then can be adjusted according to other factors. When fetching each document and obtaining the relevant score, the modified date also can be obtained. In order to re-order documents according to the relevant scores and last modified date, an output buffer can be used which contains a list of items ordered by keys. A document, as an item of the buffer, can be inserted and ranked in the buffer by document key. The buffer typically will have a limited size, such that whenever the buffer is full an item with the smallest key can be output from the buffer.

Information such as a revised relevant score, last modified date, and a sequence number can be inserted into the document key. The key in one embodiment is an integer number, with a high segment of digits occupied by the relevant score, a middle segment of digits occupied by the last modified date, and a low segment of digits occupied by the sequence number. The key can be, for example:

(max_relevant_score−relevant_score)*1000000+recency*10000+sequence where max_relevant_score is 1000, and relevant_score, recency, and sequence are all integers. Recency in one embodiment is computed using the following pseudo-code:

```
recency = |sysdate-last_modified_date|; -- in number of days
when recency >30 then recency = 30 + recency/30;
when recency > 99 then recency = 99;
when recency < 0 then recency = 99.
```

The value of sysdate here is dynamically generated to denote current server date. Such an approach allows documents to be ranked by distance in days from the current time. The closer to the current day the document has been modified, the more highly the document will be ranked.

The sequence is the sequence number in which the document is fetched from the original hit list, such as from Oracle Text. The sequence number can be used to avoid duplicate keys, which is undesirable for current output buffer designs. In one embodiment, last_modified_date and sysdate are normalized to a standard global time for purposes of comparison. In federated search case, different search servers can provide different hit lists, each being ranked using the same algorithm with the same standard global time, so that the scores from different servers can be compared and sorted.

Figure 41:
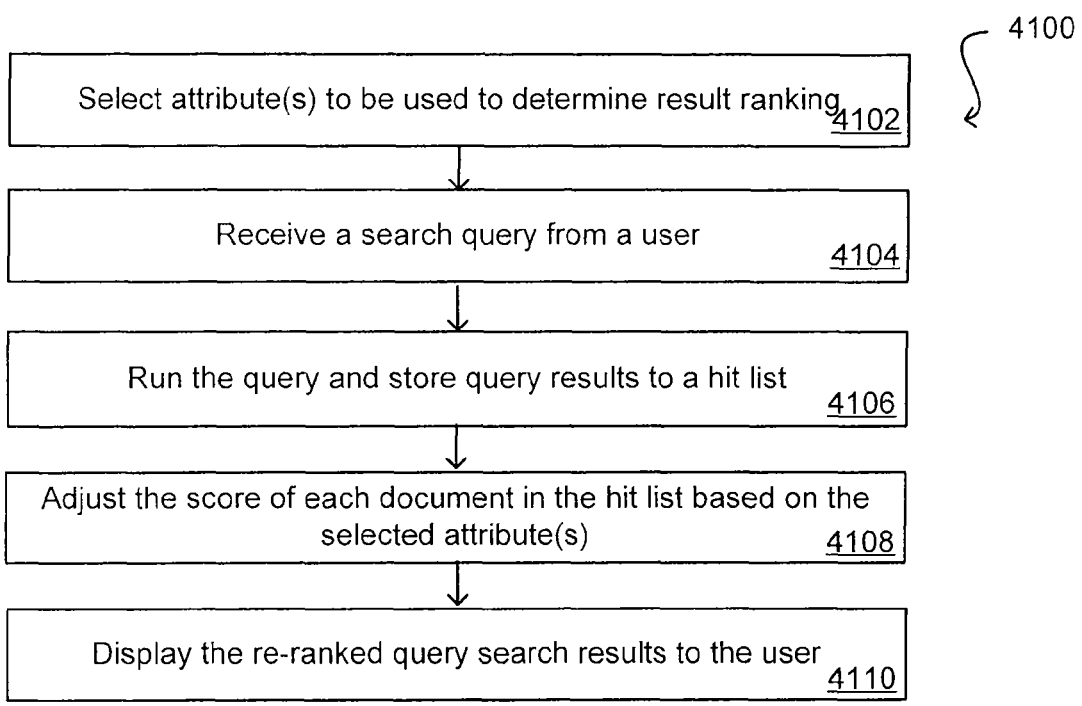
FIG. 41 illustrates an exemplary method for providing improved result ranking that can be used in accordance with one embodiment of the present invention.

FIG. 41 illustrates steps of an exemplary method 4100 that can be used to provide improved result ranking in accordance with one embodiment. In this method, a user or administrator, for example, can select at least one attribute to be used in determining the ranking of query search results 4102. When a query is received from a user 4104, the query can be run against the appropriate source(s) and the results stored in a hit list 4106. A hit list re-rank procedure then can be called that adjusts the relevant score of each document in the hit list based on the selected attribute(s) 4108. The re-ranked results then can be returned and displayed to the user 4110.

In other embodiments, an attribute such as a modified date can be examined when writing a document to the hit list in order to modify the relevant score or set an attribute associated therewith, such that the documents can be re-ranked without calling a separate process in a separate step.

Exemplary Operating Environments, Components, and Technology

Figure 42:
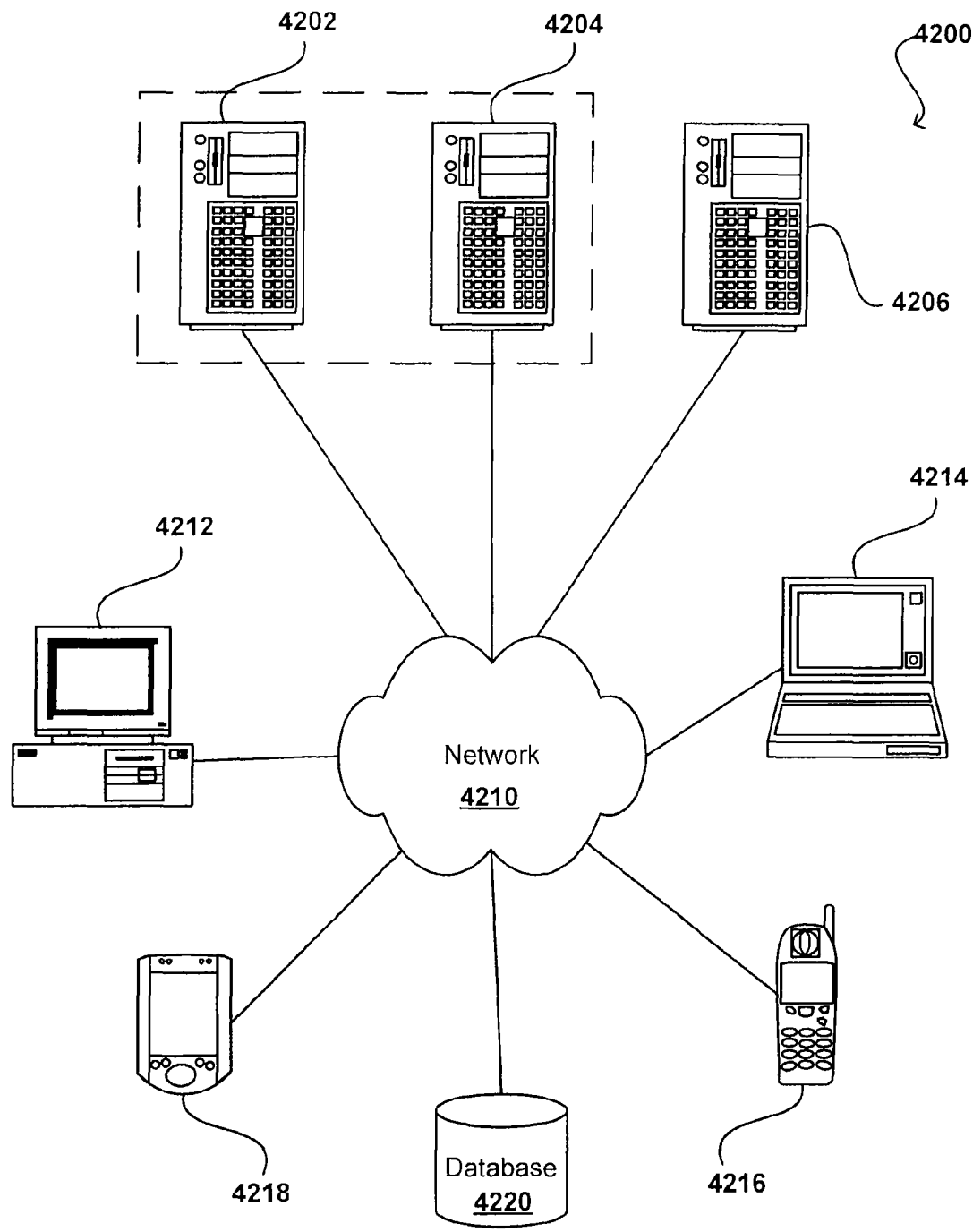
FIG. 42 illustrates components of a computer network that can be used in accordance with one embodiment of the present invention.

FIG. 42 is a block diagram illustrating components of an exemplary operating environment in which various embodiments of the present invention may be implemented. The system 4200 can include one or more user computers, computing devices, or processing devices 4212, 4214, 4216, 4218, which can be used to operate a client, such as a dedicated application, web browser, etc. The user computers 4212, 4214, 4216, 4218 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 4212, 4214, 4216, 4218 may also have any of a variety of applications, including one or more development systems, database client and/or server applications, and Web browser applications. Alternatively, the user computers 4212, 4214, 4216, 4218 may be any other electronic device, such as a thin-client computer, Internet-enabled gaming system, and/or personal messaging device, capable of communicating via a network (e.g., the network 4210 described below) and/or displaying and navigating Web pages or other types of electronic documents. Although the exemplary system 4200 is shown with four user computers, any number of user computers may be supported.

In most embodiments, the system 4200 includes some type of network 4210. The network may can be any type of network familiar to those skilled in the art that can support data communications using any of a variety of commercially-available protocols, including without limitation TCP/IP, SNA, IPX, AppleTalk, and the like. Merely by way of example, the network 4210 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 4202, 4204, 4206 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 4206) may be dedicated to running applications, such as a business application, a Web server, application server, etc. Such servers may be used to process requests from user computers 4212, 4214, 4216, 4218. The applications can also include any number of applications for controlling access to resources of the servers 4202, 4204, 4206.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 4212, 4214, 4216, 4218. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 4212, 4214, 4216, 4218.

The system 4200 may also include one or more databases 4220. The database(s) 4220 may reside in a variety of locations. By way of example, a database 4220 may reside on a storage medium local to (and/or resident in) one or more of the computers 4202, 4204, 4206, 4212, 4214, 4216, 4218. Alternatively, it may be remote from any or all of the computers 4202, 4204, 4206, 4212, 4214, 4216, 4218, and/or in communication (e.g., via the network 4210) with one or more of these. In a particular set of embodiments, the database 4220 may reside in a storage-area network ("SAN") familiar to those skilled in the art. Similarly, any necessary files for performing the functions attributed to the computers 4202, 4204, 4206, 4212, 4214, 4216, 4218 may be stored locally on the respective computer and/or remotely, as appropriate. In one set of embodiments, the database 4220 may be a relational database, such as Oracle 10g, that is adapted to store, update, and retrieve data in response to SQL-formatted commands.

Figure 43:
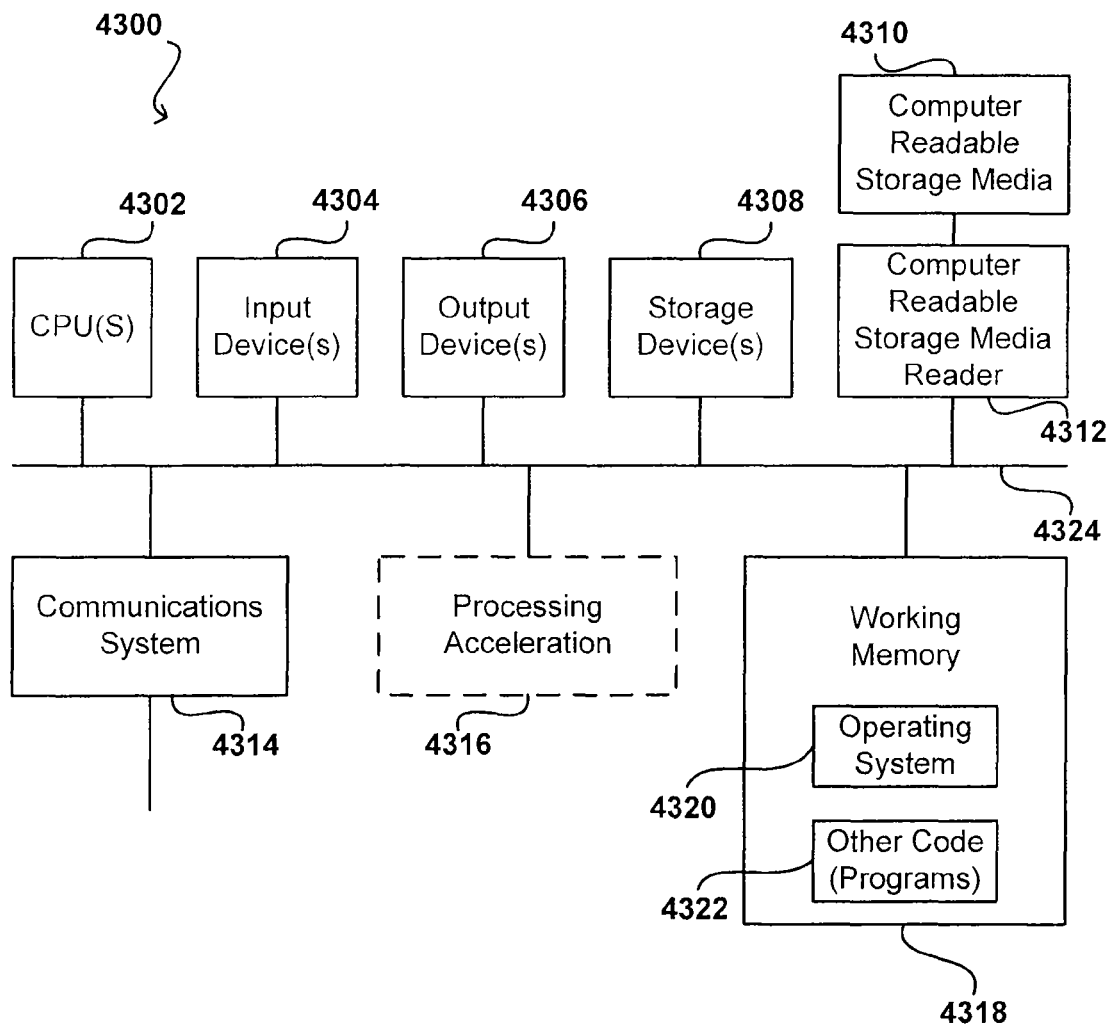
FIG. 43 illustrates components of a computerized device that can be used in accordance with one embodiment of the present invention.

FIG. 43 illustrates an exemplary computer system 4300, in which various embodiments of the present invention may be implemented. The system 4300 may be used to implement any of the computer systems described above. The computer system 4300 is shown comprising hardware elements that may be electrically coupled via a bus 4324. The hardware elements may include one or more central processing units (CPUs) 4302, one or more input devices 4304 (e.g., a mouse, a keyboard, etc.), and one or more output devices 4306 (e.g., a display device, a printer, etc.). The computer system 4300 may also include one or more storage devices 4308. By way of example, the storage device(s) 4308 can include devices such as disk drives, optical storage devices, solid-state storage device such as a random access memory ("RAM") and/or a read-only memory ("ROM"), which can be programmable, flash-updateable and/or the like.

The computer system 4300 may additionally include a computer-readable storage media reader 4312, a communications system 4314 (e.g., a modem, a network card (wireless or wired), an infra-red communication device, etc.), and working memory 4318, which may include RAM and ROM devices as described above. In some embodiments, the computer system 4300 may also include a processing acceleration unit 4316, which can include a digital signal processor DSP, a special-purpose processor, and/or the like.

The computer-readable storage media reader 4312 can further be connected to a computer-readable storage medium 4310, together (and, optionally, in combination with storage device(s) 4308) comprehensively representing remote, local, fixed, and/or removable storage devices plus storage media for temporarily and/or more permanently containing, storing, transmitting, and retrieving computer-readable information. The communications system 4314 may permit data to be exchanged with the network and/or any other computer described above with respect to the system 4300.

The computer system 4300 may also comprise software elements, shown as being currently located within a working memory 4318, including an operating system 4320 and/or other code 4322, such as an application program (which may be a client application, Web browser, mid-tier application, RDBMS, etc.). It should be appreciated that alternate embodiments of a computer system 4300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing user-subscribed sources for secure search, comprising:
    providing to a user a template for crawling a source, the template defining a location of and crawl settings for a target data repository source, the template not having specified security credentials for the source;
    allowing a user to subscribe to the source using the template;
    receiving user-specified security credentials from the user and applying the user-specified security credentials to an instance of the template to create a user-subscribed source;
    authenticating a crawler as the user on the source;
    crawling, using a processor associated with a computer system, the source as the user template with user-specified security credentials;
    indexing documents for the user during the crawling in an index; and
    stamping identification information for the user with each entry in the index such that the associated documents are only available for search in the index by the user.

2. A method according to claim 1, further comprising:
    creating an access control list for the user-subscribed source.

3. A method according to claim 1, wherein:
    the user-subscribed source is capable of matching the user-specified security credentials with the template such that during a crawl on the user-subscribed source authentication is accomplished by augmenting the user-specified security credentials with target repositories.

4. A method according to claim 1, further comprising:
    displaying query results for the indexed documents to the user.

5. A method according to claim 1, wherein:
    the template includes a data table.

6. A method according to claim 1, further comprising:
    launching a crawler on said user-subscribed source using one of a current data source ID and a template source ID.

7. A method according to claim 1, further comprising:
    providing a customize page that, when operated, allow the user to modify an aspect or attribute of the user-subscribed source.

8. A method according to claim 1, further comprising:
    associating the template with a predetermined group of secure data.

9. A method according to claim 1, further comprising:
    allowing an administrator to select a time for a crawl of the user-subscribed source.

10. A method according to claim 1, further comprising:
    mapping the user-subscribed source to other secure sources.

11. A method according to claim 1, further comprising:
    stamping any document crawled for the user-subscribed source with identification information for the user.

12. A method according to claim 1, further comprising:
    using a single sign-on service with the user-subscribed source.

13. A computer program product embedded in a computer-readable storage medium for providing user-subscribed sources for secure search, comprising:
    program code for providing to a user a template for crawling a source, the template defining a location of and crawl settings for a target data repository source, the template not having specified security credentials for the source;
    program code for allowing a user to subscribe to the source using the template;
    program code for receiving user-specified security credentials from the user and applying the user-specified security credentials to an instance of the template to create a user-subscribed source;
    program code for authenticating a crawler as the user on the source;
    program code for crawling the source as the user template with user-specified security credentials;
    program code for indexing documents for the user during the crawling in an index; and
    program code for stamping identification information for the user with each entry in the index such that the associated documents are only available for search in the index by the user.

14. A computer program product according to claim 13, further comprising:
    program code for creating an access control list for the user-subscribed source.

15. A computer program product according to claim 13, further comprising:
    program code capable of matching the user-specified security credentials with the template such that during a crawl on the user-subscribed source authentication is accomplished by augmenting the user-specified security credentials with target repositories.

16. A computer program product according to claim 13, further comprising:
Program code for displaying query results for the indexed documents to the user.

17. A computer program product according to claim 13, further comprising:
program code for launching a crawler on said user-subscribed source using one of a current data source ID and a template source ID.

18. A computer program product according to claim 13, further comprising:
program code for providing a customize page that, when operated, allow the user to modify an aspect or attribute of the user-subscribed source.

19. A computer program product according to claim 13, further comprising:
program code for associating the template with a predetermined group of secure data.

20. A computer program product according to claim 13, further comprising:
program code for allowing an administrator to select a time for a crawl of the user-subscribed source.

21. A computer program product according to claim 13, further comprising:
program code for mapping the user-subscribed source to other secure sources.

22. A computer program product according to claim 13, further comprising:
program code for stamping any document crawled for the user-subscribed source with identification information for the user.

23. A computer program product according to claim 13, further comprising:
program code for using a single sign-on service with the user-subscribed source.

24. The method of claim 1 wherein the operations of providing, allowing, receiving, and inheriting are all performed using the processor.

25. The method of claim 1 wherein the applying the user-specified security credentials to an instance of the template occurs at crawl time such that a configuration of the template can be modified without requiring each user to re-subscribe to the source.

* * * * *